US012613589B2

(12) United States Patent
Bechstein et al.

(10) Patent No.: US 12,613,589 B2
(45) Date of Patent: *Apr. 28, 2026

(54) MECHANICALLY SENSITIVE POWER EFFICIENT STYLUS FOR AN ELECTRONIC DEVICE

(71) Applicant: Shapirten Laboratories LLC, Wilmington, DE (US)

(72) Inventors: Daniel J. Bechstein, Pacifica, CA (US); Duc T. Duong, San Jose, CA (US); John S. Smith, San Jose, CA (US); Michael Vosgueritchian, San Francisco, CA (US); Sinan Filiz, San Mateo, CA (US); Vipin Ayanoor-Vitikkate, Pleasanton, CA (US); Vyom Sharma, Newark, CA (US)

(73) Assignee: Shapirten Laboratories LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/015,214

(22) Filed: Jan. 9, 2025

(65) Prior Publication Data

US 2025/0147605 A1 May 8, 2025

Related U.S. Application Data

(63) Continuation of application No. 18/043,312, filed as application No. PCT/US2021/047628 on Aug. 25, 2021, now Pat. No. 12,210,693.

(Continued)

(51) Int. Cl.
*G06F 3/0354* (2013.01)
*G06F 3/038* (2013.01)

(52) U.S. Cl.
CPC ........ *G06F 3/03545* (2013.01); *G06F 3/0383* (2013.01)

(58) Field of Classification Search
CPC .. G06F 3/03545; G06F 3/0441; G06F 3/0442; G06F 3/041; G06F 3/0412; G06F 3/044; G06F 3/0443; G06F 3/0445
See application file for complete search history.

(56) References Cited

U.S. PATENT DOCUMENTS 5,414,227 A 5/1995 Schubert et al.
5,483,261 A 1/1996 Yasutake
(Continued)

FOREIGN PATENT DOCUMENTS

CN 107368203 A 11/2017
CN 207410026 U 5/2018
(Continued)

OTHER PUBLICATIONS

Corrected Notice of Allowability received for U.S. Appl. No. 18/043,312, mailed on Oct. 2, 2024, 2 pages.
(Continued)

*Primary Examiner* — Koosha Sharifi-Tafreshi
(74) *Attorney, Agent, or Firm* — Kubota & Basol LLP

(57) ABSTRACT
Systems, methods, and computer-readable media for enabling a power efficient stylus for an electronic device are provided. Various components may be provided for providing such a stylus with mechanical sensitivity.

17 Claims, 31 Drawing Sheets

Related U.S. Application Data

(60) Provisional application No. 63/117,537, filed on Nov. 24, 2020, provisional application No. 63/071,096, filed on Aug. 27, 2020.

(56) References Cited

U.S. PATENT DOCUMENTS

| | | | |
|---|---|---|---|
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,667,740 | B2 | 12/2003 | Ely et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,567,414 | B2 | 7/2009 | Bertin et al. |
| 7,663,607 | B2 | 2/2010 | Hotelling et al. |
| 8,199,132 | B1 | 6/2012 | Oda et al. |
| 8,479,122 | B2 | 7/2013 | Hotelling et al. |
| 8,493,359 | B2 | 7/2013 | Wright et al. |
| 8,547,114 | B2 | 10/2013 | Kremin |
| 8,587,535 | B2 | 11/2013 | Oda et al. |
| 8,657,814 | B2 | 2/2014 | Werneth et al. |
| 8,773,405 | B1 | 7/2014 | Ryshtun et al. |
| 8,816,985 | B1 | 8/2014 | Tate et al. |
| 8,854,147 | B2 | 10/2014 | Lin |
| 8,947,397 | B2 | 2/2015 | Fujii |
| 8,952,930 | B2 | 2/2015 | Perski et al. |
| 9,018,547 | B2 | 4/2015 | Rimon et al. |
| 9,046,940 | B2 | 6/2015 | Oyama |
| 9,098,184 | B2 | 8/2015 | Akiyama |
| 9,117,677 | B2 | 8/2015 | Ma et al. |
| 9,189,088 | B2 | 11/2015 | Tsao et al. |
| 9,201,547 | B2 | 12/2015 | Elias et al. |
| 9,201,556 | B2 | 12/2015 | Free et al. |
| 9,256,321 | B2 | 2/2016 | Wang et al. |
| 9,310,943 | B1 | 4/2016 | Omelchuk et al. |
| 9,383,835 | B2 | 7/2016 | Lo et al. |
| 9,465,456 | B2 | 10/2016 | Pant et al. |
| 9,529,463 | B1 | 12/2016 | Ramani et al. |
| 9,594,440 | B2 | 3/2017 | Park et al. |
| 9,606,680 | B1 | 3/2017 | Sundara-rajan |
| 9,612,671 | B1 | 4/2017 | Blaszczak et al. |
| 9,665,184 | B2 | 5/2017 | Hara |
| 10,095,406 | B2 | 10/2018 | Ahmed et al. |
| 10,455,115 | B2 | 10/2019 | Zyskind et al. |
| 10,558,293 | B2 | 2/2020 | Wigdor et al. |
| 11,079,862 | B2 | 8/2021 | Brunet et al. |
| 11,079,888 | B1 | 8/2021 | Gray et al. |
| 11,287,926 | B1 | 3/2022 | Shahsavari et al. |
| 11,435,851 | B2 | 9/2022 | Rosenberg et al. |
| 11,526,240 | B1 | 12/2022 | Bechstein et al. |
| 12,242,695 | B1 | 3/2025 | Deselaers et al. |
| 2002/0158923 | A1 | 10/2002 | Panagrossi et al. |
| 2005/0264528 | A1 | 12/2005 | Burry |
| 2006/0197753 | A1 | 9/2006 | Hotelling |
| 2007/0195068 | A1 | 8/2007 | Kable et al. |
| 2008/0156546 | A1 | 7/2008 | Hauck |
| 2008/0266267 | A1 | 10/2008 | Chang |
| 2009/0008162 | A1 | 1/2009 | Yang et al. |
| 2009/0273579 | A1 | 11/2009 | Zachut et al. |
| 2009/0289922 | A1 | 11/2009 | Henry |
| 2010/0117661 | A1 | 5/2010 | Bruwer et al. |
| 2010/0315384 | A1 | 12/2010 | Hargreaves et al. |
| 2011/0063154 | A1 | 3/2011 | Hotelling et al. |
| 2011/0297458 | A1 | 12/2011 | Mao et al. |
| 2012/0007608 | A1 | 1/2012 | Hadwen et al. |
| 2012/0068957 | A1 | 3/2012 | Puskarich et al. |
| 2012/0146960 | A1 | 6/2012 | Shih et al. |
| 2012/0154340 | A1 | 6/2012 | Vuppu et al. |
| 2012/0268428 | A1 | 10/2012 | Nakata et al. |
| 2012/0278031 | A1 | 11/2012 | Oda et al. |
| 2012/0327042 | A1 | 12/2012 | Harley et al. |
| 2012/0331546 | A1 | 12/2012 | Falkenburg et al. |
| 2013/0088465 | A1 | 4/2013 | Geller et al. |
| 2013/0106718 | A1 | 5/2013 | Sundara-rajan |
| 2013/0141397 | A1 | 6/2013 | Dunagan |
| 2013/0194225 | A1 | 8/2013 | Shen et al. |
| 2013/0285900 | A1 | 10/2013 | Liu |
| 2013/0321355 | A1 | 12/2013 | Teiblum |
| 2014/0146009 | A1 | 5/2014 | Huang |
| 2015/0091856 | A1 | 4/2015 | Park et al. |
| 2015/0123923 | A1 | 5/2015 | Stern |
| 2015/0123932 | A1 | 5/2015 | Collins |
| 2015/0138164 | A1 | 5/2015 | Hinson |
| 2015/0160744 | A1 | 6/2015 | Mohindra et al. |
| 2015/0193024 | A1 | 7/2015 | Kai et al. |
| 2015/0277618 | A1 | 10/2015 | Bulea |
| 2015/0309598 | A1 | 10/2015 | Zeliff et al. |
| 2015/0355732 | A1 | 12/2015 | Mann |
| 2016/0048224 | A1 | 2/2016 | Brunet et al. |
| 2016/0162045 | A1 | 6/2016 | Vincent |
| 2016/0179271 | A1 | 6/2016 | Vandermeijden |
| 2016/0266663 | A1 | 9/2016 | Holsen |
| 2016/0313825 | A1 | 10/2016 | Hotelling et al. |
| 2016/0320913 | A1 | 11/2016 | Gao et al. |
| 2017/0010697 | A1 | 1/2017 | Jiang et al. |
| 2017/0068344 | A1 | 3/2017 | Bhandari et al. |
| 2017/0075441 | A1 | 3/2017 | Leigh et al. |
| 2017/0075446 | A1 | 3/2017 | Vandermeijden |
| 2017/0212635 | A1 | 7/2017 | Cordeiro et al. |
| 2017/0262076 | A1 | 9/2017 | Hara |
| 2017/0262100 | A1 | 9/2017 | Leigh et al. |
| 2017/0285772 | A1 | 10/2017 | Yamamoto |
| 2017/0308189 | A1 | 10/2017 | Peretz et al. |
| 2017/0344174 | A1 | 11/2017 | Pant et al. |
| 2018/0081477 | A1 | 3/2018 | Picciotto et al. |
| 2018/0181245 | A1 | 6/2018 | Beck et al. |
| 2018/0246585 | A1 | 8/2018 | Hara |
| 2018/0284909 | A1 | 10/2018 | Laslo et al. |
| 2018/0309190 | A1 | 10/2018 | Niakan |
| 2018/0338065 | A1 | 11/2018 | Zyskind et al. |
| 2019/0155408 | A1 | 5/2019 | Hou et al. |
| 2019/0155411 | A1 | 5/2019 | Kinrot et al. |
| 2019/0220187 | A1 | 7/2019 | Budd |
| 2019/0324561 | A1 | 10/2019 | Anderson et al. |
| 2019/0324564 | A1 | 10/2019 | Brunet et al. |
| 2019/0339356 | A1 | 11/2019 | Schildknecht et al. |
| 2019/0371787 | A1 | 12/2019 | Mandal |
| 2020/0019257 | A1 | 1/2020 | Chang et al. |
| 2020/0110482 | A1 | 4/2020 | Vu et al. |
| 2020/0159386 | A1 | 5/2020 | Saito et al. |
| 2020/0192521 | A1 | 6/2020 | Case et al. |
| 2020/0201505 | A1 | 6/2020 | Jung et al. |
| 2020/0218322 | A1 | 7/2020 | Gray et al. |
| 2021/0026464 | A1 | 1/2021 | Yamada et al. |
| 2021/0232240 | A1 | 7/2021 | Smith |
| 2021/0240325 | A1 | 8/2021 | Smith |
| 2021/0255735 | A1 | 8/2021 | Gray et al. |
| 2021/0286493 | A1 | 9/2021 | Wang et al. |
| 2021/0303151 | A1 | 9/2021 | Morrison et al. |
| 2021/0303152 | A1* | 9/2021 | Hosur .................... G06F 3/044 |
| 2021/0325444 | A1 | 10/2021 | Chong |
| 2022/0091685 | A1 | 3/2022 | Bechstein et al. |
| 2022/0095443 | A1 | 3/2022 | Bechstein et al. |
| 2022/0100310 | A1 | 3/2022 | Shahsavari et al. |
| 2022/0100341 | A1 | 3/2022 | Seyed Mousavi et al. |
| 2022/0334658 | A1 | 10/2022 | Dekel et al. |
| 2023/0152911 | A1 | 5/2023 | Bechstein et al. |
| 2023/0273687 | A1 | 8/2023 | Bechstein et al. |

FOREIGN PATENT DOCUMENTS

| | | |
|---|---|---|
| EP | 2466431 A1 | 6/2012 |
| EP | 2624104 A2 | 8/2013 |
| EP | 2672494 A1 | 12/2013 |
| EP | 2813918 A1 | 12/2014 |
| EP | 2624104 A3 | 3/2016 |
| EP | 3326050 A1 | 5/2018 |
| EP | 3352057 A1 | 7/2018 |
| JP | 2000-163031 A | 6/2000 |

(56) References Cited

FOREIGN PATENT DOCUMENTS

| JP | 2002-342033 | A | 11/2002 |
| WO | 2017/044428 | A1 | 3/2017 |
| WO | 2019/036857 | A1 | 2/2019 |
| WO | 2020/023640 | A1 | 1/2020 |
| WO | 2020/027818 | A1 | 2/2020 |
| WO | 2021/202612 | A2 | 10/2021 |
| WO | 2022/046956 | A1 | 3/2022 |

OTHER PUBLICATIONS

Final Office Action received for U.S. Appl. No. 17/169,316, mailed on Aug. 24, 2023, 21 pages.
Final Office Action received for U.S. Appl. No. 17/169,316, mailed on Oct. 6, 2022, 17 pages.
Final Office Action received for U.S. Appl. No. 18/043,312, mailed on Mar. 6, 2024, 12 pages.
International Search Report received for PCT Patent Application No. PCT/US2019/043249, mailed on Dec. 6, 2019, 7 pages.
International Search Report received for PCT Patent Application No. PCT/US2021/025003, mailed on Oct. 18, 2021, 8 pages.
International Search Report received for PCT Patent Application No. PCT/US2021/047628, mailed on Feb. 14, 2022, 8 pages.
Non-Final Office Action received for U.S. Appl. No. 17/169,316, mailed on Feb. 1, 2024, 20 pages.
Non-Final Office Action received for U.S. Appl. No. 17/169,316, mailed on Mar. 3, 2022, 16 pages.
Non-Final Office Action received for U.S. Appl. No. 17/169,316, mailed on Mar. 3, 2023, 21 pages.
Non-Final Office Action received for U.S. Appl. No. 17/906,971, mailed on Feb. 15, 2024, 11 pages.
Non-Final Office Action received for U.S. Appl. No. 18/043,312, mailed on Sep. 13, 2023, 11 pages.
Notice of Allowance received for U.S. Appl. No. 17/262,741, mailed on Feb. 15, 2022, 8 pages.
Notice of Allowance received for U.S. Appl. No. 17/262,741, mailed on May 24, 2022, 8 pages.
Notice of Allowance received for U.S. Appl. No. 17/262,741, mailed on Nov. 24, 2021, 13 pages.
Notice of Allowance received for U.S. Appl. No. 18/043,312, mailed on Sep. 18, 2024, 6 pages.
Restriction Requirement received for U.S. Appl. No. 17/906,971, mailed on Oct. 12, 2023, 6 pages.
Lee, et al., A Multi-Touch Three Dimensional Touch-Sensitive Tablet, CHI'85 Proceedings, Apr. 1985, pp. 21-25.
Rubine, Dean, Combining Gestures and Direct Manipulation, CHI'92, May 3-7, 1992, pp. 659-660.
Rubine, Dean H., The Automatic Recognition of Gestures, CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, Hand Tracking, Finger Identification, and Chordic Manipulation on a Multi-Touch Surface, A Dissertation Submitted to the Faculty of the University of Delaware in Partial Fulfillment of the Requirements for the Degree of Doctor of Philosophy in Electrical Engineering, 1999, 363 pages.
Final Office Action received for U.S. Appl. No. 17/169,316, mailed on Nov. 7, 2024, 20 pages.
Notice of Allowance received for U.S. Appl. No. 17/906,971, mailed on Oct. 29, 2024, 10 pages.
Advisory Action received for U.S. Appl. No. 17/169,316, mailed on Mar. 13, 2025, 2 pages.
Notice of Allowance received for U.S. Appl. No. 17/169,316, mailed on Apr. 15, 2025, 8 pages.

* cited by examiner

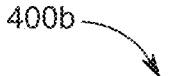
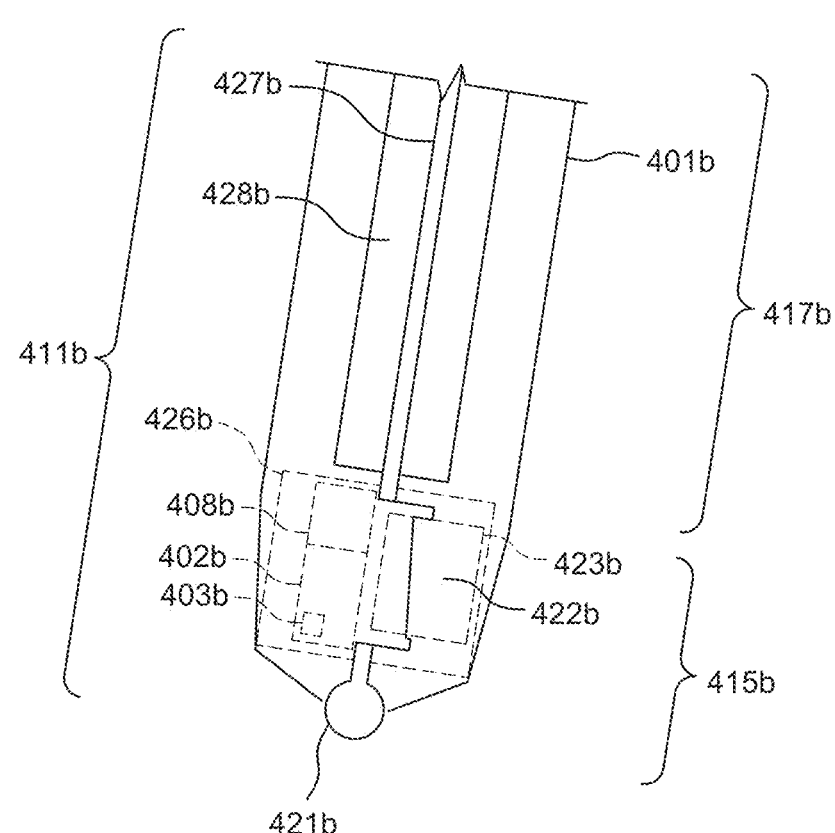
FIG. 3

800

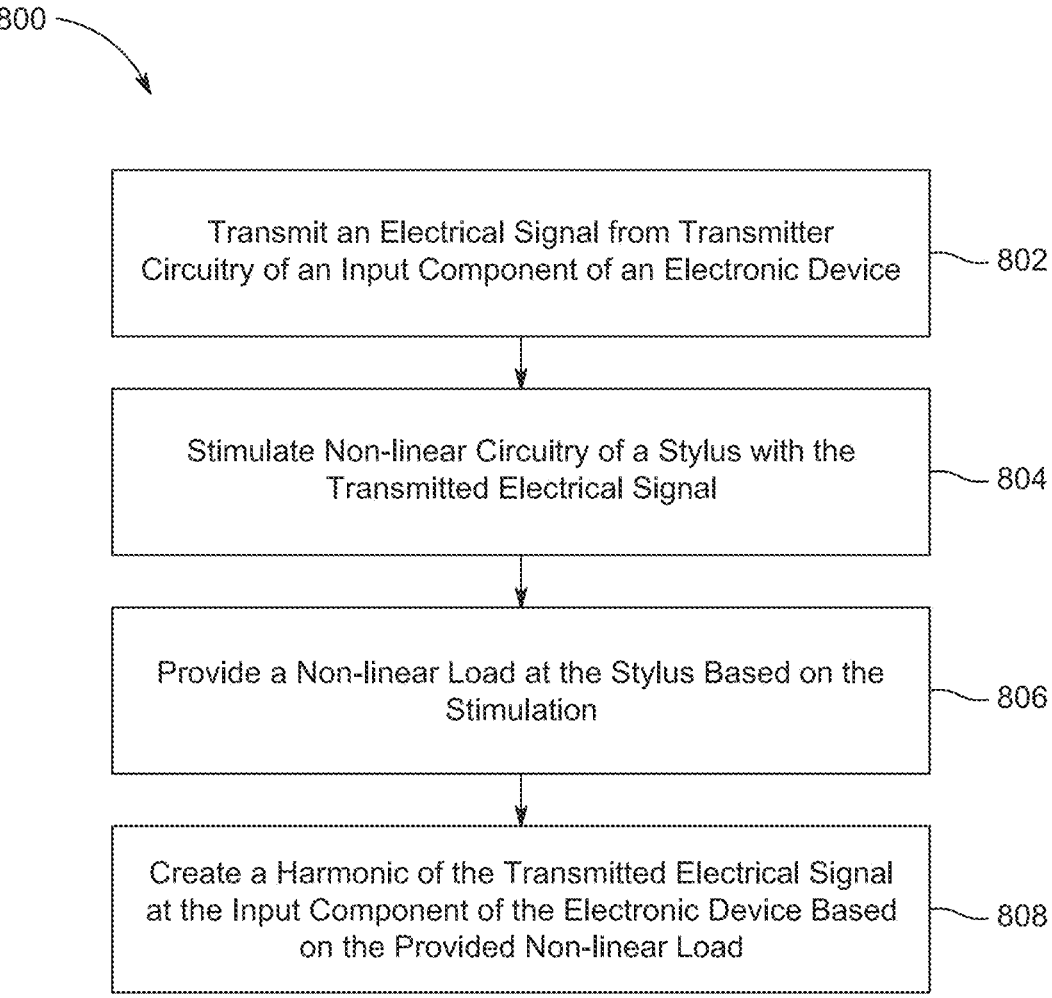

Transmit an Electrical Signal from Transmitter
Circuitry of an Input Component of an Electronic Device — 802

Stimulate Non-linear Circuitry of a Stylus with the
Transmitted Electrical Signal — 804

Provide a Non-linear Load at the Stylus Based on the
Stimulation — 806

Create a Harmonic of the Transmitted Electrical Signal
at the Input Component of the Electronic Device Based
on the Provided Non-linear Load — 808

Transmit an Electrical Signal from Transmitter
Circuitry of an Input Component of an Electronic Device ~ 902

Switch Switching Circuitry of a Stylus According to a
Pattern ~ 904

Modulate the Transmitted Electrical Signal According
to the Pattern Based on the Switching ~ 906

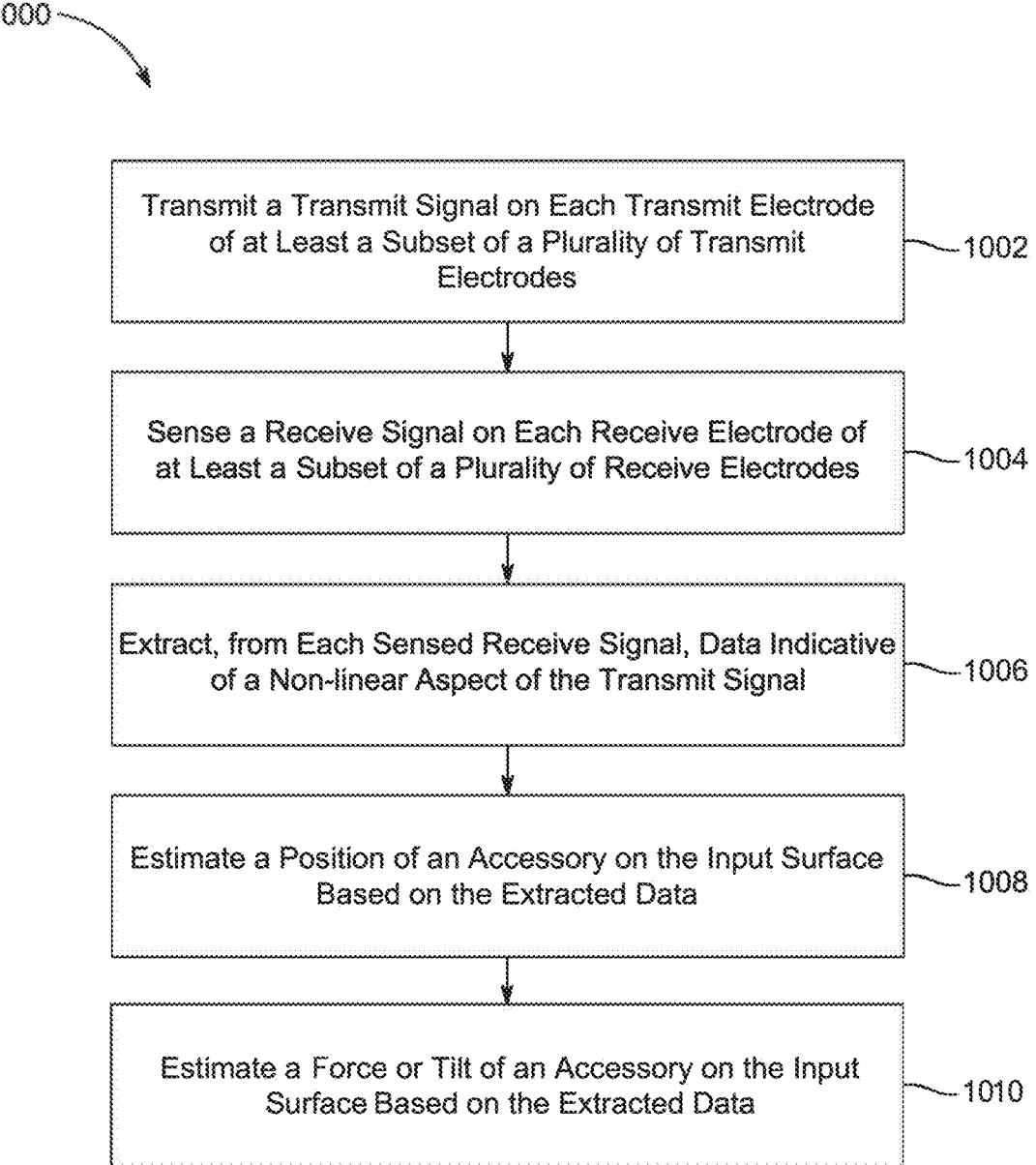

1000

| Transmit a Transmit Signal on Each Transmit Electrode of at Least a Subset of a Plurality of Transmit Electrodes | —1002 |

| Sense a Receive Signal on Each Receive Electrode of at Least a Subset of a Plurality of Receive Electrodes | —1004 |

| Extract, from Each Sensed Receive Signal, Data Indicative of a Non-linear Aspect of the Transmit Signal | —1006 |

| Estimate a Position of an Accessory on the Input Surface Based on the Extracted Data | —1008 |

| Estimate a Force or Tilt of an Accessory on the Input Surface Based on the Extracted Data | —1010 |

FIG. 10

MECHANICALLY SENSITIVE POWER EFFICIENT STYLUS FOR AN ELECTRONIC DEVICE

CROSS REFERENCE TO RELATED APPLICATIONS

This application is a continuation of U.S. patent application Ser. No. 18/043,312, filed Feb. 27, 2023 and published on Aug. 31, 2023 as U.S. Publication No. 2023-0273687, which is a National Phase application under 35 U.S.C. § 371 of International Application No. PCT/US2021/047628, filed Aug. 25, 2021, which claims the priority benefit of U.S. Provisional Application No. 63/117,537, filed Nov. 24, 2020, and U.S. Provisional Application No. 63/071,096, filed Aug. 27, 2020, the contents of which are hereby incorporated by reference in their entireties for all intended purposes.

FIELD

This generally relates to a stylus and, more particularly, to a power efficient stylus for an electronic device, and, more particularly, to such a stylus with mechanical sensitivity, as well as to systems, methods, and computer-readable media for use thereof.

BACKGROUND

Some systems may include an electronic device with a sensor assembly to facilitate a user's interaction with the device, as well as a stylus for providing a user with a more precise instrument than the user's fingers for interacting with the sensor assembly, such as for generating a graphical object on a display of the electronic device. However, existing systems often require an active stylus that uses power intensive electronics requiring electrical power provided by a battery embedded in the active stylus for driving electrical currents into the electronic device or a passive stylus that does not usually generate internal electrical power but that is difficult to distinguish from a user's finger and/or that provides no mechanical sensitivity.

SUMMARY

Systems, methods, and computer-readable media for enabling a power efficient stylus with mechanical sensitivity for an electronic device are provided.

As an example, a stylus for use with an electronic device that includes an input component with an input surface may be provided, the stylus including a housing and stylus circuitry at least partially positioned within the housing, wherein the stylus circuitry includes body circuitry, a front tip interface component, and front tip stylus circuitry positioned between and electrically coupled to each one of the body circuitry and the front tip interface component, the front tip stylus circuitry includes non-linear circuitry that is operative to provide a non-linear load between the body circuitry and the front tip interface component when the stylus circuitry is stimulated by an external stimulation, and the non-linear load is operative to provide a stylus electric field that is detectable by the electronic device when the front tip interface component of the stylus is positioned adjacent the input surface of the input component of the electronic device.

As another example, a stylus for use with an electronic device that includes an input component with an input surface may be provided, the stylus including a tip interface component and tip stylus circuitry electrically coupled to the tip interface component, wherein the stylus is operative to drive a current back and forth through the tip stylus circuitry when the tip stylus circuitry is stimulated by an electrical signal provided by the input component of the electronic device, and the driven current is operative to provide a modulated version of the electrical signal that is detectable by the electronic device when the tip interface component of the stylus is positioned adjacent the input surface of the input component of the electronic device.

As yet another example, a method for using a stylus including non-linear circuitry at an input component of an electronic device may be provided, the method including transmitting an electrical signal from transmitter circuitry of the input component of the electronic device, stimulating the non-linear circuitry of the stylus with the transmitted electrical signal, providing a non-linear load at the stylus based on the stimulating, and creating a harmonic of the transmitted electrical signal at the input component of the electronic device based on the provided non-linear load.

As yet another example, a stylus for use with an electronic device that includes an input component with an input surface may be provided, the stylus including a housing and stylus circuitry at least partially positioned within the housing, wherein the stylus circuitry includes body circuitry, a tip interface component, and tip stylus circuitry, the tip stylus circuitry includes switch circuitry that is operative to alternate according to a pattern between a first state in which the body circuitry and the tip interface component are electrically coupled and a second state in which the body circuitry and the tip interface component are not electrically coupled, and the alternation of the switch circuitry is operative to provide a modulated capacitance at the tip interface component that is detectable by the electronic device when the tip interface component of the stylus is positioned adjacent the input surface of the input component of the electronic device.

As yet another example, a stylus for use with an electronic device that includes an input component with an input surface may be provided, the stylus including a tip interface component and tip stylus circuitry electrically coupled to the tip interface component, wherein the tip stylus circuitry is operative to change a load of the stylus according to a pattern when the tip stylus circuitry is exposed to an electrical signal provided by the input component of the electronic device, and the changed load is operative to provide a modulated version of the electrical signal that is detectable by the electronic device when the tip interface component of the stylus is positioned adjacent the input surface of the input component of the electronic device.

As yet another example, a method for using a stylus including switching circuitry at an input component of an electronic device may be provided, the method including transmitting an electrical signal from transmitter circuitry of the input component of the electronic device, concurrently with the transmitting, switching the switching circuitry according to a pattern, and, based on the switching, modulating the transmitted electrical signal according to the pattern.

As yet another example, a method for detecting an accessory on an input surface of an input component of an electronic device that includes a matrix of a plurality of transmit electrodes and a plurality of receive electrodes, may be provided, the method including transmitting a transmit signal on each transmit electrode of at least a subset of the plurality of transmit electrodes, sensing a receive signal on each receive electrode of at least a subset of the plurality of receive electrodes, extracting, from each sensed receive signal, data indicative of a non-linear aspect of the transmit signal, and estimating a position of the accessory on the input surface based on the extracted data.

As yet another example, an electronic device may be provided that includes an input component including an input surface and a matrix underneath the input surface including a plurality of transmit electrodes and a plurality of receive electrodes, and processing circuitry configured to transmit a transmit signal on each transmit electrode of at least a subset of the plurality of transmit electrodes, sense a receive signal on each receive electrode of at least a subset of the plurality of receive electrodes, extract, from each sensed receive signal, data indicative of a non-linear aspect of the transmit signal, and estimate a position of an accessory on the input surface based on the extracted data.

As yet another example, an electronic device input component may be provided that includes an input surface, a plurality of electrodes, and processing circuitry configured to provide a transmit waveform on each electrode of at least a subset of the plurality of electrodes, detect a receive waveform on each electrode of at least another subset of the plurality of electrodes, extract, from each detected receive waveform, data indicative of asymmetric distortion of the transmit waveform, and determine a location of an accessory on the input surface based on the extracted data.

As yet another example, an electronic device may be provided that includes an input component including an input surface and a matrix underneath the input surface including a plurality of transmit electrodes and a plurality of receive electrodes, and processing circuitry configured to transmit signals on transmit electrodes of at least a subset of the plurality of transmit electrodes, sense a receive signal on each receive electrode of at least a subset of the plurality of receive electrodes, extract, from the sensed receive signals, data indicative of a non-linear response to the transmit signals, and estimate a position of an accessory on the input surface based on the extracted data.

As yet another example, an electronic device input component may be provided that includes an input surface, a plurality of electrodes, and processing circuitry configured to provide transmit waveforms on electrodes of at least a subset of the plurality of electrodes, detect a receive waveform on each electrode of at least another subset of the plurality of electrodes, extract, from the detected receive waveforms, data indicative of a non-linear response to the transmit waveforms, and determine a location of an accessory on the input surface based on the extracted data.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which:

FIG. 3 is a partially transparent, semi-schematic view of an illustrative portion of another stylus of the system of FIGS. 1-1D;

FIGS. 7-10 are flowcharts of illustrative processes for using a stylus;

DETAILED DESCRIPTION

In the following detailed description, for purposes of explanation, numerous specific details are set forth to provide a thorough understanding of the various embodiments described herein. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art will readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming, but would nevertheless be a routine engineering undertaking for those of ordinary skill in the art having the benefit of this disclosure.

The present disclosure relates to one or more power efficient styli for interacting with a sensor assembly of an electronic device, such as for generating a graphical object on a display of the electronic device.

Systems, methods, and computer-readable media for enabling a power efficient stylus with mechanical sensitivity for an electronic device are provided and described with reference to FIGS. 1-15A.

Figure 1:
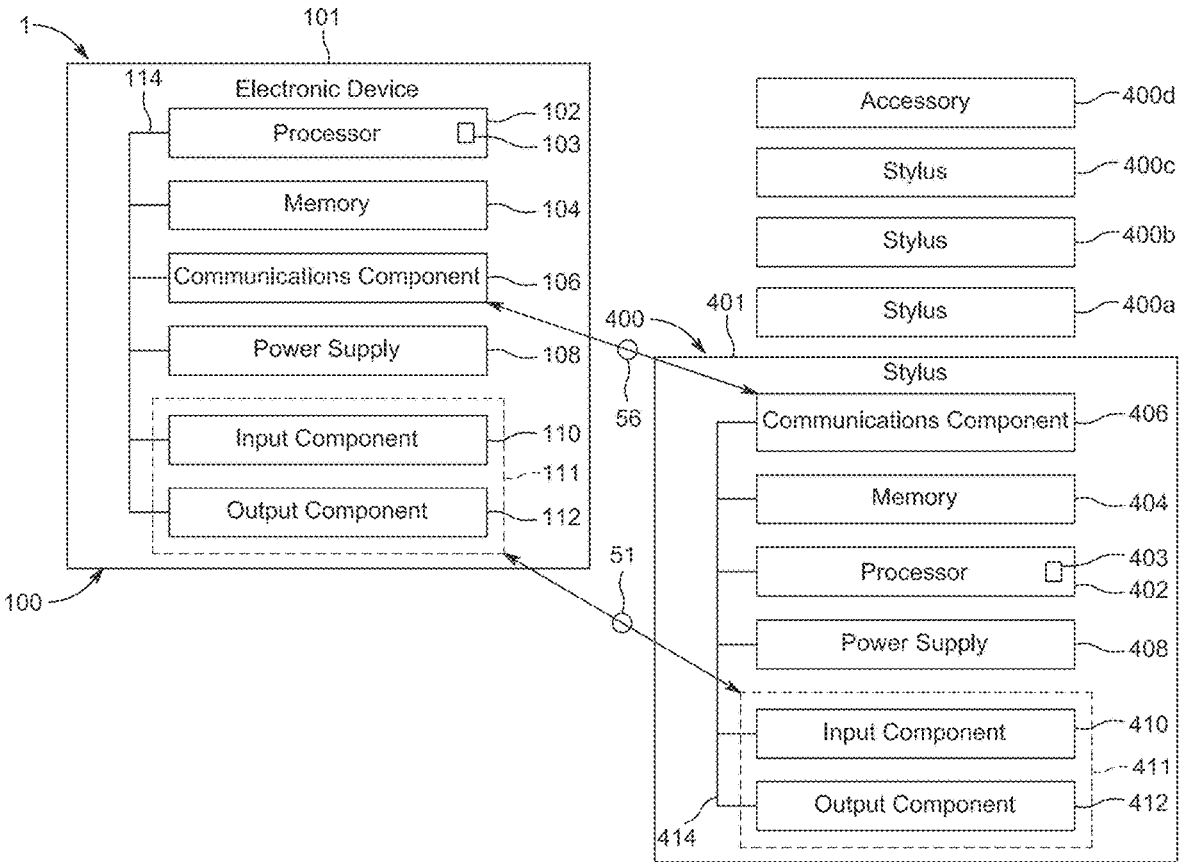
FIG. 1 is a schematic view of an illustrative user input system including an electronic device and a power efficient stylus.

FIG. 1 is a schematic view of an illustrative system 1 with an electronic device 100 and a stylus 400. Stylus 400 (e.g., a marking tool, smart pen, smart brush, wand, chisel, user-manipulated electronic input device, hand-held input device, and the like, or any other suitable accessory, such as a glove) may be configured to provide input to electronic device 100 (e.g., a tablet computer, laptop computer, desktop computer, and the like). A system user may manipulate the orientation and position of stylus 400 relative to an input surface of electronic device 100 to convey information to electronic device 100, such as, but not limited to, writing, sketching, scrolling, gaming, selecting user interface elements, moving user interface elements, and so on. In many embodiments, the input surface of electronic device 100 may be a multi-touch display screen. However, in other embodiments, the input surface of electronic device 100 may be a non-display input surface, such as, but not limited to, a trackpad or drawing tablet. The input surface may be a foldable or flexible surface or display. System 1 may be used to capture free-form user input from stylus 400. For example, the user can slide, move, draw, or drag a tip of stylus 400 across the input surface of electronic device 100, which, in response, may render a graphical object (e.g., a line) using a display positioned below the input surface. In such an example, the rendered graphical object may follow or otherwise correspond to the path of stylus 400 across the input surface of electronic device 100. The thickness and/or shape and/or intensity and/or any other suitable rendered characteristic of the rendered graphical object may vary based, at least in part, on one, some, or each of various characteristics, including, but not limited to, a force or speed with which the user moves stylus 400 across the input surface, an angle of stylus 400 relative to the input surface (e.g., the inclination of stylus 400 relative to a plane of the input surface, a writing angle of stylus 400 relative to a horizontal writing line traversing the input surface, etc.), a variable setting of a variable input component of stylus 400, which one of multiple tips of stylus 400 is interacting with the input surface, a variable setting of an application running on electronic device 100 (e.g., a virtual drawing space application), and/or a combination thereof. Collectively, stylus 400 and electronic device 100 may be referred to herein as a "user input" system 1.

Broadly and generally, system 1 may be operative to determine and/or estimate one or more outputs of stylus 400 (and/or changes therein over time as a scalar or vector quantity), to interpret the user's manipulation thereof as input to electronic device 100. For example, system 1 may be operative to estimate: the magnitude of force applied by a user's grip to stylus 400 (e.g., non-binary estimate of magnitude as a scalar or vector quantity); a magnitude (e.g., non-binary estimate of magnitude as a scalar or vector quantity) of force applied (e.g., force applied $F_a$) by stylus 400 to the input surface of electronic device 100 (e.g., a "reaction force" experienced by the stylus when the stylus applies a force to the input surface (e.g., reaction force $F_r$) may be equal to and opposite of the applied force $F_a$ applied by the stylus to the input surface); the location at which or the area over which stylus 400 may touch or nearly touch the input surface of electronic device 100; a polar angle of stylus 400 relative to a plane of the input surface (e.g., inclination of stylus 400 (e.g., a polar angle 118 ($\theta$) (e.g., as may be defined between a vector normal to the plane of input surface 110*a* and a longitudinal axis 120 of stylus 400, such as a zenith))); an azimuthal angle of stylus 400 relative to an axis of the input surface (e.g., an azimuthal angle 122 ($\Phi$) (e.g., as may be defined between the polar angle 118 ($\theta$) and a reference vector within the plane of input surface 110*a*, such as an axis)); a vector or scalar representation of the angular position of stylus 400 relative to a plane of the input surface; three-dimensional coordinates (e.g., spherical, Cartesian, and so on) of one or more points along the length of stylus 400 relative to the input surface; and so on. In many embodiments, system 1 may be operative to monitor such variables over time to estimate rates of change therein as either scalar or vector quantities (e.g., velocity, acceleration, and so on). The operation of estimating or determining two-dimensional position coordinates of stylus 400 as a point (or area) within or parallel to a plane of the input surface, whether such operation is performed by electronic device 100, performed by stylus 400, and/or performed, at least in part, as a result of cooperation therebetween (or with one or more other electronic devices), is generally referred to herein as "locating" the stylus.

Electronic device 100 and/or stylus 400 can be configured to estimate and/or monitor the location of stylus 400 over time and compute differential or integral quantities such as, but not limited to, acceleration, velocity, total force applied, path length, and so on. For example, the operation of estimating the velocity and/or acceleration of stylus 400 relative to the input surface as stylus 400 is moved across that surface, whether such operation is performed by electronic device 100, performed by stylus 400, and/or performed, at least in part, as a result of cooperation therebetween (or with one or more other electronic devices), is generally referred to herein as estimating the "planar motion" of the stylus. The operation of estimating the angular velocity and/or acceleration of stylus 400 relative to a plane of the input surface as it is moved thereacross, whether performed by electronic device 100, performed by stylus 400, and/or performed, at least in part, as a result of cooperation therebetween (or with one or more other electronic devices), is generally referred to herein as estimating the "angular motion" of the stylus. Additionally or alternatively, electronic device 100 and/or stylus 400 can be configured to estimate the distance (e.g., Z-height) of a portion of stylus 400 (e.g., the tip of the stylus) from the input surface of device 100, and such an estimated distance may be used to determine a "make or break" event between the stylus and device, such as for making a determination when a drawn graphical line should start or stop or a stylus lift off event should occur.

Electronic device 100 may be any portable, mobile, or hand-held electronic device configured to interact with stylus 400 for changing any suitable characteristic(s) of device 100 (e.g., any suitable graphical object input tool characteristics that may be utilized to render a graphical object) in response to manipulation of stylus 400 across an input surface of electronic device 100. Alternatively, electronic device 100 may not be portable at all, but may instead be generally stationary. Electronic device 100 can include, but is not limited to, a media player, video player, still image player, game player, other media player, music recorder, movie or video camera or recorder, still camera, other media recorder, radio, medical equipment, domestic appliance, transportation vehicle instrument, musical instrument, calculator, cellular telephone, other wireless communication device, personal digital assistant, remote control, pager, computer (e.g., a desktop, laptop, tablet, server, etc.), merchant accessory (e.g., signature pad (e.g., as may be used in a check-out line of a merchant store during payment processing)), monitor, television, stereo equipment, set up box, set-top box, wearable device (e.g., watch, clothing, etc.), boom box, modem, router, printer, and combinations thereof. Electronic device 100 may include any suitable control circuitry or processor 102, memory 104, communications component 106, power supply 108, input component 110, and output component 112. Electronic device 100 may also include a bus 114 that may provide one or more wired or wireless communication links or paths for transferring data and/or power to, from, or between various other components of device 100. Device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing). In some embodiments, one or more components of electronic device 100 may be combined or omitted. Moreover, electronic device 100 may include other components not combined or included in FIG. 1. For example, device 100 may include any other suitable components or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music and image files), software (e.g., applications for implementing functions on device 100 (e.g., virtual drawing space applications, stylus detection applications, etc.)), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers or subsystems (e.g., stylus 400) using any suitable communications protocol(s). For example, communications component 106 may support Wi-Fi (e.g., an 802.11 protocol), Ethernet, Bluetooth™, near field communication ("NFC"), radio-frequency identification ("RFID"), high frequency systems (e.g., 900 MHZ, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications component 106 may also include circuitry that can enable device 100 to be electrically coupled to another device or server or subsystem (e.g., stylus 400 or another user electronic device or server) and communicate with that other device, either wirelessly or via a wired connection.

Power supply 108 may provide power to one or more of the components of device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using solar cells).

One or more input components 110 may be provided to permit a user to interact or interface with device 100 and/or to sense certain information about the ambient environment. For example, input component 110 can take a variety of forms, including, but not limited to, a touch pad, trackpad, dial, click wheel, scroll wheel, touch screen, ultrasonic line sensor, ultrasonic imaging array, one or more buttons (e.g., a keyboard), mouse, joy stick, track ball, switch, photocell, force-sensing resistor ("FSR"), encoder (e.g., rotary encoder and/or shaft encoder that may convert an angular position or motion of a shaft or axle to an analog or digital code), microphone, camera, scanner (e.g., a barcode scanner or any other suitable scanner that may obtain product identifying information from a code, such as a linear barcode, a matrix barcode (e.g., a quick response ("QR") code), or the like), proximity sensor (e.g., capacitive proximity sensor), biometric sensor (e.g., a fingerprint reader or other feature recognition sensor, which may operate in conjunction with a feature-processing application that may be accessible to electronic device 100 for authenticating or otherwise identifying or detecting a user), line-in connector for data and/or power, force sensor (e.g., any suitable capacitive sensors, pressure sensors, strain gauges, sensing plates (e.g., capacitive and/or strain sensing plates), etc.), temperature sensor (e.g., thermistor, thermocouple, thermometer, silicon bandgap temperature sensor, bimetal sensor, etc.) for detecting the temperature of a portion of electronic device 100 or an ambient environment thereof, a performance analyzer for detecting an application characteristic related to the current operation of one or more components of electronic device 100 (e.g., processor 102), motion sensor (e.g., single axis or multi axis accelerometers, angular rate or inertial sensors (e.g., optical gyroscopes, vibrating gyroscopes, gas rate gyroscopes, or ring gyroscopes), linear velocity sensors, and/or the like), magnetometer (e.g., scalar or vector magnetometer), pressure sensor, light sensor (e.g., ambient light sensor ("ALS"), infrared ("IR") sensor, etc.), thermal sensor, acoustic sensor, sonic or sonar sensor, radar sensor, image sensor, video sensor, global positioning system ("GPS") detector, radio frequency ("RF") detector, RF or acoustic Doppler detector, RF triangulation detector, electrical charge sensor, peripheral device detector, event counter, and any combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. An output component of electronic device 100 may take various forms, including, but not limited to, audio speakers, headphones, data and/or power line-outs, visual displays (e.g., for transmitting data via visible light and/or via invisible light), antennas, infrared ports, flashes (e.g., light sources for providing artificial light for illuminating an environment of the device), tactile/haptic outputs (e.g., rumblers, vibrators, etc.), taptic components (e.g., components that are operative to provide tactile sensations in the form of vibrations), and any combinations thereof.

For example, electronic device 100 may include a display as output component 112. Display 112 may include any suitable type of display or interface for presenting visual data to a user. In some embodiments, display 112 may include a display embedded in device 100 or coupled to device 100 (e.g., a removable display). Display 112 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, an organic electroluminescence display, electronic ink, or another type of display technology or combination of display technology types. Alternatively, display 112 can include a movable display or a projecting system for providing a display of content on a surface remote from electronic device 100, such as, for example, a video projector, a head-up display, or a three-dimensional (e.g., holographic) display. As another example, display 112 may include a digital or mechanical viewfinder, such as a viewfinder of the type found in compact digital cameras, reflex cameras, or any other suitable still or video camera. In some embodiments, display 112 may include display driver circuitry, circuitry for driving display drivers, or both. Display 112 can be operative to display content (e.g., media playback information, application screens for applications implemented on electronic device 100, information regarding ongoing communications operations, information regarding incoming communications requests, device operation screens, etc.) that may be under the direction of processor 102. Display 112 can be associated with any suitable characteristic dimensions defining the size and shape of the display. For example, the display can be rectangular or have any other polygonal shape, or alternatively can be defined by a curved or other non-polygonal shape (e.g., a circular display). Display 112 can have one or more primary orientations for which an interface can be displayed, or can instead or in addition be operative to display an interface along any orientation selected by a user.

It should be noted that one or more input components 110 and one or more output components 112 may sometimes be referred to collectively herein as an input/output ("I/O") component or I/O interface 111 (e.g., input component 110 and display 112 as I/O component or I/O interface 111). For example, input component 110 and display 112 may sometimes be a single I/O component 111, such as a touch screen, that may receive input information through a user's and/or stylus' touch of a display screen and that may also provide visual information to a user via that same display screen. Input component 110 of electronic device 100 may provide an input surface relative to which a system user may manipulate the orientation and position of stylus 400 to convey information to electronic device 100. In many embodiments, such an input surface of input component 110 of electronic device 100 may be provided as a portion of a multi-touch display screen assembly (e.g., as a portion of I/O interface 111 with a display output component 112). However, in other embodiments, such an input surface of input component 110 of electronic device 100 may be a non-display input surface, such as, but not limited to, a trackpad or drawing tablet, whether or not device 100 may also include a display output component. The input surface of input component 110 may be a foldable or flexible surface or display.

Processor 102 of device 100 may include any processing circuitry operative to control the operations and performance of one or more components of electronic device 100. For example, processor 102 may be used to run one or more applications, such as an application 103. Application 103 may include, but is not limited to, one or more operating system applications, firmware applications, virtual drawing space applications, stylus or other suitable accessory detection applications, media playback applications, media editing applications, pass applications, calendar applications, state determination applications (e.g., device state determination applications, stylus state determination applications, accessory state determination applications, etc.), biometric feature-processing applications, compass applications, health applications, thermometer applications, weather applications, thermal management applications, force sensing applications, device diagnostic applications, video game applications, or any other suitable applications. For example, processor 102 may load application 103 as a user interface program or any other suitable program to determine how instructions or data received via an input component 110 (e.g., due to interaction with a tip of stylus 400) and/or any other component of device 100 (e.g., stylus data from stylus 400 via communications component 106, etc.) may manipulate the one or more ways in which information may be stored on device 100 (e.g., in memory 104) and/or provided to a user via an output component 112 and/or to a remote subsystem (e.g., to stylus 400 and/or to any other electronic device or server via communications component 106). Application 103 may be accessed by processor 102 from any suitable source, such as from memory 104 (e.g., via bus 114) or from another device or server (e.g., from stylus 400 via communications component 106, and/or from any other suitable remote source via communications component 106). Electronic device 100 (e.g., processor 102, memory 104, or any other components available to device 100) may be configured to process graphical data at various resolutions, frequencies, intensities, and various other characteristics as may be appropriate for the capabilities and resources of device 100. Processor 102 may include a single processor or multiple processors. For example, processor 102 may include at least one "general purpose" micropro-cessor, a combination of general and special purpose micro-processors, instruction set processors, graphics processors, video processors, and/or related chips sets, and/or special purpose microprocessors. Processor 102 also may include on board memory for caching purposes. Processor 102 may be implemented as any electronic device capable of pro-cessing, receiving, or transmitting data or instructions. For example, process 102 can be a microprocessor, a central processing unit, an application-specific integrated circuit, a field-programmable gate array, a digital signal processor, an analog circuit, a digital circuit, or combination of such devices. Processor 102 may be a single-thread or multithread processor. Processor 102 may be a single-core or multi-core processor. Accordingly, as described herein, the term "processor" may refer to a hardware-implemented data processing device or circuit physically structured to execute specific transformations of data including data operations represented as code and/or instructions included in a pro-gram that can be stored within and accessed from a memory. The term is meant to encompass a single processor or processing unit, multiple processors, multiple processing units, analog or digital circuits, or other suitably configured computing element or combination of elements.

Stylus 400 may be any suitable accessory, digital input tool, marking tool, smart pen, smart brush, wand, chisel, user-manipulated electronic input device, hand-held input device, and/or the like that may be configured to interact with (e.g., provide input to) electronic device 100. Stylus 400 may include any suitable control circuitry or processor 402, which may be similar to any suitable processor 102 of device 100, application 403, which may be similar to any suitable application 103 of device 100, memory 404, which may be similar to any suitable memory 104 of device 100, communications component 406, which may be similar to any suitable communications component 106 of device 100, power supply 408, which may be similar to any suitable power supply 108 of device 100, input component 410, which may be similar to any suitable input component 110 of device 100, output component 412, which may be similar to any suitable output component 112 of device 100, I/O interface 411, which may be similar to any suitable I/O interface 111 of device 100, bus 414, which may be similar to any suitable bus 114 of device 100, and/or housing 401, which may be similar to any suitable housing 101 of device 100. In some embodiments, one or more components of stylus 400 may be combined or omitted. Moreover, stylus 400 may include other components not combined or included in FIG. 1. For example, stylus 400 may include any other suitable components or several instances of the com-ponents shown in FIG. 1 or only some but not all of the components shown in FIG. 1. For the sake of simplicity, only one of each of the components is shown in FIG. 1.

Moreover, as shown, system 1 may include one or more additional styli, such as one or more of styli 400a, 400b, and 400c, and/or one or more other types of accessory, such as accessory 400d, each of which may include any suitable components, such as a processor, application, memory, communications component, power supply, input compo-nent, output component, I/O interface, bus, housing, and/or the like, and may be similar to stylus 400. While each stylus of system 1 may be operative to be used with respect to an input surface of device 100 (e.g., one at a time (e.g., by a user)), each stylus of system 1 may differ from one another with respect to one or more physical characteristics (e.g., color, weight, size, shape, material, circuitry, etc.) and/or with respect to one or more device input tool characteristics (e.g., graphical object input tool characteristics) associated with the stylus as may be determined by device 100 for defining any suitable device characteristic(s) (e.g., rendered characteristic(s) (e.g., color, thickness, shape, intensity, and/ or the like) of a graphical object rendered by device 100) in response to manipulation of the stylus with respect to an input surface of device 100.

Figure 1A:
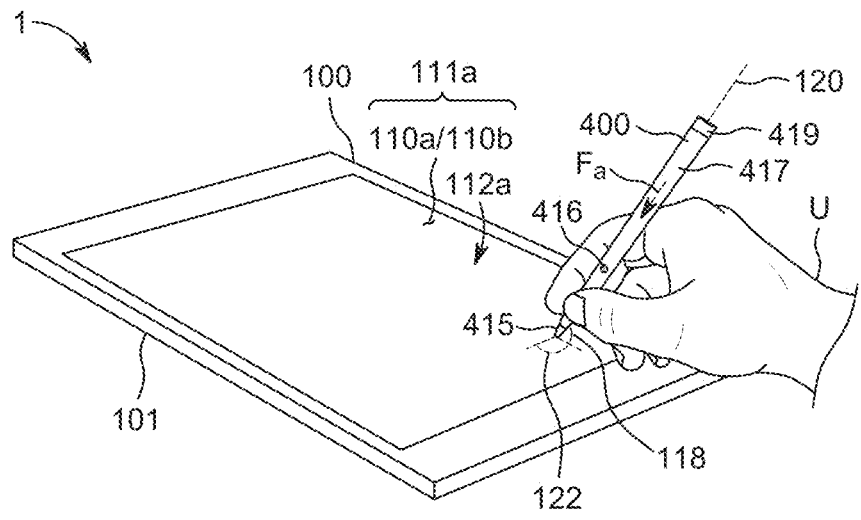
FIG. 1A is a perspective view of an exemplary power efficient stylus interacting with an input surface of an exemplary electronic device of the system of FIG. 1.
Figure 1B:
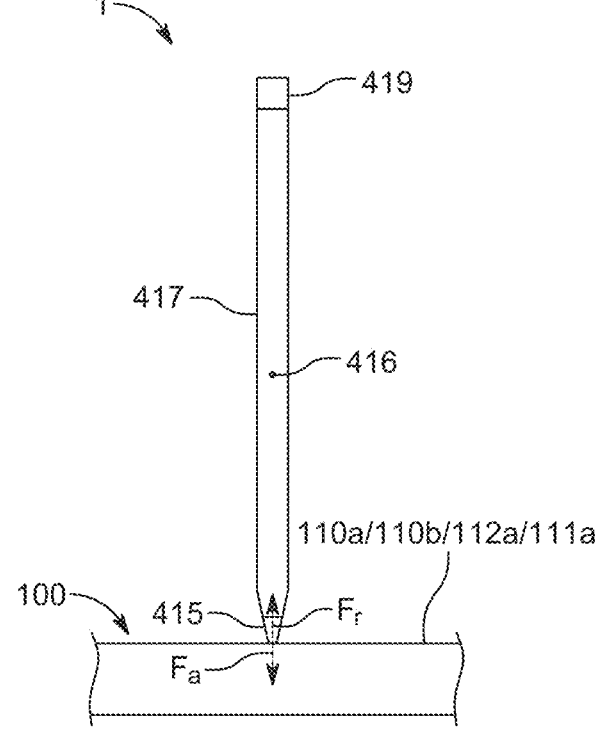
FIG. 1B is a side view of a portion of the system of FIGS. 1 and 1A with the stylus oriented normal to the input surface of the electronic device.
Figure 1C:
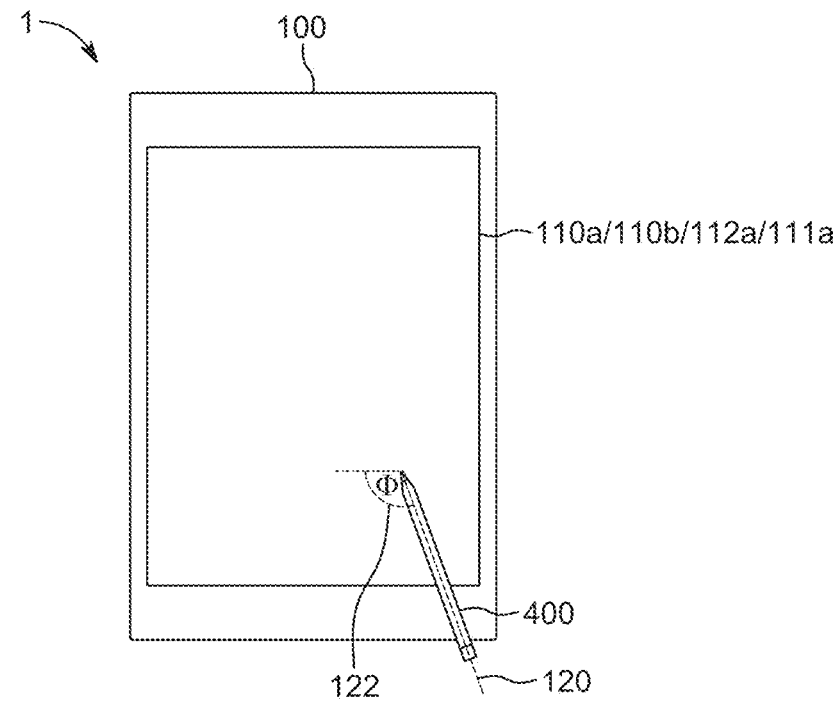
FIG. 1C is a front view of the system of FIGS. 1-1B showing the stylus oriented at an azimuthal angle of the stylus relative to a horizontal axis of the plane of the input surface of the electronic device.
Figure 1D:
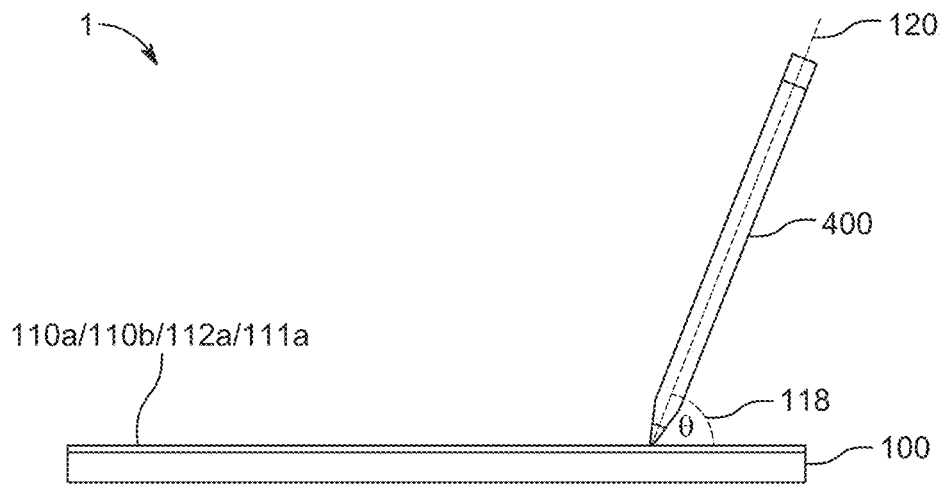
FIG. 1D is a bottom view of the system of FIGS. 1-1C showing the stylus oriented at a polar angle of the stylus relative to the plane of the input surface of the electronic device.

Generally and broadly, FIGS. 1A-ID reference user input system 1 including electronic device 100 and stylus 400. A user U manipulates the orientation and position of stylus 400 relative to input surface input component 110a (e.g., a particular input component 110) of electronic device 100 in order to convey information to electronic device 100. User input system 1 may be configured to perform or coordinate multiple operations such as, but not limited to, locating stylus 400, estimating the angular position of stylus 400, estimating the magnitude of force by stylus 400 to input surface 110*a*, determining a variable setting of a variable input component 410 of stylus 400, determining a variable setting of an application 103 running on electronic device 100 (e.g., a virtual drawing space application), and/or a combination thereof. User input system 1 can perform these and other operations at the same time or at different times. In one non-limiting example, the operation of determining the location of stylus 400 can be performed simultaneously with the operation of determining the angular position of stylus 400, while the operation of estimating the magnitude of force by stylus 400 to input surface 110*a* may be performed only periodically and/or based on whether electronic device 100 is configured to accept force input from stylus 400 given a particular operational mode of electronic device 100 (or of stylus 400) at a particular time.

FIG. 1A depicts user U gripping a barrel or handle or body portion 417 of stylus 400 extending between a front tip portion 415 of stylus 400 and a rear tip portion 419 of stylus 400. User U may slide a tip portion, such as tip portion 415, of stylus 400 across input surface 110*a* of electronic device 100 to interact with a user interface presented or rendered on display output component 112*a* of electronic device 100, which may be positioned below at least a portion of input surface 110*a* or integrated with at least a portion of input surface 110*a* to provide I/O interface 111*a* of device 100. Although, in other embodiments, it is to be understood that device 100 may not include a display output component or may not include a display output component co-located with input surface 110*a*. Input surface 110*a* may be a foldable or flexible surface or display. As shown in FIGS. 1A-1D, device 100 may be presented as a tablet computing device as an example only, while many other electronic devices (with or without displays positioned below a stylus input surface) are envisioned. For example, the electronic device of user input system 1 can be implemented as a peripheral input device, a trackpad, a drawing tablet, and the like.

Stylus 400 may take various forms to facilitate use and manipulation by user U. In the illustrated example of FIGS. 1A-1D, stylus 400 may have a general form of a writing instrument, such as a pen or a pencil with a cylindrical body 417 with two ends, such as a first end terminated at front portion 415 and a second end terminated at rear portion 419. Either one or both of portions 415 and 419 can be removable and/or replaceable (e.g., by a user), affixed to body 417, or an integral part of body 417. User U may slide front portion 415 of stylus 400 across input surface 110*a* to convey information to electronic device 100. Electronic device 100 can interpret the user's manipulation of stylus 400 in any implementation-specific and suitable manner.

Body 417 of stylus 400 can be formed from any number of suitable materials, such as from plastics, metals, ceramics, laminates, glass, sapphire, wood, leather, synthetic materials, dielectric material, or any other material or combination of materials. Body 417 can form an outer surface (or partial outer surface) and protective case for one or more internal components of stylus 400 (e.g., as a portion of housing 401). Body 417 can be formed of one or more components operably connected together, such as a front piece and a back piece or a top clamshell and a bottom clamshell. Alternatively, body 417 can be formed of a single piece (e.g., uniform body or unibody). In some embodiments, body 417 may be configured, partially or entirely, as an optical signal diffuser to diffuse an infrared signal or another optical signal such as the light emitted from a multi-color light-emitting diode. In other cases, body 417 may be configured, entirely or partially, as an antenna window, allowing for wireless communications and/or electric fields to pass therethrough. Body 417 can be formed from a material doped with an agent configured to provide body 417 with a selected color, hardness, elasticity, stiffness, reflectivity, refractive pattern, texture, and so on. In other examples, the doping agent can confer other properties to body 417 including, but not necessarily limited to, electrical conductivity and/or insulating properties, magnetic and/or diamagnetic properties, chemical resistance and/or reactivity properties, infrared and/or ultraviolet light absorption and/or reflectivity properties, visible light absorption and/or reflectivity properties, antimicrobial and/or antiviral properties, olcophobic and/or hydrophobic properties, thermal absorption properties, pest repellant properties, colorfast and/or anti-fade properties, antistatic properties, liquid exposure reactivity properties, and so on.

Body 417 can exhibit a constant or a variable diameter cross-section. As illustrated, for example, the cylindrical cross-section view of body 417 may maintain a substantially constant diameter from tip portion 415 to rear portion 419. In other embodiments, body 417 can include a variable cross-section (e.g., a "profile" of body 417 can change across the length of body 417). In one example, the diameter of body 417 may be smaller near tip portion 415 than at rear portion 419. In some examples, the diameter of body 417 may bulge outward in the middle of body 417 between portions 415 and 419. In some cases, the profile of body 417 can follow a mathematical function such as a bump function, a Gaussian function, or a step function. Body 417 may include one or more grip features (not shown) such as embossments or impressions, closely-spaced channels, protrusions, projections, and/or the like. In some cases, a grip feature can be formed from a different material than body 417 (e.g., grip feature(s) may be formed from a polymer material exhibiting high friction).

Although illustrated as a cylinder, body 417 need not take a cylindrical shape in all embodiments. Accordingly, as used herein, the term "diameter" may refer to the linear distance that can connect two points of a two-dimensional shape, whether the shape is circular or otherwise. For example, stylus 400 can include a body 417 with an n-sided polygonal cross-section (e.g., a vesica piscis cross-section, a triangular cross-section, a square cross-section, a pentagonal cross-section, and so on) that either varies in diameter or is constant in diameter. In some examples, a cross-section of body 417 may be axially symmetric, although this is not required, as certain styluses in accordance with embodiments described herein may include body 417 with a cross-section that is reflectionally symmetric along one axis while being reflectionally asymmetric along another. In still further examples, body 417 can be formed into an ergonomic shape, including grooves, indents, and/or protrusions configured to enhance the comfort of user U. In some cases, body 417 may include a tapered section that decreases in diameter, linearly or non-linearly, toward tip portion 415. The diameter of body 417 at the interface of body 417 and tip portion 415 may be substantially similar to the diameter of tip portion 415 at that location. In this manner, the external surfaces of portions 415 and 417 may form a substantially continuous external surface of housing 401 of stylus 400. Additionally or alternatively, the diameter of body 417 at the interface of body 417 and rear portion 419 may be substantially similar to the diameter of rear portion 419 at that location. In this manner, the external surfaces of portions 417 and 419 may form a substantially continuous external surface of housing 401 of stylus 400.

One or more of portions 415, 417, and 419 of stylus 400 can define one or more apertures 416 in which one or more input components 410 and/or one or more output components 412 of stylus 400, such as a button, a dial, a slide, a force pad, a touch pad, audio component, haptic component, and the like, may at least partially reside and/or through which such component(s) may be at least partially exposed. The apertures (and, correspondingly, the input/output components associated therewith) can be defined at a lower end of body 417 nearby tip portion 415, such that the input/output components may be conveniently located near where user U may rest the user's forefinger when grasping stylus 400. As one example, an aperture 416 may expose at least a portion of a simple mechanical switch or button input component 410 that may be manipulated by user U for adjusting a variable setting of stylus 400 (e.g., stylus 400 may be configured to operate in a first mode when such an input component is manipulated in a first manner and in a second mode when such an input component is manipulated in a second manner (e.g., to select different patterns of stylus 400b described herein)).

Rear portion 419 of stylus 400, or more generally a "cap" of stylus 400, may be configured to provide a cosmetic end to body 417. In some cases, rear portion 419 may be formed integrally with body 417. In some cases, rear portion 419 may be formed similarly to front portion 415 for providing another tip feature for interacting with an input surface of device 100 (e.g., stylus 400 may be flipped over by user U to drag portion 419 across input surface input component 110a of electronic device 100 rather than to drag portion 415 across input surface input component 110a of electronic device 100, which may enable different user-selectable interactions with device 100). Any portion or the entirety of rear portion 419 may expose or provide at least a portion of a simple mechanical switch or button or any other suitable input component 410 that may be manipulated by user U for adjusting a variable setting of stylus 400 (e.g., stylus 400 may be configured to operate in a first mode when such an input component is manipulated in a first manner and in a second mode when such an input component is manipulated in a second manner (e.g., to select different patterns of stylus 400b described herein)).

Tip portion 415 of stylus 400, or more generally a "tip" of stylus 400, may be configured to contact or nearly contact input surface 110a of device 100 in order to facilitate interaction between user U and device 100. Tip 415 may taper to a point, similar to a pen, so that user U may control stylus 400 with precision in a familiar form factor. In some examples, tip 415 may be blunt or rounded, as opposed to pointed, or may take the form of a rotatable or fixed ball. Tip 415 may be formed from a softer material than input surface 110a. For example, tip 415 can be formed from a silicone, a rubber, a fluoro-elastomer, a plastic, a nylon, conductive or dielectric foam, a brass or metal ball with a polymer coating or dielectric coating (e.g., a thin coating with a high dielectric constant) or any other suitable coating, or any other suitable material or combination of materials. In this manner, drawing of tip 415 across input surface 110a may not cause damage to input surface 110a or layers applied to input surface 110a, such as, but not limited to, anti-reflective coatings, olcophobic coatings, hydrophobic coatings, cosmetic coatings, ink layers, and the like. Tip 415 can be configured to be removably attached to body 417, such as via threadings/screws, detents and/or recesses, interference-fit or snap-fit, and/or magnetic attraction, and/or the like, and electrically coupled capacitively, such as through a pogo-pin, spring, and/or the like.

Electronic device 100 may locate and/or estimate the angular position of stylus 400 substantially in real time. Device 100 can perform these operations with and/or without communications from stylus 400. As shown in FIGS. 1A-ID, device 100 may be depicted as a tablet computing device, although this form-factor is not required of all embodiments (as noted above). For example, device 100 can be any suitable device, such as a desktop computer, laptop computer, cellular phone, an industrial or commercial computing terminal, a medical device, a peripheral or integrated input device, a hand-held or battery powered portable electronic device, a navigation device, a wearable device, and so on. Display output component 112a may be positioned below input surface 110a or may be integrated with input surface 110a.

The communication interfaces, whether between electronic device 100 and stylus 400 or between device 100 and another device or server, or otherwise, can be implemented as capacitive coupling interfaces (e.g., via I/O interfaces 111 and 411 (e.g., as capacitive coupling interface data 51 (e.g., signal(s) received by or adjusted by or made available by one of the interfaces to the other interface))), inductive interfaces, resonant interfaces, optical interfaces, acoustic interfaces, magnetic interfaces, wireless interfaces, Bluetooth interfaces (e.g., via communication components 106 and 406 (e.g., as wired/wireless communication interface data 56)), universal serial bus interfaces, Wi-Fi interfaces, TCP/IP interfaces, network communications interfaces, or any other suitable communication interfaces. In some embodiments, stylus 400 may not be configured to communicate with device 100 via any communication component interfaces (e.g., stylus 400 may not be provided with any communications component (e.g., no communications component 406) but may still communicate with device 100 using any suitable I/O interface 411 (e.g., via I/O interfaces 111 and 411 (e.g., as capacitive coupling interface data 51)))). Electronic device 100 may provide information related to externally connected or communicating devices and/or software executing on such devices, messages, video, operating commands, and so forth (and may receive any of the foregoing from an external device), in addition to communications. Input surface 110a may cooperate with housing 101 of device 100 to form an external surface thereof. In some cases, a front surface of input surface 110a can be flush with an external surface of housing 101, although this is not required of all embodiments. In some examples, input surface 110a may stand proud of at least a portion of housing 101. Input surface 110a may be formed from glass or another suitable material, such as plastic, sapphire, metal, ceramic, ion-implanted glass, and so on. In some cases, input surface 110a may be a solid material, whereas in other cases, input surface 110a may be formed by laminating or adhering several materials together. Display component 112a may be positioned below, or integrated with, input surface 110a, where device 100 may utilize display 112a to render images to convey information to the user. Display 112a can be configured to show text, colors, line drawings, photographs, animations, video, and the like. Input surface 110a and/or display 112a may provide a foldable or flexible surface or display.

Device 100 can also include a sensor layer input component 110b positioned below, or integrated with, input surface 110a and/or display 112a, where device 100 may utilize the sensor layer to, among other purposes, detect the presence and/or location of stylus 400 on input surface 110a. In other examples, device 100 may utilize sensor layer 110b to detect the presence of another object on input surface 110a, such as a finger of the user. In still further examples, device 100 may utilize sensor layer 110b to detect the force with which an object, such as stylus 400, presses on input surface 110a. Such a sensor layer 110b (e.g., of input surface input component 110a) can be optically transparent or opaque. If sensor layer 110b of a particular embodiment is disposed within display 112a, sensor layer 110b may be optically transparent so as to not impact the clarity of the display. In another example, sensor layer 110b may be disposed around the perimeter of the display, positioned below a bezel surrounding the display, and/or the like. In this embodiment, sensor layer 110b need not be optically transparent. Input surface 110a and/or sensor layer 110b may provide at least a portion of a foldable or flexible surface or display. Sensor layer 110b may be a metallic grid that may be positioned between and not blocking one or more light-emissive elements of I/O interface 111a (e.g., for providing on-cell or in-cell electrodes). Additionally or alternatively, electrodes of sensor layer 110b could be shared with display electronics of I/O interface 111a (e.g., for providing in-cell electrodes).

Next, reference is made to the operation of locating stylus 400 on input surface 110a of device 100 using sensor layer 110b of device 100. Device 100 can locate an interface portion, such as tip 415, of stylus 400, and estimate the Cartesian coordinates thereof, in a number of suitable ways. In typical embodiments, stylus 400 is located as a result of cooperation between stylus 400 and device 100. Generally and broadly, stylus 400 may be operative to generate and/or adjust (e.g., using any suitable I/O interface or I/O component or I/O circuitry 411) an electric field (e.g., an electric field having a small effective diameter along input surface 110a, or an electric field where potential lines may be nearly spheres but where the electric field lines may be strongly curved but not circular). This "stylus electric field" (e.g., as adjusted and/or generated (e.g., caused) by stylus 400) may be provided by a stylus interface portion (e.g., tip 415) and may intersect input surface 110a when the stylus interface portion of stylus 400 is placed on or near surface 110a. Device 100 may detect the stylus electric field and estimate the location of stylus 400 (e.g., of the stylus interface portion (e.g., tip 415) based on the location (and/or area) at which the stylus electric field is detected). Sensor layer 110b may be configured to detect stylus electric fields caused by stylus 400, where layer 110b may include a number of capacitance sensing nodes that can be located on or between any suitable layer on or within display 112a and/or on or within input surface 110a. The capacitive sensing nodes may be formed, at least in part, from an optically transparent conductor, such as, but not limited to, metal oxides such as indium-tin oxide and antimony-tin oxide, nanowire patterns formed from silver nanowire, carbon nanotubes, platinum nanowire, gold nanowire, and so on, thin deposits of metal, and the like. The capacitive sensing nodes may be configured to operate in any suitable capacitance mode or projected capacitance touch ("PCT") mode, such as a self-capacitance mode, a mutual capacitance mode, or any other suitable capacitance mode or combination thereof, thereby capacitively coupling to stylus 400 and detecting signals and fields caused by stylus 400.

Stylus 400 may cause a substantially-spherical or hemispherical or any other suitably shaped stylus electric field to be provided thereby (e.g., from tip 415 by I/O circuitry 411). This stylus field may affect the capacitance (e.g., mutual capacitance or self-capacitance) of each capacitive sensing node nearby the stylus interface portion. Device 100 may locate stylus 400 on input surface 110a by monitoring each capacitive sensing node or an appropriate set of capacitive sensing nodes for these capacitive changes and estimating the location at which such changes (if any) have occurred. As used herein, the term "tip signal" may generally refer to an electrical signal provided by or received by stylus 400 at the stylus interface portion (e.g., tip 415). As used herein, the term "tip field" may generally refer to the stylus electric field provided by the stylus interface portion (e.g., tip 415) in response to the tip signal. The tip field may take any suitable shape, but in many embodiments, the tip field takes a substantially spherical (or hemispherical) shape and may be modeled as a point source monopole electric field. The area of input surface 110a (or a plane parallel to input surface 110a) intersected by the tip field may be generally referred to herein as the "tip field intersection area," which may be any suitable shape, such as substantially circular. A perimeter of the tip field intersection area may be defined as the boundary after which the power density (e.g., magnitude) of the tip field received by electronic device 100 may be below a selected threshold. In one example, the circumference of the tip field intersection area may be defined at the half-power point of the tip field. In other words, in this example, the tip field intersection area may be defined as a portion of input surface 110a intersected by the tip field with a magnitude at least greater than half of the power at which that field was provided. A charge footprint (e.g., charge profile) may be counted out as far as it is above a noise floor.

The tip signal can have at least one alternating current component that, via capacitive coupling or another suitable sensing technique, may be received (e.g., as the tip field) by the sensor layer of the electronic device. Many embodiments are described herein with reference to a sensor layer 110b of electronic device 100 that may be configured to detect the tip signal by monitoring mutual capacitance. However, it may be appreciated that electronic device 100 can be appropriately configured in any implementation-specific manner to detect the tip field. For example, electronic devices can include a sensor layer configured to monitor for changes in the self-capacitance of one or more capacitive sensor nodes. In other examples, an electronic device can be configured to operate in both a self-capacitance mode and a mutual capacitance mode. In other embodiments, other sensing techniques can be used to determine the location and relative position of the tip field. As noted above, sensor layer 110b can also be used to detect one or more fingers or the palm or the like of user U while simultaneously detecting the tip field. In these cases, electronic device 100 can accept both touch input and stylus input.

In many cases, processor 102 of device 100 may be configured to detect the tip signal received through sensor layer 110b from stylus 400 via capacitive coupling. Processor 102 may be configured to demodulate, decode, or otherwise filter one or more raw signals received from sensor layer 110b and/or from any other sensor/input component in order to obtain the tip signal, and/or data that may be modulated therewith and/or any other suitable data. The operation of obtaining the tip signal, as performed by processor 102 (or another component communicably coupled to sensor layer 110b), can be accomplished in a number of implementation-specific ways, suitable for any number of embodiments. Processor 102 may perform (or assist with the performance of) the operation of locating stylus 400 on input surface 110a employing any suitable techniques once the tip signal is obtained, and the tip field intersection area is determined. Processor 102 can further use such information for further processing and interpretation once the location of stylus 400 is estimated.

In many embodiments, processor 102 may be configured to obtain estimations of the location of stylus 400 within certain statistical bounds (e.g., within an error of 100 micrometers, within 50 micrometers, within 10 micrometers, or any other suitable bounds). One may appreciate that the accuracy and/or precision of the operation of locating stylus 400 by device 100 may differ from embodiment to embodiment. In some cases, the accuracy and/or precision of the operation(s) may be substantially fixed, whereas in other cases, the accuracy and/or precision of the operation(s) may be variable depending upon, among other variables, a user setting, a user preference, a speed of the stylus, an acceleration of the stylus, a setting of a program 103 operating on electronic device 100, a setting of electronic device 100, an operational mode of electronic device 100, a power state of device 100, a power state of stylus 400, an identification of a setting or characteristic of stylus 400, and so on.

The tip signal can include certain information and/or data that may be configured to identify stylus 400 to electronic device 100. Such information may generally be referred to herein as "stylus identity" information (e.g., information indicative of a particular stylus tip of stylus 400a with a particular harmonic and/or phase as described herein). This information and/or data may be received by sensor layer 110b and interpreted, decoded, and/or demodulated by processor 100 of device 100. Processor 102 may utilize stylus identity information (or an absence thereof) in any suitable manner including, but not limited to, accepting or rejecting input from a particular stylus, accepting input from multiple styli and/or from a single stylus, permitting or denying access to a particular functionality of the electronic device, applying a particular stylus profile, restoring one or more settings of the electronic device, notifying a third party that the stylus is in use, applying a setting to the electronic device, applying a setting to a program operating on the electronic device (e.g., which may include updating a user interface on display 112a or otherwise of device 100), changing a line thickness, color, pattern, erasure, and so on of a graphical object to be rendered by a graphics program of the electronic device, changing a setting of a video game operating on the electronic device, and so on. Processor 102 may be operative to receive stylus identity information for stylus 400. Additionally or alternatively, processor 102 may be operative to receive stylus identity information from each one of two different styluses that may be interacting with device 100. For example, processor 102 may be operative to determine that a first detected stylus is positioned 3 centimeters away from a second detected stylus, which may be communicated via display 112a to the user(s) in any suitable manner. Additionally or alternatively, any suitable data communicated from stylus 400 may be operative to include certain information and/or data that may serve to identify a particular setting or preference of the user or of the stylus (e.g., a current setting of a variable input component or other suitable reconfigurable characteristic of the stylus (e.g., data indicative of a particular property of an input component 410 of stylus 400)), where such information may generally be referred to herein as "stylus setting" information (e.g., information indicative of a particular pattern of stylus 400b as described herein). Processor 102 may be operative to use stylus setting information (or an absence thereof) in any suitable manner including, but not limited to, applying a setting to the electronic device, applying a setting to a program operating on the electronic device (e.g., which may include updating a user interface on display 112a or otherwise of device 100), changing a line thickness, color, pattern, erasure, and so on of a graphical object to be rendered by a graphics program of the electronic device, changing a setting of a video game operating on the electronic device, and so on.

A stylus of system 1 may not be provided with any power supply (e.g., no battery or any other suitable power supply like power supply 408), such that the stylus may not be operative to generate any stylus electric field independently (e.g., without being stimulated by an external stimulus). Instead, a stylus may be provided with limited stylus I/O circuitry that may be operative to be stimulated by an external stimulus, such as a device stimulus that may be generated by device I/O circuitry of device I/O interface 111a of electronic device 100 and that may be operative to stimulate the stylus I/O circuitry when located proximate to device I/O interface 111a and/or by user U when holding stylus 400, whereby that stimulation of the stylus I/O circuitry may be operative to enable the stylus I/O circuitry to provide any suitable stylus electric field that may then be detected by device 100 for estimating the location of the stylus. Not only may such stylus I/O circuitry be configured to require no internal power supply for providing a unique stylus electric field, but also such stylus I/O circuitry, when stimulated, may be configured to provide a stylus electric field that may be distinguishable by device 100 from an electric field that may be provided by a user's direct contact with device I/O interface 111a.

Figure 2:
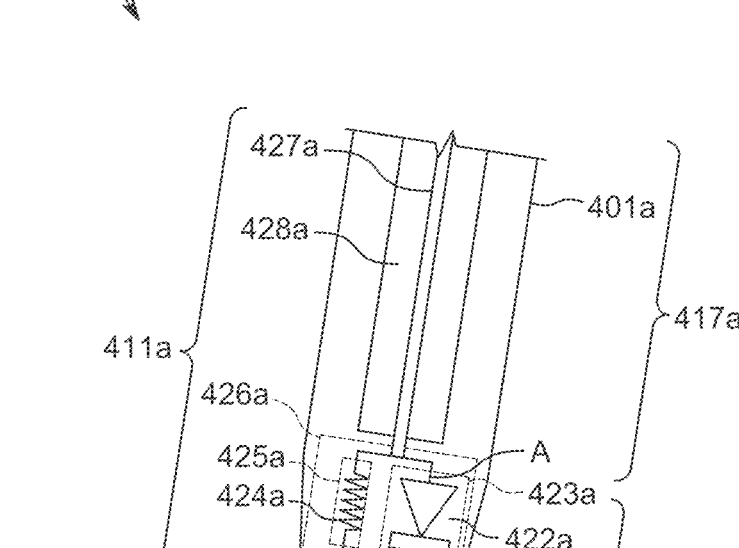
FIG. 2 is a partially transparent, semi-schematic view of an illustrative portion of a stylus of the system of FIGS. 1-1D.
Figure 2A:
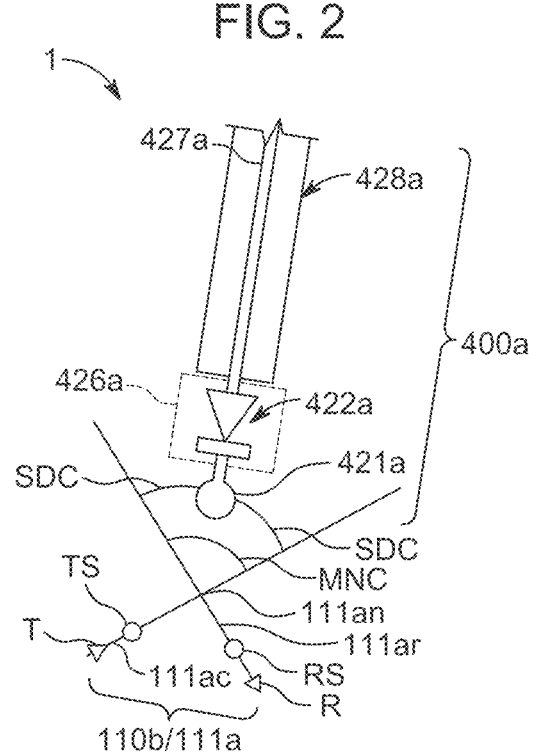
FIG. 2A is a schematic view of a portion of the system using a portion of a stylus of FIGS. 1-1D and 2.
Figure 2B:
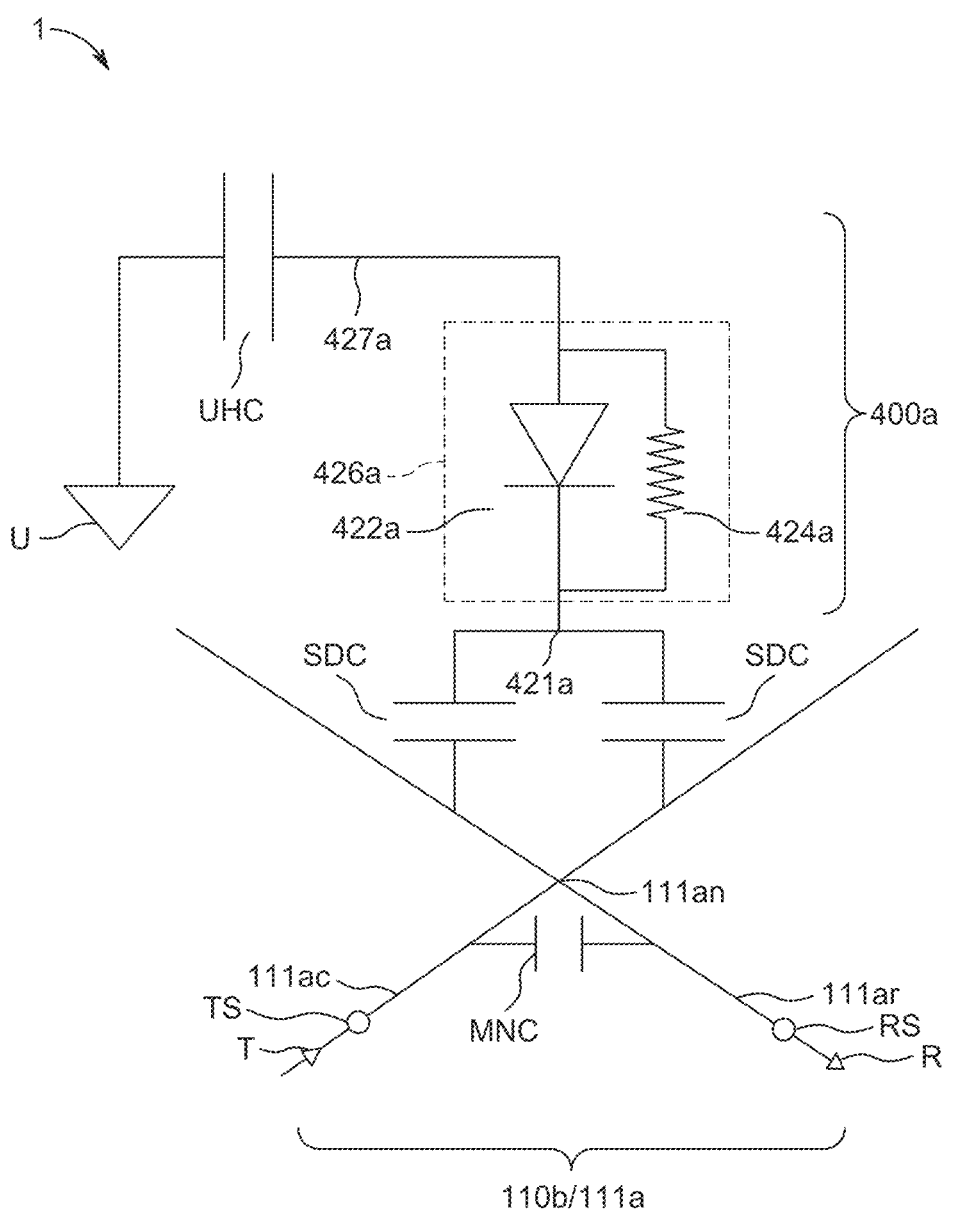
FIG. 2B is a circuit diagram of the portion of the system using the portion of the stylus of FIGS. 1-2A.
Figure 2C:
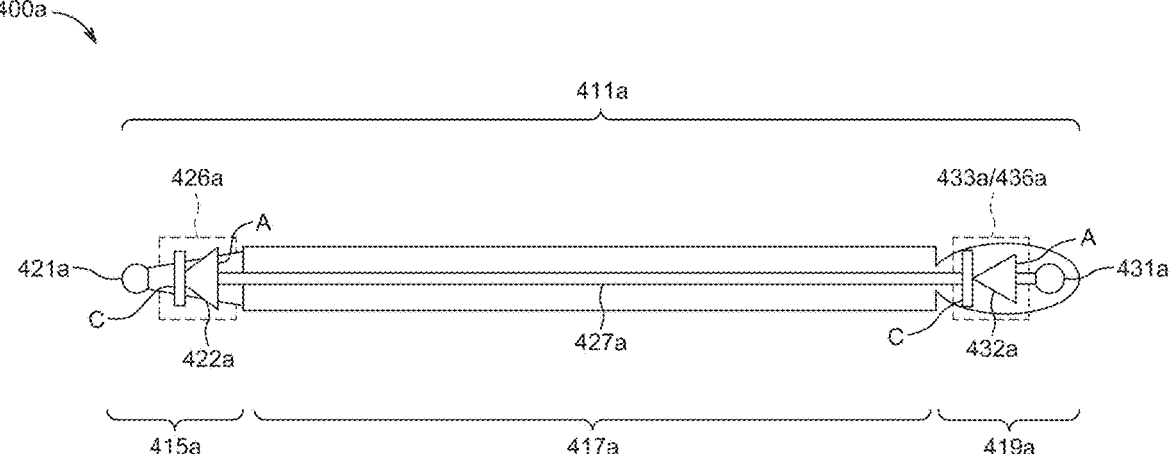
FIG. 2C is a partially transparent, semi-schematic view of the stylus of FIGS. 1-2B.
Figure 2D:
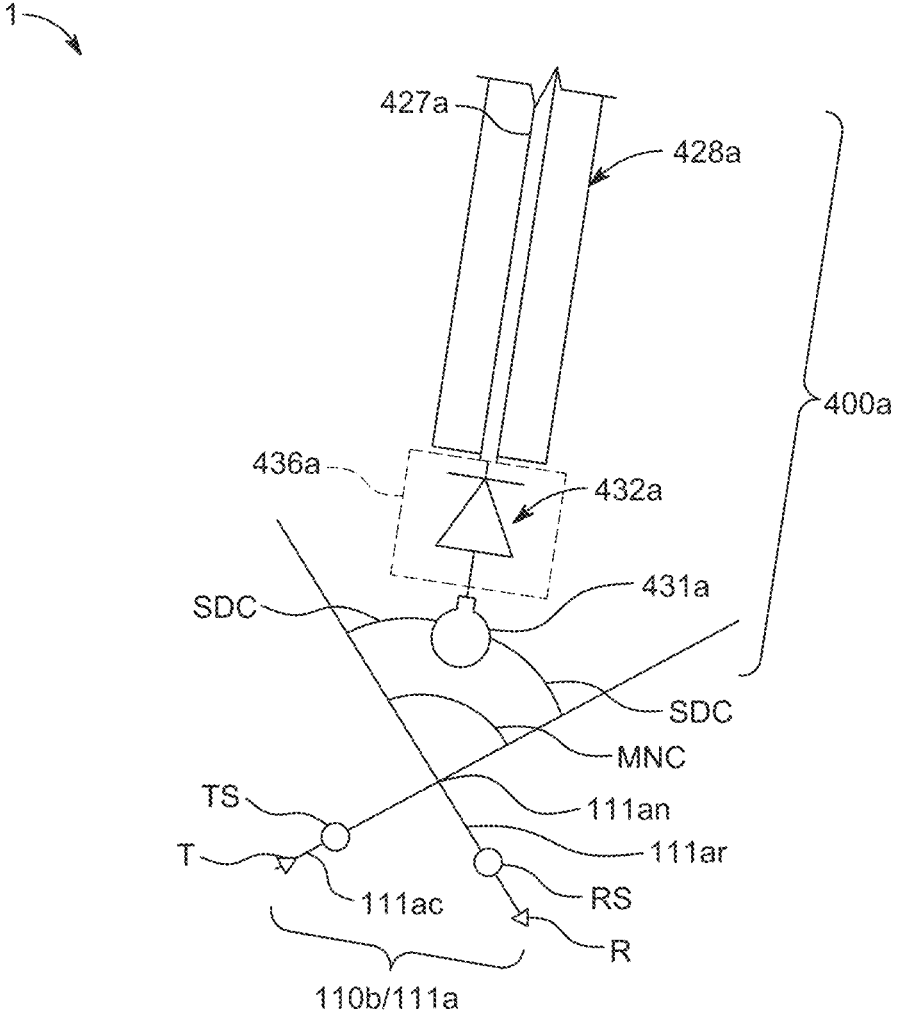
FIG. 2D is a schematic view of the portion of the system using another portion of the stylus of FIGS. 1-2C.
Figure 2E:
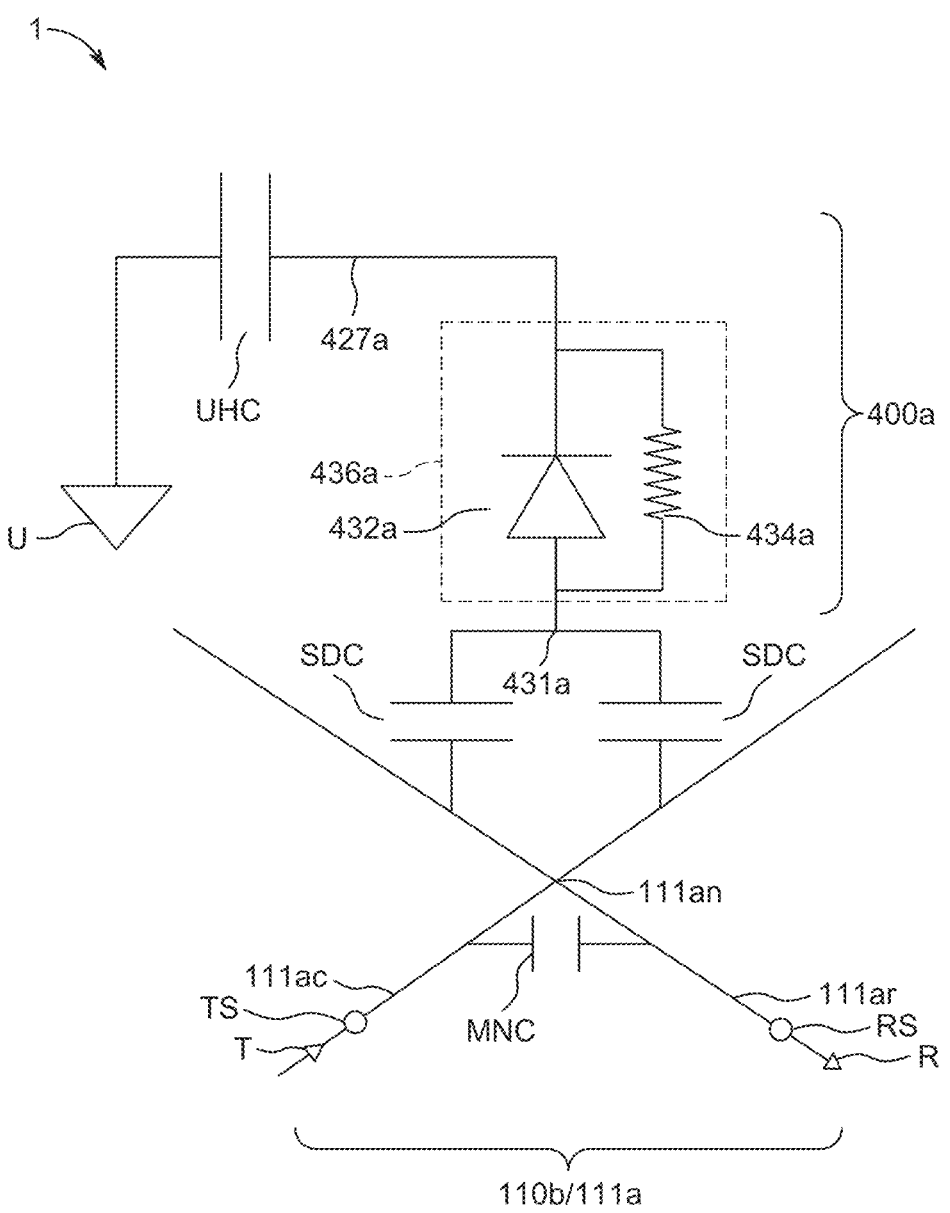
FIG. 2E is a circuit diagram of the portion of the system using the other portion of the stylus of FIGS. 1-2D.
Figure 2F:
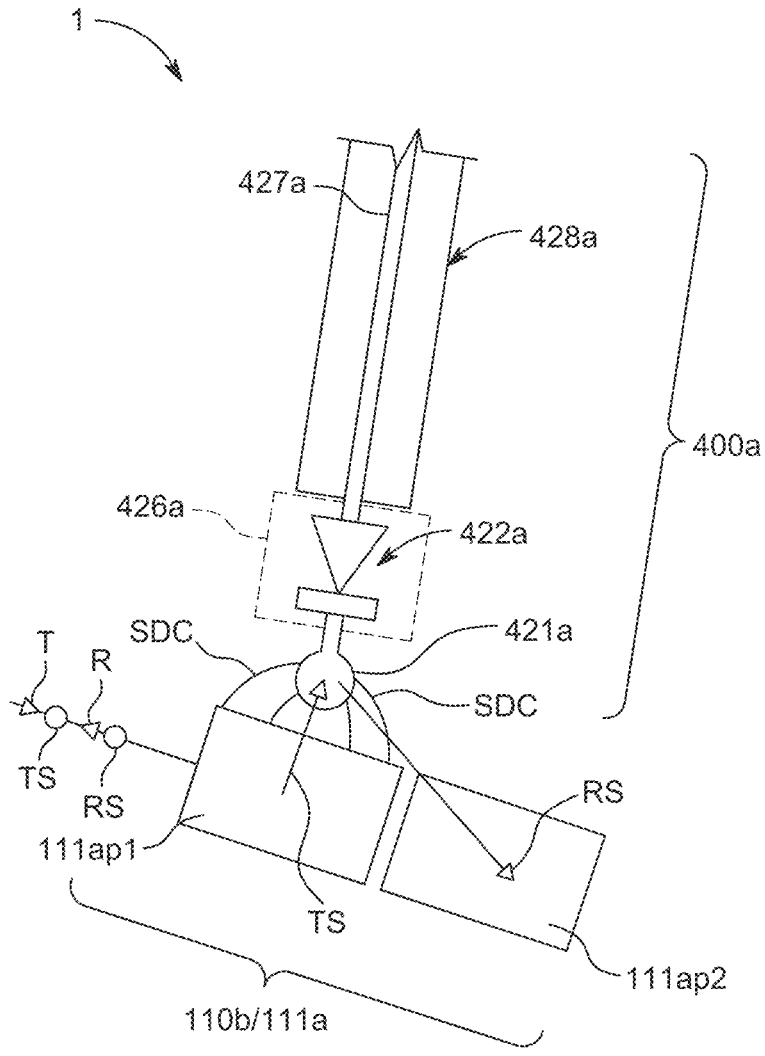
FIG. 2F is a schematic view of another portion of the system using the portion of the stylus of FIGS. 1-2E.
Figure 2G:
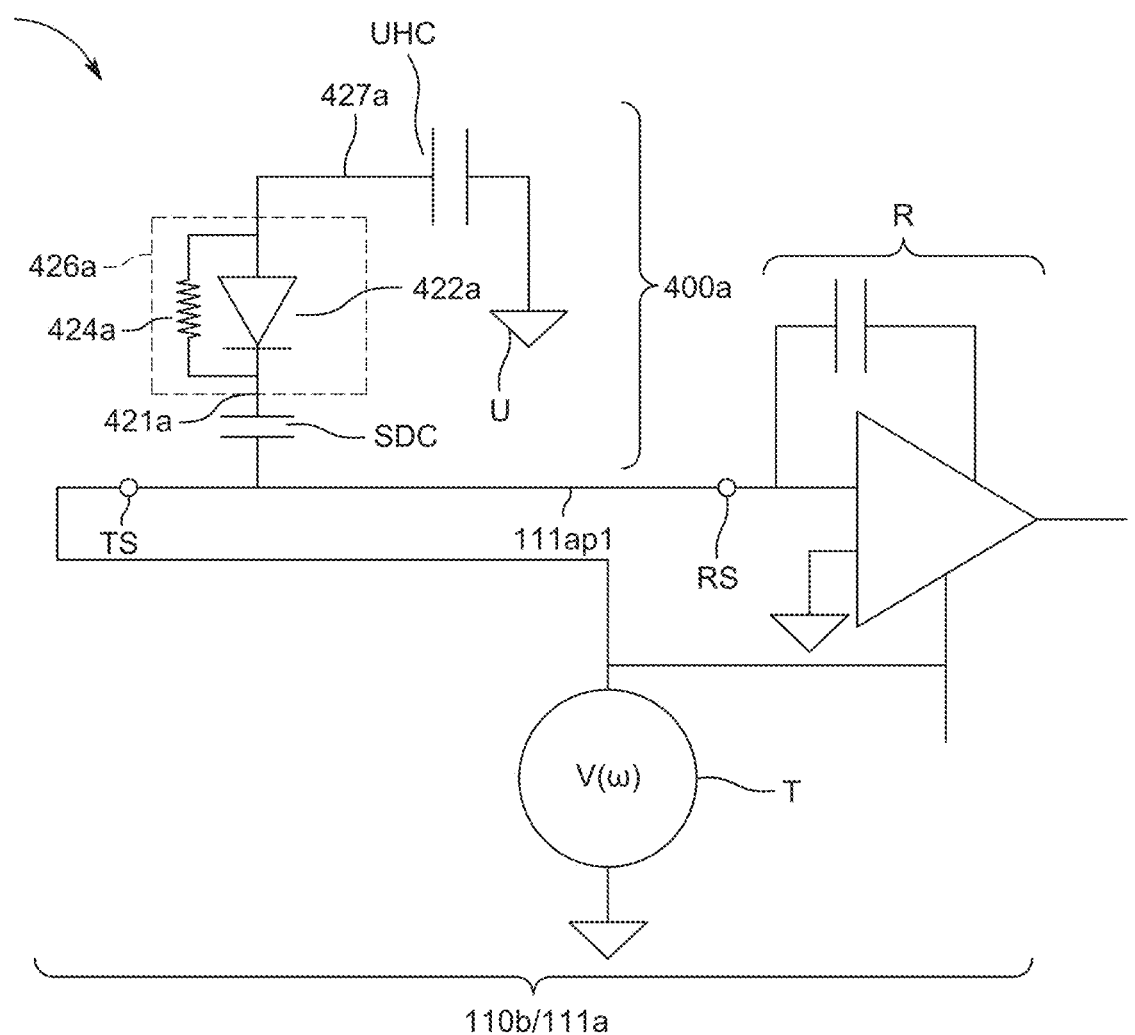
FIG. 2G is a circuit diagram of the other portion of the system using the portion of the stylus of FIGS. 1-2F.

For example, FIGS. 2-2G illustrate stylus 400a, alone and/or in combination with device 100 of system 1, that may include stylus I/O circuitry 411a, where stylus I/O circuitry 411a may be operative to be stimulated only by external stimulus, such as a device stimulus that may be generated by device I/O circuitry of device I/O interface 111a of electronic device 100 and/or by user U when holding stylus 400a, whereby that stimulation of stylus I/O circuitry 411a may be operative to enable stylus I/O circuitry 411a to provide any suitable stylus electric field that may then be detected by device 100 for estimating the location of stylus 400. As shown by FIGS. 2 and 2C, for example, stylus 400a may include a barrel or handle or body portion 417a extending between a front tip portion 415a and a rear tip portion 419a, where body portion 417a may be configured to be held by user U as the user may slide a tip portion of stylus 400 across input surface 110a of device I/O interface 111a of device 100.

Stylus I/O circuitry 411a may include body stylus circuitry 427a that may be electrically coupled to front tip stylus circuitry 426a and/or to rear tip stylus circuitry 436a. Body stylus circuitry 427a may be any suitable circuitry that may be operative to be electrically coupled (e.g., capacitively coupled) to user U when user U is holding stylus 400a about at least a portion of body portion 417a. As shown in FIGS. 2 and 2C, for example, body stylus circuitry 427a may be at least one conductive wire extending along at least a portion of a length of body portion 417a of stylus 400a, which may be insulated by any suitable insulation 428a. Alternatively, body stylus circuitry 427a may be provided by a conductive (e.g., copper) tape along a portion of body 417a, where such tape may be positioned under any suitable insulation, such as a finger pad of any suitable material. Any suitable housing 401a may be provided to protect body stylus circuitry 427a, such as a plastic housing. In some embodiments, such a housing may be operative to provide insulation 428a. Additionally or alternatively, at least a portion of body stylus circuitry 427a may be at least partially exposed via housing 401a and/or insulation 428a for enabling direct contact by user U. When user U is holding stylus 400a about and/or along a portion of body 417a, a capacitance or user-handle capacitor UHC may be inherently formed (e.g., as shown in FIGS. 2B, 2E, and 2G). The capacitance of user-handle capacitor UHC may be relatively large compared to a panel to tip capacitance (e.g., electric field response capacitances SDC between front tip interface component 421a and each one of array trace row 111ar and array trace column 111ac of one or more nodes 111an proximate front tip interface component 421a), but not so large that electrostatic discharges would be likely to damage the device. For example, the capacitance of user-handle capacitor UHC may be any suitable capacitance, such as a capacitance in the range of 1.0 picofarad to 10.0 picofarads, as a panel to tip capacitance may be in the range of 50.0 femtofarads to 200.0 femtofarads. The capacitance of user-handle capacitor UHC may be able to stand off the voltage of typical electrostatic discharge impulses (e.g., 10 kilovolts or so).

Stylus I/O circuitry 411a may include a front tip interface component 421a that may provide at least a portion of front tip portion 415a. Front tip interface component 421a may be the portion of stylus 400a configured to directly interface with device I/O interface 111a. For example, front tip interface component 421a may be formed from any suitable material, including, but not limited to, silicone, rubber, fluoro-elastomer, plastic, nylon, conductive or dielectric foam, metal (e.g., brass (e.g., a brass ball with a dielectric or polymer coating (e.g., a thin coating with a high dielectric constant))), or any other suitable material or combination of materials. In this manner, drawing of front tip interface component 421a across input surface 110a may not cause damage to input surface 110a or layers applied to input surface 110a, such as, but not limited to, anti-reflective coatings, olcophobic coatings, hydrophobic coatings, cosmetic coatings, ink layers, and the like. Front tip interface component 421a can be configured to be removably attached to body 417a, such as via threadings/screws, detents and/or recesses, interference-fit or snap-fit, and/or magnetic attraction, and/or the like, and electrically coupled capacitively, such as through a pogo-pin, spring, and/or the like. Transit of any stylus electric field may be provided from front tip interface component 421a and not from other portions of stylus I/O circuitry 411a. Front tip interface component 421a may be any suitable shape, such as a sphere or hemisphere or spherical cap, of any suitable size. For example, in some particular embodiments, front tip interface component 421a may be provided as a ball (e.g., a solder ball and/or brass ball) of any suitable diameter, such as 2 millimeters or 3.6 millimeters in diameter, or in the range of 1.7 millimeters to 2.3 millimeters, or in the range of 3.3 millimeters to 3.9 millimeters, or, as one example, a brass or metal ball with a diameter of 3.6 millimeters and with a coating thereabout of about 0.2 millimeters thickness. Front tip interface component 421a may be a metal or brass ball with a coating or a conductive polymer ball shape, with a total diameter of about 3.4 millimeters or 3.0 millimeters or 2.4 millimeters or 2.0 millimeters. Front tip interface component 421a may be configured to provide the same footprint area (e.g., tip field intersection area (e.g., of charge)) on input surface 110a no matter (e.g., substantially no matter) the angle of axis 120 with respect to a plane of input surface 110a. The size of front tip interface component 421a may be made as small as possible to enable precise localization of front tip portion 415a with respect to device I/O interface 111a.

Front tip stylus circuitry 426a may be positioned between and electrically coupled to each one of front tip interface component 421a and a portion (e.g., a front end) of body stylus circuitry 427a. Front tip stylus circuitry 426a may be configured as any suitable circuitry that may be operative to provide a non-linear load between body stylus circuitry 427a and front tip interface component 421a when user U is holding body 417a of stylus 400a such that front tip interface component 421a of stylus 400a may be stimulated by a device stimulus that may be generated by device I/O circuitry of device I/O interface 111a of electronic device 100. For example, front tip stylus circuitry 426a may include any suitable non-linear electrical circuitry 423a that may be electrically coupled (e.g., in series) between front tip interface component 421a and body stylus circuitry 427a. Non-linear electrical circuitry 423a may include any suitable number of any suitable type(s) of non-linear electrical elements, such as at least one diode 422a. Diode 422a may be any suitable type of diode, such as a Schottky diode, a transistor in diode configuration (e.g., a diode connected transistor), and/or the like. In some embodiments, non-linear electrical circuitry 423a may include any suitable number (e.g., two or three or four or more) of diodes 422a that may be coupled together in series (e.g., a cathode of one diode may be coupled to an anode of a next diode and/or the like) or in parallel. Alternatively, as shown, only a single diode 422a may be provided by non-linear electrical circuitry 423a, where an anode A of diode 422a may be electrically coupled to body stylus circuitry 427a and where a cathode C of diode 422a may be electrically coupled to front tip interface component 421a.

Device I/O circuitry of I/O interface 111a may be configured in any suitable manner to provide a device stimulus for stimulating front tip interface component 421a of stylus 400a when front tip interface component 421a of stylus 400 is positioned on or close to input surface input component 110a of I/O interface 111a as user U may drag front tip interface component 421a across input surface input component 110a. For example, sensor layer 110b of the device I/O circuitry of I/O interface 111a may be configured to monitor changes in mutual capacitance that may be caused by a stylus electric field provided by stylus 400a at one or more capacitive sensing nodes of sensor layer 110b. As shown in FIGS. 2A, 2B, 2D, and 2E, for example, sensor layer 110b may be configured to provide an array of mutual capacitive sensors or sensing nodes that may be operative to enable mutual capacitance PCT sensing techniques. Sensor layer 110b may provide an array or grid of any suitable number of array trace columns 111ac and any suitable number of array trace rows 111ar, any two of which may intersect to provide a sensing node 111an. A capacitance or mutual node capacitor MNC may be inherently formed at each sensing node 111an (e.g., as shown in FIGS. 2A, 2B, 2D, and 2E). When any suitable electrical signal (e.g., transmit signal) TS may be provided along one, some, or each of array trace columns 111ac by any suitable transmitter circuitry T (e.g., a high frequency driven amplifier and/or a voltage source V controlled by a waveform w (e.g., a sinusoid or trapezoid shaped waveform) of any suitable magnitude (e.g., 6.5 volts amplitude (e.g., peak to peak)) and/or of any suitable frequency (e.g., 150 kHz or 70 kHz or 40 kHz or the like), or any other suitable configuration), any suitable electrical signal (e.g., receive signal) RS may be detected by any suitable receiver circuitry R that may be provided along each one of array trace rows 111ar. While signal TS (e.g., a voltage) is applied to an array trace column 111ac, bringing a finger or conductive stylus close to the surface of sensor layer 110*b* may change the local electrostatic field (e.g., in response to signal TS and/or capacitance MNC stimulating front tip interface component 421*a* of stylus 400*a*), which in turn may reduce the mutual capacitance. The capacitance change at every individual point on the array grid can be measured to determine the touch location accurately by measuring and analyzing the signal in the other axis, such as signal RS along each array trace row 111*ar*. Mutual capacitance may allow multi-touch operation where multiple fingers, palms, or styli can be accurately tracked at the same time. For example, as shown in FIGS. 2A and 2B, capacitance MNC and/or signal TS at one or more nodes 111*an* may be received by front tip interface component 421*a* and may stimulate front tip stylus circuitry 426*a*, which, in turn, may be operative to provide a non-linear load between body stylus circuitry 427*a* and front tip interface component 421*a* for generating a stylus electric field response for changing the electric field local to one or more nodes 111*an*. For example, the reaction of the stimulus and the non-linear load may create harmonics, which may then be received by one or more nodes, such as by node 111*an* of FIGS. 2A and 2B and/or by an associated array trace row 111*ar* and/or by an associated array trace column 111*ac*, for example, via electric field response capacitances SDC between front tip interface component 421*a* and each one of array trace row 111*ar* and array trace column 111*ac* of one or more nodes 111*an* proximate front tip interface component 421*a*. Such harmonics may then be detected as signal RS along an array trace row 111*ar* of one or more nodes 111*an* on the array grid and then such signals may be analyzed (e.g., using any suitable algorithms or detection applications 103 of device 100 (e.g., at processor 102 or any suitable circuitry (e.g., of I/O interface 111*a*))) to determine the touch location of front tip interface component 421*a* of stylus 400*a* along input surface input component 110*a* of I/O interface 111*a*. Therefore, signal TS may be adjusted by the non-linearity of front tip stylus circuitry 426*a* at or near a node 111*an* and that adjustment (e.g., as harmonics) may be detected as signal RS by that node 111*an*.

When a frequency may be transmitted through a trace of the mutual capacitance sensor array, such as by signal TS along one or more array trace columns 111*ac*, the signal may drive a current back and forth through non-linear electrical circuitry 423*a* of front tip stylus circuitry 426*a* (e.g., through one or more non-linear electrical elements, such as through at least one diode 422*a*) when user U holding body 417*a* of stylus 400*a* positions front tip interface component 421*a* of stylus 400*a* proximate at least one of the array trace columns. Such driving of current back and forth through non-linear electrical circuitry 423*a* may enable front tip interface component 421*a* to see a modulated version of signal TS rather than a pure version of signal TS because front tip stylus circuitry 426*a* may be loaded by a non-linear bias, such that current may pass through front tip stylus circuitry 426*a* more easily in one direction but may be clipped in the other direction for providing a harmonic. For example, when front tip stylus circuitry 426*a* includes a single diode 422*a*, a second harmonic of signal TS may be provided by front tip interface component 421*a*. Therefore, when such a stylus 400*a* may be known to be available to a user of device 100, device 100 may be configured (e.g., via any suitable application and/or algorithm(s) or control circuitry for handling I/O interface 111*a*) to look for a second harmonic of signal TS along one or some or each array trace row 111*ar* (e.g., by signal RS) for determining the location of stylus 400*a*, where the amount of second harmonic that may be detected for each row or node 111*an* may depend on how close that row or node may be to front tip interface component 421*a* of stylus 400*a*. Such a second harmonic may be generated by the rectification by the diode of the transmit voltage signal TS, capacitively divided down. A divider (e.g., capacitor divider) may be provided by system 1, as may be made up of a capacitance of front tip interface component 421*a* of stylus 400*a* to the transmit plane of sensor layer 110*b* or otherwise of I/O interface 111*a* versus the impedance of front tip stylus circuitry 426*a* (e.g., of diode 422*a*), which may include its junction capacitance. Front tip interface component 421*a* may be configured to have adequate effective capacitance for passive location using projective capacitance, such as, for example, an effective capacitance of 200 femtofarads or any other suitable magnitude.

Once a charge on a transmit plane of I/O interface 111*a* (e.g., signal TS) may be seen to be modulated at a harmonic (e.g., a second harmonic (e.g., by I/O interface circuitry 411*a* of stylus 400*a*)), I/O interface 111*a* may be configured to act as a transmitter of that harmonic. Such a harmonic of a transmit signal TS, as may be effected by non-linearity of front tip stylus circuitry 426*a*, may be unique compared to any adjustment or effect that may be caused by a direct touch or near touch by user U (e.g., by a finger of user U) at I/O interface 111*a*, such that device 100 may be configured to distinguish between the two accordingly. For example, while a user's finger touch may be operative to steal some of an electric field generated by a transmit signal, a harmonic generated by front tip stylus circuitry 426*a* of stylus 400*a* may be specifically different and unique, such that device 100 may be configured to detect and use such passive signal harmonics, for example, and also to reject any detected finger user touches, in order to determine an accurate location of stylus 400*a*. For example, when front tip stylus circuitry 426*a* includes a single diode 422*a*, a second harmonic of signal TS may be provided by front tip interface component 421*a*, such that when a signal (e.g., signal TS) is transmitted by device 100 along I/O interface 111*a* with a particular frequency (e.g., 150 kHz or 70 kHz or 40 kHz), device 100 may be configured to look for a signal (e.g., signal RS) with twice that particular frequency (e.g., 300 kHz or 140 kHz or 80 kHz), where the harmonic may be weaker than the signal at the fundamental frequency (e.g., about 20-25 db down from the signal level from a passive stylus), but unique, and with low background at that frequency. Therefore, when such a stylus 400*a* for providing second harmonics may be known to be available to a user of device 100, device 100 may be configured (e.g., via any suitable application and/or algorithm(s) or control circuitry for handling I/O interface 111*a*) to look for a second harmonic of signal TS by signal RS for determining the location of stylus 400*a*, where the amount of second harmonic that may be detected for each row or node 111*an* may depend on how close that row or node may be to front tip interface component 421*a* of stylus 400*a*. Signal TS may be transmitted as any suitable signal, such as a sinusoid shaped signal or a trapezoid shaped signal or any other suitably shaped signal whose non-linear distortion or harmonics of any suitable order may be detectable efficiently and/or effectively by any suitable control application(s) and/or algorithm(s) of device 100.

Device I/O interface control of I/O interface 111*a* for identifying and locating such a stylus 400*a* may be specifically configured or tuned for that particular type of stylus, such that it may be effectively operative to initially identify and roughly locate the location of such a stylus (e.g., by effectively enabling rejection of other types of touch detection (e.g., user finger touch)), such as through detection of a non-linear distortion of the transmitted signal or one or more second harmonic signals (e.g., to a pixel or node pitch distance), and then the control (e.g., one or more algorithms or applications) may be configured to switch to a mode specific to that type of detected stylus (e.g., across sensor layer 110b or within a particular radius of the initially detected position of the stylus (e.g., for better jitter performance)). For example, an algorithm may be configured to sense for a particular harmonic of a stylus for a particular transmitted signal, and once detected, more intense and/or frequent and/or focused scans may be utilized to detect that particular harmonic along the I/O interface (e.g., as part of a normal scan, attempt to detect a particular harmonic of a particular expected stylus, and then when that particular harmonic is detected, ramp up the scan features to track that particular stylus (e.g., a type of signal driving may be updated (e.g., only traces around the initially detected position of the stylus may be driven (e.g., to reduce signal to noise))).

At least one non-linear electrical element or load or rectifier, such as at least one diode 422a, of non-linear electrical circuitry 423a that may be electrically coupled to front tip interface component 421a may enable stylus 400a to be identified and distinguished from nearby user touches, dragging fingers, palm rests, and/or the like, due to a non-linear load that may generate a non-linear distortion or harmonics (e.g., a second harmonic) at touch pixels near the stylus tip. Each non-linear electrical element may be configured with any suitable characteristics. For example, diode 422a may be provided with any suitable characteristics, such as a low capacitance (e.g., low parasitic capacitance), low reverse leakage, and/or low turn on voltage diode. The junction capacitance of such a diode may be configured to be low (e.g., less than 1.0 picofarad and/or less than 50 femtofarads). A reverse leakage current of such a diode may be controlled to be not too high. A Schottky diode, two or more Schottky diodes in series, or a specifically designed diode may be best suited for such a use. In some embodiments, as shown, circuitry 426a may also include (e.g., in parallel with non-linear electrical circuitry 423a) any suitable resistance circuitry 425a (e.g., at least one resistor 424a) for any suitable function, including, but not limited to, controlling reverse leakage current of non-linear electrical circuitry 423a and/or preventing direct current ("DC") positive voltage build up at the diode by effectively draining off any DC while maintaining non-linearity of circuitry 426a. The resistance of resistance circuitry 425a (e.g., resistor 424a) may be selected in any suitable manner, such as by using a model of the panel, including its stimulation voltage and capacitance to the tip, and the non-linear device model, and optimizing the model. For an embodiment using one or more Schottky diodes for non-linear electrical circuitry 423a, the optimum may vary, for example, between 4.0-6.0 megohms, or even no additional leakage may be needed.

At least one non-linear electrical element of non-linear electrical circuitry 423a, such as diode 422a, may be used to modulate and rectify a voltage on front tip interface component 421a and may provide a load (e.g., a capacitance of front tip interface component 421a (e.g., effectively)) and resistance circuitry 425a, such as resistor 424a, may be used to discharge the capacitance and/or to prevent capacitance from charging up. A high performance and/or low capacitance and/or low voltage Schottky diode (e.g., on an insulating substrate) may be useful for providing such a diode (e.g., diode 422a and/or any other appropriate diode described herein), where such a diode may be made of any suitable material(s), including, but not limited to gallium arsenide and/or titanium nitride, which may have a large reverse leakage, but such leakage may be appropriately handled by resistance circuitry (e.g., resistance circuitry 425a). In some embodiments, a diode would be useful if it were configured to have a current-voltage characteristic (e.g., an I-V curve) with certain properties, including, but not limited to, one with an abrupt or substantially abrupt non-linearity at some voltage and one that may maintain that voltage by balancing the forward and reverse characteristics. To produce a certain reverse voltage, the diode may be configured with an I-V curve where current may be sufficient to leak out the current pushed into the diode on the forward voltage and/or to keep an operating point in a region that is non-linear. One or more certain materials may be used to provide such a diode with such performance characteristics. Alternatively or additionally, a particular diode may be radiation damaged such that the diode may be operative to leak during use in a stylus, which may obviate any need for resistance circuitry (e.g., resistance circuitry 425a). For example, a diode that has a constant reverse current rather than one that is modulated with a first harmonic may provide a useful result and/or may allow for a stylus without resistance circuitry (e.g., resistance circuitry 425a), thereby reducing the number of components of the stylus. Additionally or alternatively to radiation damaging a diode for use in a stylus, the diode may be processed in any other suitable manner(s), including, but not limited to, heat processing or damaging and/or radiation processing or damaging in order to configure the diode to perform in an effective manner, such as to increase or change the reverse leakage of the diode (e.g., increase reverse leakage independently of a reverse voltage).

Resistance circuitry of front tip stylus circuitry of a stylus (e.g., resistance circuitry 425a of front tip stylus circuitry 426a of stylus 400a) may include one or more resistors or may not be provided at all (e.g., when a diode with effectively increased reverse leakage is utilized by non-linear electrical circuitry 423a). Alternatively, such resistance circuitry may include or be provided by any suitable current limiting device, which may be seen as a constant current source. This may be accomplished by providing any suitable current limiting field-effect transistor ("FET") (e.g., an n-type metal-oxide-semiconductor ("NMOS") device or depletion mode device) rather than a resistor. Such a device may be configured not to have a gate, but may include SiO2 or any other suitable element above a dope channel (e.g., a slightly n-type element), for example, such that the total amount of current that flows therethrough may be about 1 microAmpere. This may provide a flat region, such that when the circuitry goes to a high voltage, the channel may disappear. Therefore, in some embodiments, tip stylus circuitry, such as tip stylus circuitry 426a, may be generated as a single chip (e.g., through very-large-scale integration ("VLSI")) that may include a diode (e.g., Schottky diode) (e.g., as at least a portion of circuitry 423a) and a current limiting FET (e.g., a diode connected depletion mode device (e.g., a device with a gate connected to the drain of the MOSFET), where a diode connected FET may provide the diode action as well as the constant current backward leakage of the tip stylus circuitry) (e.g., as at least a portion of circuitry 425a).

Figure 6:
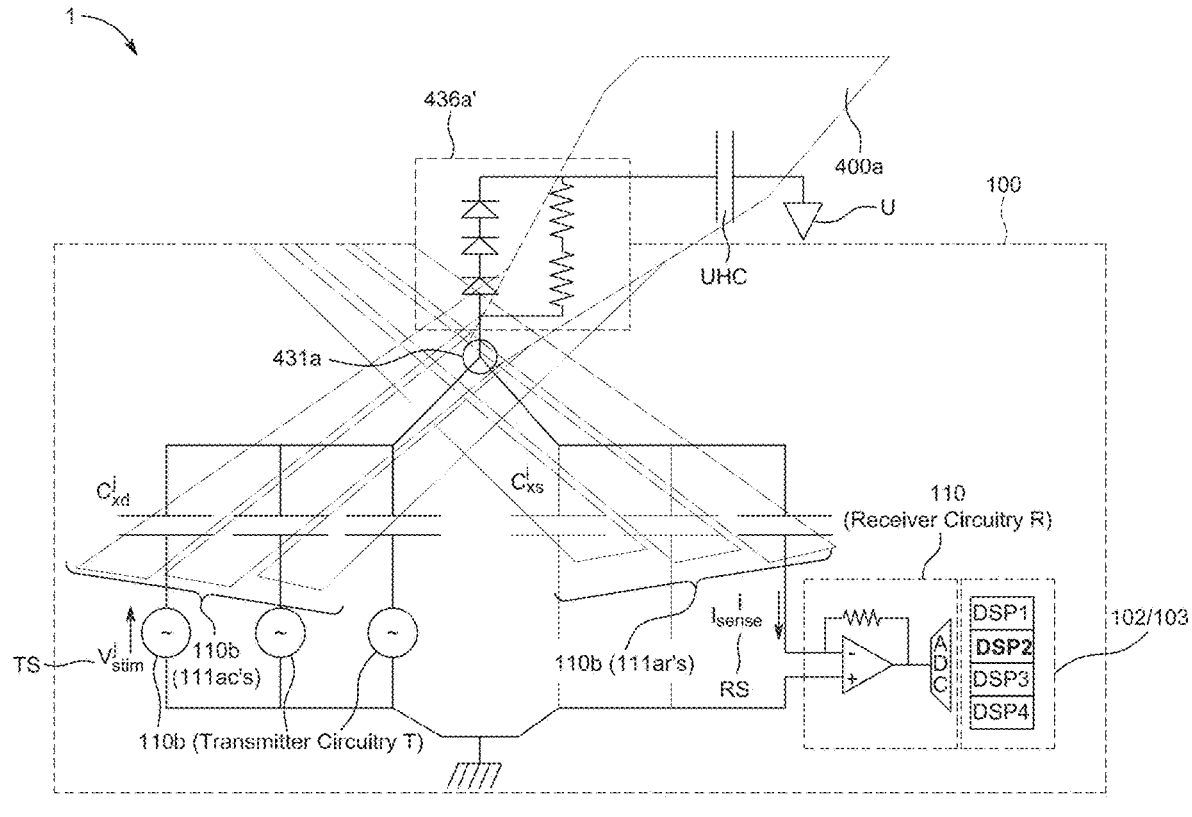
FIG. 6 is a schematic view of a portion of the system using a portion of a stylus of FIGS. 1-1D.

Although only one diode 422a may be shown as provided by non-linear electrical circuitry 423a, it is to be understood that any suitable other number of non-linear electrical elements may be provided by non-linear electrical circuitry 423a, which may be of the same type or different type of non-linear electrical element from one another. For example, two diodes may be electrically coupled in series (e.g., an anode of a first diode may be directly electrically coupled to body stylus circuitry 427a, while the cathode of that first diode may be directly electrically coupled to an anode of a second diode, while the cathode of that second diode may be directly electrically coupled to front tip interface component 421a of stylus 400a). For example, two or more diodes (e.g., three diodes as shown in FIG. 6) may be coupled in series (e.g., with the anode of a first diode coupled to the cathode of a second diode, etc.) to create an asymmetric (e.g., top to bottom) waveform, and that may provide a second harmonic. However, compared to only a single diode (see, e.g., FIG. 2B), multiple diodes provided in series (see, e.g., FIG. 6) may be operative to reduce the parasitic capacitance across the combination. In other words, two or three diodes in series may look electrically like a single diode (e.g., operative to enable extraction of same harmonic by device 100 (e.g., second harmonic)), but with lower capacitance across them. The forward voltage drop across the diodes may also increase, but the reduction in parasitic capacitance may be more significant and/or effective. For example, the parasitic capacitance across two diodes in series may be half that of one diode, but with twice the forward voltage drop. If the drive waveform is configured to be symmetric in voltage (e.g., a square wave, sinusoidal wave, or trapezoidal wave), then there may be no second harmonic in the original field, and a single diode or diode pair connected in the same direction (e.g., if two diodes are coupled in series, such as with the anode of the first diode coupled to the cathode of the second diode) may be provided by non-linear electrical circuitry 423a to create an asymmetric (e.g., top to bottom) waveform, and that may provide a second harmonic. A square or trapezoidal stimulation may have all of the odd harmonics, including the third harmonic, in the transmitted field, so it may be preferred to generate a second harmonic from the diode(s) or non-linear electrical circuitry 423a. A sinusoidal drive may not have any third harmonic, so back to back diodes or other symmetric non-linear electrical circuitry 423a could be used, which may generate odd harmonics that could be detected. In some embodiments where back to back diodes or other symmetric non-linear electrical circuitry is used, resistance circuitry of the tip stylus circuitry including such non-linear electrical circuitry may not be provided or utilized (e.g., as one diode may conduct in a forward direction and one may conduct in a backward direction).

As another example, two or more diodes may be electrically coupled in parallel (e.g., an anode of a first diode may be directly electrically coupled to body stylus circuitry, while the cathode of that first diode may be directly electrically coupled (or via a switch) to a tip interface component, and a cathode of a second diode may be directly electrically coupled to body stylus circuitry, while the anode of that second diode may be directly electrically coupled (or via a switch) to the tip interface component (see, e.g., FIG. 4)). Such parallel diodes may be operative to configure the tip stylus circuitry (e.g., non-linear electrical circuitry 423c of tip stylus circuitry 426c of FIG. 4) to generate third harmonics of the transmitted signal (e.g., as opposed to second harmonics when only one diode is provided within the non-linear electrical circuitry), and device 100 may be configured to detect and handle such third harmonics in a different manner than other harmonics of other stylus types.

The direction (e.g., forward direction) of a non-linear electrical element, such as at least one diode 422a, of non-linear electrical circuitry 423a with respect to front tip interface component 421a of stylus 400a may be any suitable direction. For example, as shown in FIGS. 2-2C, anode A of diode 422a may be directly electrically coupled to body stylus circuitry 427a, while cathode C of diode 422a may be directly electrically coupled to front tip interface component 421a of stylus 400a. Alternatively, in other embodiments, anode A of diode 422a may be directly electrically coupled to front tip interface component 421a, while cathode C of diode 422a may be directly electrically coupled to body stylus circuitry 427a (see, e.g., the direction of the diodes of circuitry 436a' of FIG. 6 or the direction of the diode of circuitry 436a of FIG. 2C). In either embodiment, the order of the harmonics generated by front tip stylus circuitry 426a with only diode 422a within non-linear electrical circuitry 423a may be second harmonics, although the phase or polarity of such harmonics may be different between those two embodiments, as may be detected by the projective capacitance circuitry of I/O interface 111a. Therefore, both embodiments may be utilized by the same or different stylus to enable two different stylus types to be located by I/O interface 111a, where each stylus type may be associated with one or more specific input characteristics. For example, a tip interface component of a stylus that provides second harmonics with a first phase may be determined by device 100 to have a first stylus identity, while a tip interface component of a stylus that provides second harmonics with a second phase different than the first phase may be determined by device 100 to have a second stylus identity different than the first stylus identity, and different stylus identities may be handled by device 100 in any suitable one or more different ways. For example, processor 102 may utilize a specific detected stylus identity (or an absence thereof) in any suitable manner including, but not limited to, accepting or rejecting input from a particular stylus, accepting input from multiple styli and/or from a single stylus, permitting or denying access to a particular functionality of the electronic device, applying a particular stylus profile, restoring one or more settings of the electronic device, notifying a third party that the stylus is in use, applying a setting to the electronic device, applying a setting to a program operating on the electronic device (e.g., which may include updating a user interface on display 112a or otherwise of device 100), changing a line thickness, color, pattern, erasure, and so on of a graphical object to be rendered by a graphics program of the electronic device, changing a setting of a video game operating on the electronic device, and so on. As shown in FIG. 2C, for example, single stylus 400a may be provided with two different tip interface components for providing two different stylus identities. For example, as shown, anode A of diode 422a of non-linear electrical circuitry 423a of front tip stylus circuitry 426a may be directly electrically coupled to body stylus circuitry 427a, while cathode C of diode 422a may be directly electrically coupled to front tip interface component 421a of stylus 400a, and, conversely, a cathode C of a diode 432a of non-linear electrical circuitry 433a of rear tip stylus circuitry 436a may be directly electrically coupled to body stylus circuitry 427a, while an anode A of diode 432a may be directly electrically coupled to rear tip interface component 431a of stylus 400a, such that front tip interface component 421a may provide second harmonics with a first phase while rear tip interface component 431a may provide second harmonics with a second phase. Alternatively, a first number of diodes (e.g., 1) may be provided by non-linear electrical circuitry 423a of front tip stylus circuitry 426a, while a second, different number of diodes (e.g., 2) may be provided by non-linear electrical circuitry 433a of rear tip stylus circuitry 436*a* (e.g., 2 diodes in parallel, as shown by circuitry 423*c* of FIG. 4, or 3 diodes in series, as shown by circuitry 436*a*' of FIG. 6), such that front tip interface component 421*a* may provide second harmonics while rear tip interface component 431*a* may provide different (e.g., third) harmonics. Therefore, device 100 may be configured to determine whether user U may be moving front tip interface component 421*a* of stylus 400*a* along I/O interface 111*a* (e.g., at FIGS. 2A and 2B) or rear tip interface component 431*a* of stylus 400*a* along I/O interface 111*a* (e.g., at FIGS. 2D and 2E), such that device 100 may be configured to handle the detection of those different tip interface components in different manners. For example, device 100 may be configured to utilize the detection of front tip interface component 421*a* for enabling generation of a drawing object (e.g., a graphical line) and to utilize the detection of rear tip interface component 431*a* for enabling generation of an erasure object (e.g., removal of any graphical content), such that stylus 400*a* may be utilized within system 1 similarly to a physical pencil that may have a drawing tool on one end and an erasure tool on another end. Although, it is to be appreciated that device 100 may be configured to handle different stylus identifies in any suitable different manners. In some embodiments, different tip interface components (e.g., on opposite ends of the same stylus or on different fingers of a glove or on different styli or accessories altogether) may include different bleed resistors (e.g., different resistance circuitries of the different tip interface components). As the bleed resistor is changed, the timing of the second harmonic may change, and may be detectable as a relative phase change of the second harmonic relative to the first harmonic. One use for such phase change detection may be to use a force sensitive resistor to change the resistance, thus, for example, enabling a tip force to be estimated (e.g., as may be described with respect to circuitry 426*c* of stylus 400*c* of FIG. 4).

Therefore, stylus 400*a* may be configured to operate as a semi-passive and/or non-linear stylus. A semi-passive stylus may be a stylus without an active transmitter, such as a stylus that may be configured to react to the incident field but that may not be a simple linear probe like a user's finger or a conductive rod. Stylus 400*a* may be provided at a very low cost, as it may not require any internal power source and may not require any direct coupling or communication of any wired/wireless communication interface data 56 with device 100. Stylus 400*a* may provide improved performance over a passive stylus on a projected capacitance input device by being able to be distinguished from direct user touch events (e.g., unintentional user touch events). Non-linearity of stylus 400*a* may double (or otherwise provide any suitable multiple of) a modulation frequency (e.g., a fundamental frequency) of a transmitted signal TS (e.g., from 200 kHz to 400 kHz (see, e.g., FIG. 6D, from a first harmonic 671 to a second harmonic 673)) such that many cycles of non-linearity may be detected, such that noise may be reduced by requiring detection of a harmonic multiple times within multiple cycles or just once in a single cycle.

In addition to use with I/O interface 111*a* when configured to provide mutual capacitance sensing, stylus 400*a* may also be configured to be used with I/O interface 111*a* when configured to provide self-capacitance sensing. For example, as shown in FIGS. 2F and 2G, when providing self-capacitance sensing, each pixel or pad of an array of I/O interface 111*a* (e.g., first pad 111*ap*1 and second pad 111*ap*2) may be driven by its own signal TS of its own transmitter circuitry T and an effected signal RS may be detected by any suitable receiver circuitry R. In the environment of self-capacitive sensing, the current taken to drive the pixels may be a non-linear function of the voltage driven, and can thus be distinguished from linear effects, such as a nearby finger or palm. Self-capacitive sensing may be combined with mutual capacitive sensing, for example, by driving a voltage on an electrode and monitoring both the current into that node and current into nearby nodes that are held at a voltage.

Figure 3A:
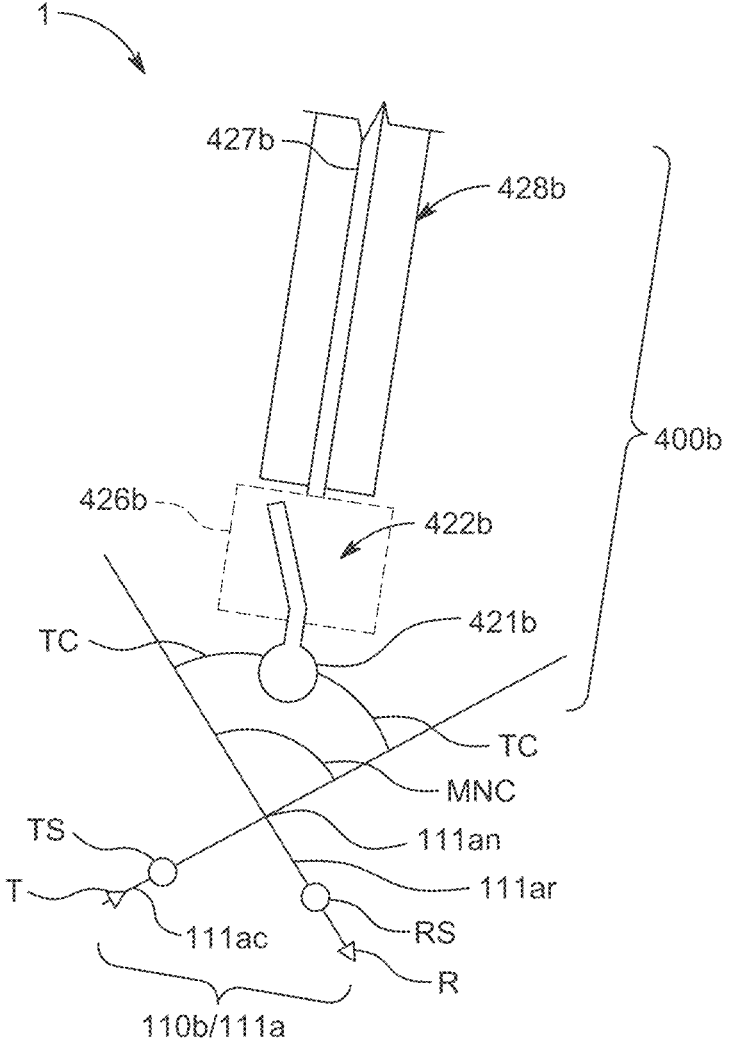
FIG. 3A is a schematic view of a portion of the system using a portion of the stylus of FIGS. 1-1D and 3.
Figure 3B:
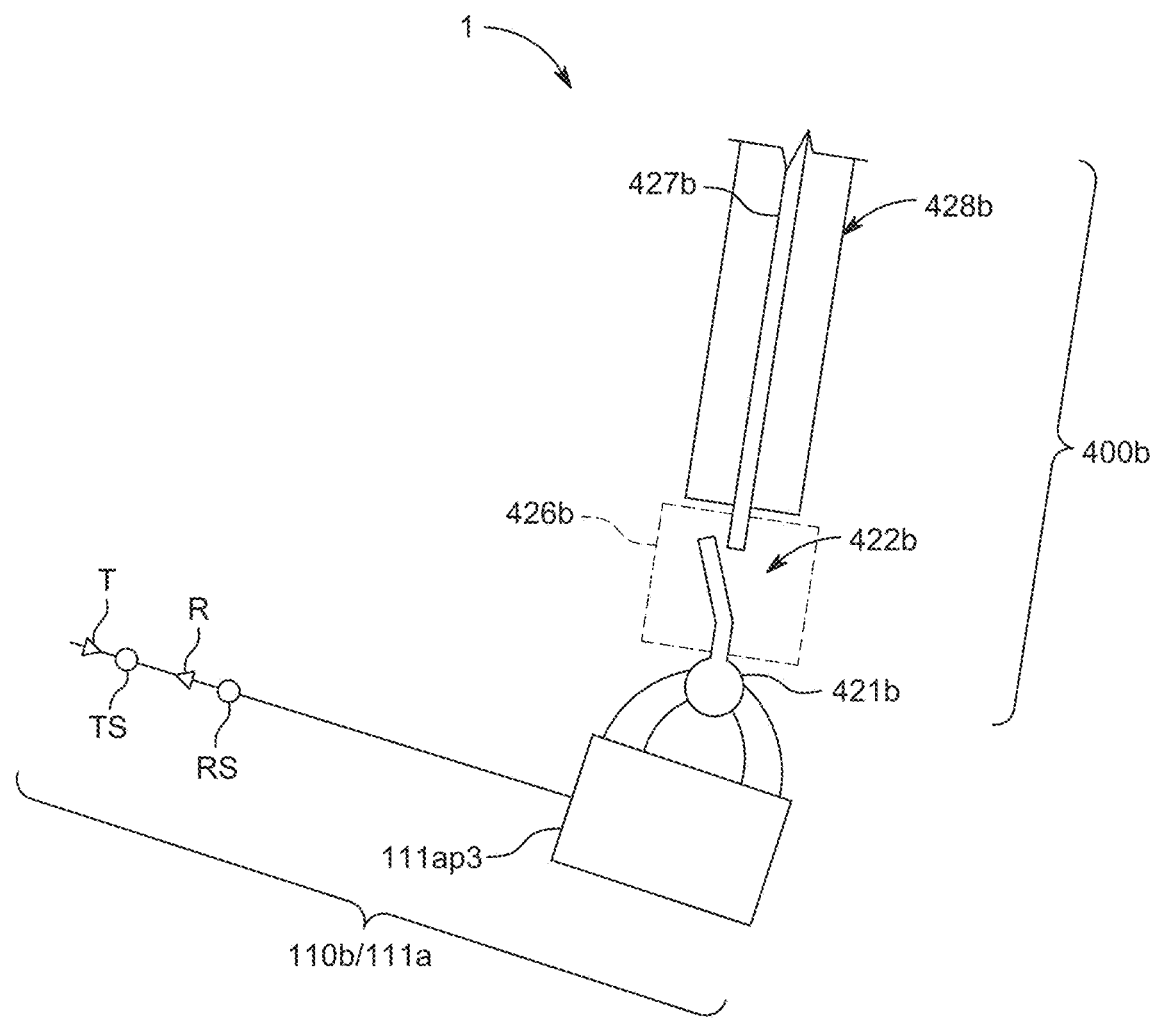
FIG. 3B is a schematic view of another portion of the system using the portion of the stylus of FIGS. 1-1D, 3, and 3A.
Figure 3C:
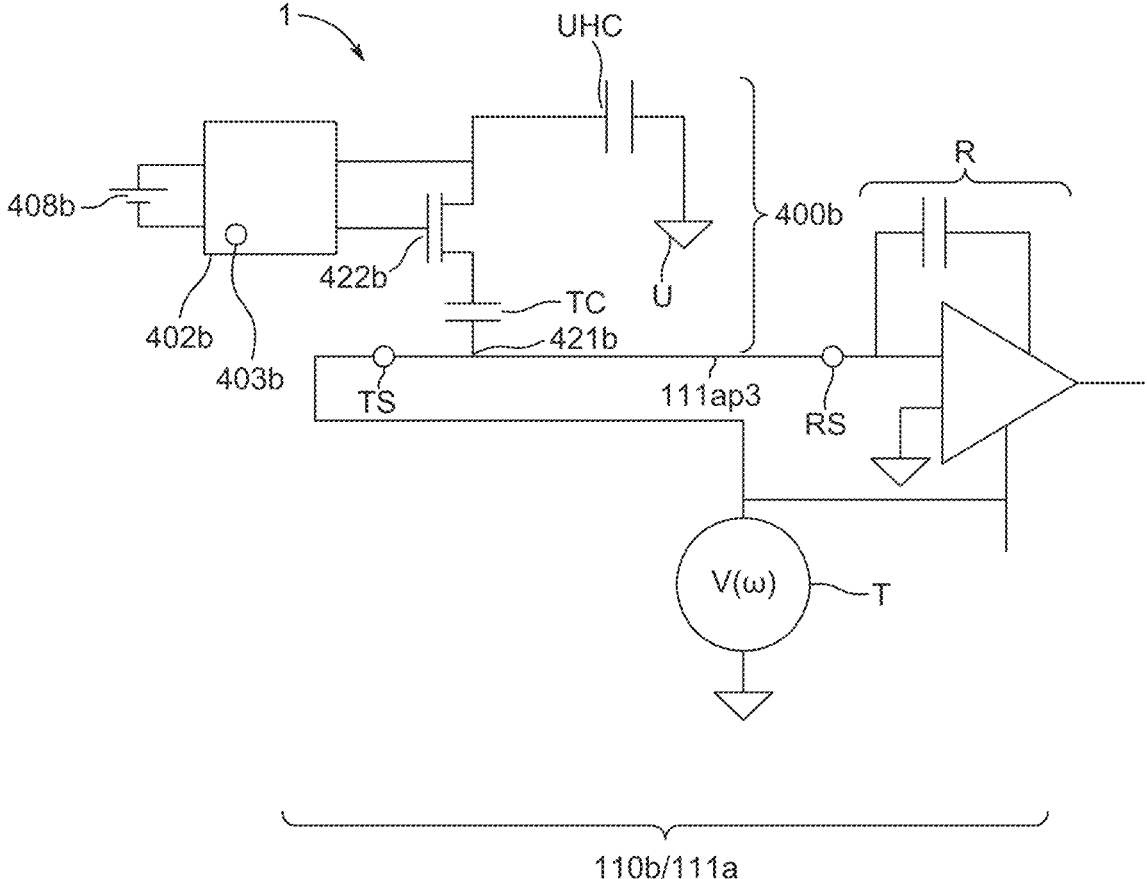
FIG. 3C is a circuit diagram of the other portion of the system using the portion of the stylus of FIGS. 1-1D and 3-3B.

Another stylus 400*b*, as shown in FIGS. 3-3C may include stylus I/O circuitry 411*b* that may include body stylus circuitry 427*b* that may be electrically coupled to front tip stylus circuitry 426*b* and/or to rear tip stylus circuitry (not shown). Body stylus circuitry 427*b* may be any suitable circuitry that may be operative to be electrically coupled (e.g., capacitively coupled) to user U when user U is holding stylus 400*b* about at least a portion of body portion 417*b*. As shown in FIG. 3, for example, body stylus circuitry 427*b* may be at least one conductive wire extending along at least a portion of a length of body portion 417*b* of stylus 400*b*, which may be insulated by any suitable insulation 428*b*. Alternatively, body stylus circuitry 427*b* may be provided by a conductive (e.g., copper) tape along a portion of body 417*b*, where such tape may be positioned under any suitable insulation, such as a finger pad of any suitable material. Any suitable housing 401*b* may be provided to protect body stylus circuitry 427*b*, such as a plastic housing. In some embodiments, such a housing may be operative to provide insulation 428*b*. Additionally or alternatively, at least a portion of body stylus circuitry 417*b* may be at least partially exposed via housing 401*b* and/or insulation 428*b* for enabling direct contact by user U. When user U is holding stylus 400*b* about and/or along a portion of body 417*b*, a capacitance or user-handle capacitor UHC may be inherently formed (e.g., as shown in FIG. 3C). The capacitance of user-handle capacitor UHC may be large enough to pass the desired signal from the tip, but not so large as to allow large transients from electrostatic discharge events to pass. For example, the capacitance of user-handle capacitor UHC may be any suitable capacitance, such as a capacitance in the range of 1.0 picofarad to 10.0 picofarads.

Stylus I/O circuitry 411*b* may include a front tip interface component 421*b* that may provide at least a portion of front tip portion 415*b*. Front tip interface component 421*b* may be the portion of stylus 400*b* configured to directly interface with device I/O interface 111*a*. For example, front tip interface component 421*b* may be formed from any suitable material, including, but not limited to, silicone, rubber, fluoro-elastomer, plastic, nylon, conductive or dielectric foam, metal (e.g., brass (e.g., a brass ball with a dielectric coating (e.g., a thin coating with a high dielectric constant))), or any other suitable material or combination of materials. In this manner, drawing of front tip interface component 421*b* across input surface 110*a* may not cause damage to input surface 110*a* or layers applied to input surface 110*a*, such as, but not limited to, anti-reflective coatings, olcophobic coatings, hydrophobic coatings, cosmetic coatings, ink layers, and the like. Front tip interface component 421*b* can be configured to be removably attached to body 417*b*, such as via threadings/screws, detents and/or recesses, interference-fit or snap-fit, and/or magnetic attraction, and/or the like, and electrically coupled capacitively, such as through a pogo-pin, spring, and/or the like. Transit of any stylus electric field may be provided from front tip interface component 421*b* and not from other portions of stylus I/O circuitry 411*b*. Like component 421*a*, front tip interface component 421*b* may be any suitable shape, such as a sphere or hemisphere, of any suitable size. For example, in some particular embodiments, front tip interface component 421*b* may be provided as a ball (e.g., a solder ball and/or brass ball) of any suitable diameter, such as 2 millimeters in diameter. Front tip interface component 421*b* may be configured to provide the same footprint area (e.g., tip field intersection area (e.g., of charge)) on input surface 110*a* no matter the angle of axis 120 with respect to a plane of input surface 110*a*. The size of front tip interface component 421*b* may be made as small as possible to enable precise localization of front tip portion 415*b* with respect to device I/O interface 111*a*.

Front tip stylus circuitry 426*b* may be positioned between and electrically coupled to each one of front tip interface component 421*b* and a portion (e.g., a front end) of body stylus circuitry 427*b*. Front tip stylus circuitry 426*b* may be configured as any suitable circuitry that may be operative to modulate a capacitance (e.g., an effective capacitance) at front tip interface component 421*b* when user U is holding body 417*b* of stylus 400*b* such that front tip interface component 421*b* of stylus 400*b* may be stimulated by a device stimulus that may be generated by device I/O circuitry of device I/O interface 111*a* of electronic device 100. For example, front tip stylus circuitry 426*b* may include any suitable switch circuitry 423*b* that may be electrically coupled (e.g., in series) between front tip interface component 421*b* and body stylus circuitry 427*b*. Switch circuitry 423*b* may include any suitable number of any suitable type(s) of switch element(s) 422*b*, such as a high impedance switch, such as a field-effect transistor ("FET") (e.g., a metal-oxide-semiconductor field-effect transistor ("MOS-FET")). Additionally, as shown, front tip stylus circuitry 426*b* may include any suitable microcontroller 402*b* powered by any suitable power supply 408*b* (e.g., a low frequency, very low power battery operated circuit) for switching switch element(s) 422*b* between an open state where front tip interface component 421*b* and body stylus circuitry 427*b* are not electrically coupled and a closed state where front tip interface component 421*b* and body stylus circuitry 427*b* are electrically coupled by switch element 422*b*. Microcontroller 402*b* may be configured (e.g., programmed) to switch (e.g., open or close) switch element 422*b* according to a particular pattern (e.g., a micro application 403*b*) or according to a selected one of two or more patterns that may be implemented by microcontroller 402*b*. Front tip stylus circuitry 426*b* may be provided as a very low power circuit that may modulate the effective capacitance TC of front tip interface component 421*b* of stylus 400*b* according to a particular pattern. Front tip interface component 421*b* may be configured to have adequate effective capacitance for passive location using projective capacitance, such as, for example, an effective capacitance of 200 femtofarads or any other suitable magnitude. In some embodiments, rather than being powered by power supply 408*b* local to stylus 400*b*, controller 402*b* may be powered by any suitable external stimulation (e.g., device I/O circuitry and/or a user holding the stylus).

One, some, or each available pattern may be operative to enable device 100 to distinguish stylus 400*b* from a direct user touch event (e.g., by a finger or palm event by user U on I/O interface 111*a*), as a pattern may be detected by receive signal RS at one or more nodes 111*an* (e.g., of FIG. 3A for mutual capacitance) or pads 111*ap* (e.g., pad 111*ap*3 of FIGS. 3B and 3C for self-capacitance) in response to transmitted signal TS being effected by the pattern-modulated effective capacitance of front tip interface component 421*b*, where that pattern may be a pattern that may not be replicated by user U on its own (e.g., without front tip stylus circuitry 426*b*). As an example, an exemplary pattern may be a Barker sequence followed by a digital code, where only the bits in the trailing digital code may change. A reason to have a low frequency pattern may be to minimize the power used by the switching circuit. Therefore, stylus 400*b* may be provided as a low power, semi-permanent battery, switched stylus. No other circuitry may be provided by stylus 400*b*, such that it may be made at a low cost and with a very low powered battery that may be configured to enable stylus 400*b* to function properly for many years without replacement. In some embodiments, the battery may be configured for any suitable duration of use, such as in a range of 5-50 milliamp hours. In some embodiments, any suitable input component may also be provided by stylus 400*b* to enable user U to select a particular one of many patterns that may be available to front tip stylus circuitry 426*b*, such that a particular pattern may be detected by device 100 and a particular functionality may be carried out by device 100 that may be associated with that particular pattern (e.g., device 100 may be configured to utilize the detection of front tip interface component 421*b* with a first pattern-modulated effective capacitance for enabling generation of a red drawing object (e.g., a red graphical line) and to utilize the detection of front tip interface component 421*b* with a second pattern-modulated effective capacitance for enabling generation of a green drawing object (e.g., a green graphical line), such that stylus 400*b* may be utilized within system 1 similarly to a physical multi-colored pen that may selectively output one of various ink colors. Although, it is to be appreciated that device 100 may be configured to handle different patterns as different stylus identifies in any suitable different manners.

Device I/O interface control of I/O interface 111*a* for identifying and locating such a stylus 400*b* may be specifically configured or tuned for that particular type of stylus and/or one, some, or each pattern available to that stylus, such that it may be effectively operative to initially identify and roughly locate the location of such a stylus (e.g., by effectively enabling rejection of other types of touch detection (e.g., user finger touch or other patterns)), such as through detection of a particular pattern, and then the control (e.g., one or more algorithms or applications) may be configured to switch to a mode specific to that type of detected stylus (e.g., across sensor layer 110*b* or within a particular radius of the initially detected position of the stylus (e.g., for better jitter performance)). For example, an algorithm may be configured to sense for a particular pattern of a stylus for a particular transmitted signal, and once detected, more intense and/or frequent and/or focused scans may be utilized to detect that particular pattern along the I/O interface (e.g., as part of a normal scan, attempt to detect a particular pattern of a particular expected stylus, and then when that particular pattern is detected, ramp up the scan features to track that particular pattern (e.g., a type of signal driving may be updated (e.g., only traces around the initially detected position of the stylus may be driven (e.g., to reduce signal to noise))). In an embodiment where a pattern may be a Barker sequence followed by a digital code, the Barker sequence itself and the detection thereof may not need to change.

Therefore, stylus 400*b* may be configured to provide a switch that may be modulated at a relatively low frequency, and/or that may be driven by a low power circuit that may be similar to that of an electronic watch, while a projective capacitive input device of I/O interface 111*a* may be configured to seek and/or detect a signal modulated by a changing load of stylus 400*b* (e.g., using a matched filter). Stylus 400*b* may be a very low-power, semi-permanent battery powered stylus that may be provided at a very low cost, as it may not require a substantial internal power source and may not require any direct coupling or communication of any wired/wireless communication interface data 56 with device 100. Stylus 400*b* may provide improved performance over a passive stylus on a projected capacitance input device by being able to be distinguished from direct user touch events (e.g., unintentional user touch events). Although not shown, single stylus 400*b* may be provided with two different tip interface components, like stylus 400*a*, for providing two different stylus identities. For example, switch circuitry 423*b* of front tip stylus circuitry 426*b* may be operative to generate a first pattern, while switch circuitry of a rear tip stylus circuitry may be operative to generate a second pattern different than the first pattern. Additionally or alternatively, an input component of stylus 400*b* may be operative to adjust the type of pattern generated by its switch circuitry from a first pattern to a second pattern different than the first pattern.

Figure 4:
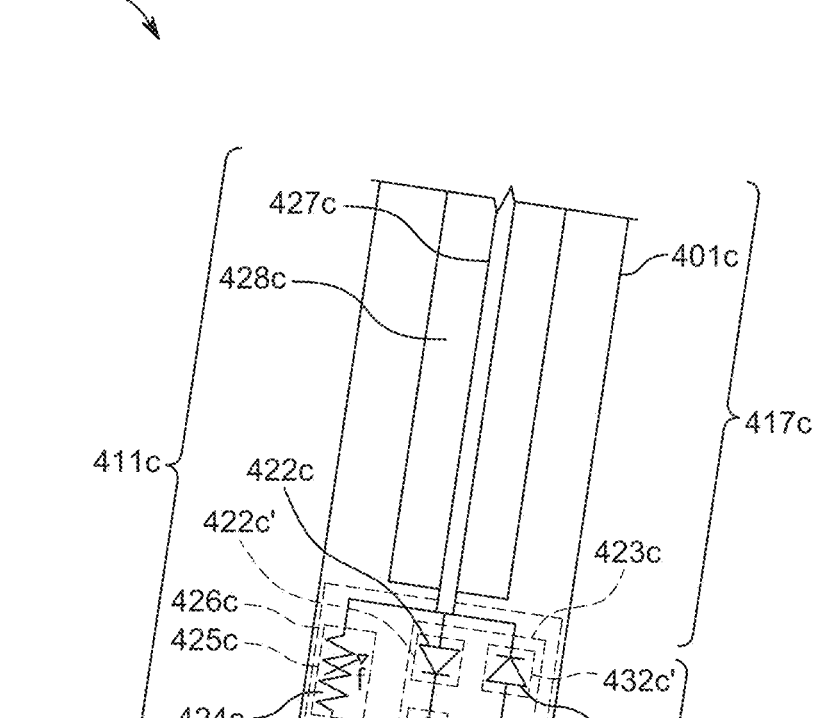
FIG. 4 is a partially transparent, semi-schematic view of an illustrative portion of yet another stylus of the system of FIGS. 1-1D.

Yet another stylus 400*c*, as shown in FIG. 4, for example, may be similar to stylus 400*a*, except as described herein. As shown, stylus 400*c* may include stylus I/O circuitry 411*c* that may be similar to stylus I/O circuitry 411*a* and may be operative to be stimulated only by external stimulus, such as a device stimulus that may be generated by device I/O circuitry of device I/O interface 111*a* of electronic device 100 and/or by user U when holding stylus 400*c*, whereby that stimulation of stylus I/O circuitry 411*c* may be operative to enable stylus I/O circuitry 411*c* to provide any suitable stylus electric field that may then be detected by device 100 for estimating the location of stylus 400*c*. Stylus 400*c* may include a barrel or handle or body portion 417*c* extending between a front tip portion 415*c* and a rear tip portion (not shown), where body portion 417*c* may be configured to be held by user U as the user may slide a tip portion of stylus 400*c* across input surface 110*a* of device I/O interface 111*a* of device 100.

Stylus I/O circuitry 411*c* may include body stylus circuitry 427*c* that may be electrically coupled to front tip stylus circuitry 426*c* and/or to rear tip stylus circuitry (not shown). Body stylus circuitry 427*c* may be any suitable circuitry that may be operative to be electrically coupled (e.g., capacitively coupled) to user U when user U is holding stylus 400*c* about at least a portion of body portion 417*c*. As shown in FIG. 4, for example, body stylus circuitry 427*c* may be at least one conductive wire extending along at least a portion of a length of body portion 417*c* of stylus 400*c*, which may be insulated by any suitable insulation 428*c*. Alternatively, body stylus circuitry 427*c* may be provided by a conductive (e.g., copper) tape along a portion of body 417*c*, where such tape may be positioned under any suitable insulation, such as a finger pad of any suitable material. Any suitable housing 401*c* may be provided to protect body stylus circuitry 427*c*, such as a plastic housing. In some embodiments, such a housing may be operative to provide insulation 428*c*. Additionally or alternatively, at least a portion of body stylus circuitry 427*c* may be at least partially exposed via housing 401*c* and/or insulation 428*c* for enabling direct contact by user U. When user U is holding stylus 400*c* about and/or along a portion of body 417*c*, a capacitance or user-handle capacitor (e.g., UHC (not shown in FIG. 4)) may be inherently formed. The capacitance of such a user-handle capacitor may be relatively large compared to a panel to tip capacitance (e.g., electric field response capacitances (e.g., capacitances SDC) between front tip interface component 421*c* and each one of array trace row 111*ar* and array trace column 111*ac* of one or more nodes 111*an* proximate front tip interface component 421*c* when stylus 400*c* is used with device 100), but not so large that electrostatic discharges would be likely to damage the device. Stylus I/O circuitry 411*c* may include a front tip interface component 421*c* that may provide at least a portion of front tip portion 415*c*. Front tip interface component 421*c* may be the portion of stylus 400*c* configured to directly interface with device I/O interface 111*a*. For example, front tip interface component 421*c* of stylus 400*c* may be similar to front tip component 421*a* of stylus 400*a*.

Front tip stylus circuitry 426*c* may be positioned between and electrically coupled to each one of front tip interface component 421*c* and a portion (e.g., a front end) of body stylus circuitry 427*c*. Front tip stylus circuitry 426*c* may be configured as any suitable circuitry that may be operative to provide a non-linear load between body stylus circuitry 427*c* and front tip interface component 421*c* when user U is holding body 417*c* of stylus 400*c* such that front tip interface component 421*c* of stylus 400*c* may be stimulated by a device stimulus that may be generated by device I/O circuitry of device I/O interface 111*a* of electronic device 100. For example, front tip stylus circuitry 426*c* may include any suitable non-linear electrical circuitry 423*c* that may be electrically coupled (e.g., in series) between front tip interface component 421*c* and body stylus circuitry 427*c*. Non-linear electrical circuitry 423*c* may include any suitable number of non-linear electrical sub-circuitries (e.g., in parallel), such as non-linear electrical sub-circuitry 422*c'* and/or non-linear electrical sub-circuitry 432*c'*, each of which may include any suitable number and type(s) of non-linear electrical elements. For example, as shown, non-linear electrical sub-circuitry 422*c'* may include at least one diode 422*c*, and non-linear electrical sub-circuitry 432*c'* may include at least one diode 432*c*. One, some, or each diode of non-linear electrical circuitry 423*c* (e.g., diode 422*c* and/or diode 432*c*) may be any suitable type of diode, such as a Schottky diode, a transistor in diode configuration (e.g., a diode connected transistor), and/or the like. In some embodiments, one or each non-linear electrical sub-circuitry of non-linear electrical circuitry 423*c* may include any suitable number (e.g., two or three or four or more) of diodes that may be coupled together in series (e.g., a cathode of one diode may be coupled to an anode of a next diode and/or the like). Alternatively, as shown, only a single diode may be provided by each non-linear electrical sub-circuitry, where an anode of diode 422*c* may be electrically coupled to body stylus circuitry 427*c* and where a cathode of diode 422*c* may be electrically coupled to front tip interface component 421*c* via any suitable switch circuitry 429*c'* that may be electrically coupled (e.g., in series) between front tip interface component 421*c* and non-linear electrical sub-circuitry 422*c'*, and/or where a cathode of diode 432*c* may be electrically coupled to body stylus circuitry 427*c* and where an anode of diode 432*c* may be electrically coupled to front tip interface component 421*c* via any suitable switch circuitry 439*c'* that may be electrically coupled (e.g., in series) between front tip interface component 421*c* and non-linear electrical sub-circuitry 432*c'*. Switch circuitry 429*c'* may include any suitable number of any suitable type(s) of switch element(s) 429*c*, and switch circuitry 439*c'* may include any suitable number of any suitable type(s) of switch element(s) 439*c*, where, for example, one, some, or each switch element may be a high impedance switch, such as a field-effect transistor ("FET") (e.g., a metal-oxide-semiconductor field-effect transistor ("MOSFET")) or any other suitable switch that may be controlled in any suitable manner (e.g., by a user input button (e.g., via aperture 416) and/or any other suitable pressure or force or the like). Any switch of tip stylus circuitry 426c may be a force or pressure sensitive switch (e.g., a switch may close if more than a certain threshold amount of force is applied to the switch (e.g., switch 429c may be configured to be open unless at least 10 grams of force is applied thereto (e.g., unless a user presses tip interface component 421c against device 100 with at least 10 grams of force) and/or switch 439c may be configured to be open unless at least 20 grams of force is applied thereto (e.g., unless a user presses tip interface component 421c against device 100 with at least 20 grams of force) and/or the like). Additionally or alternatively, any switch of tip stylus circuitry 426c may be a mechanical switch that may be opened or closed by a user pressing or depressing a user interface button (e.g., via an aperture 416) or via any other suitable user action.

Therefore, like stylus 400a, stylus 400c may be operative to provide at least two different stylus identities. For example, due to diode 422c being flipped with respect to diode 432c, such that front tip interface component 421c may provide second harmonics with a first phase when switch 429c is closed and when switch 439c is open whereby diode 422c but not diode 432c is electrically coupled between body stylus circuitry 427c and front tip interface component 421c, and/or such that front tip interface component 421c may provide second harmonics with a second phase different than the first phase when switch 429c is open and when switch 439c is closed whereby diode 432c but not diode 422c is electrically coupled between body stylus circuitry 427c and front tip interface component 421c, and/or such that front tip interface component 421c may provide no second harmonics when each one of switches 429c and 439c is open whereby none of diodes 422c and 432c is electrically coupled between body stylus circuitry 427c and front tip interface component 421c. Alternatively, front tip interface component 421c may provide second harmonics when only one of switch 429c and switch 439c is closed and when the other one of switch 429c and switch 439c is open, whereby only a single one of diode 422c and diode 432c is electrically coupled between body stylus circuitry 427c and front tip interface component 421c, or front tip interface component 421c may provide different (e.g., third) harmonics when each one of switch 429c and switch 439c is closed, whereby each one of diodes 422c and 432c may be electrically coupled between body stylus circuitry 427c and front tip interface component 421c, or front tip interface component 421c may provide no second harmonics or third harmonics when each one of switches 429c and 439c is open, whereby none of diodes 422c and 432c is electrically coupled between body stylus circuitry 427c and front tip interface component 421c. Therefore, device 100 may be configured to determine whether user U may be moving front tip interface component 421c of stylus 400c along I/O interface 111a with only non-linear electrical sub-circuitry 422c' electrically coupled thereto by switch circuitry 429c', or with only non-linear electrical sub-circuitry 432c' electrically coupled thereto by switch circuitry 439c', or with each one of non-linear electrical sub-circuitry 422c' and non-linear electrical sub-circuitry 432c' electrically coupled thereto by switch circuitry 429c' and switch circuitry 439c', or with no non-linear sub-circuitry electrically coupled thereto by any switch circuitry, such that device 100 may be configured to handle the detection of those different tip interface components in different manners. Therefore, use of one or more switching circuitries may be utilized to alter the stylus identity of tip interface component 421c of stylus 400c (e.g., between different harmonics and/or between different phases) rather than utilizing different tip interface components (e.g., as described above with respect to tip interface components 421a and 431a of stylus 400a).

In some embodiments, as shown, circuitry 426c may also include (e.g., in parallel with non-linear electrical circuitry 423c) any suitable resistance circuitry 425c (e.g., at least one resistor 424c (e.g., any suitable force-sensing resistor (e.g., as shown) or any other suitable resistor)) for any suitable function, including, but not limited to, controlling reverse leakage current of non-linear electrical circuitry 423c and/or preventing DC positive voltage build up at the diode by effectively draining off any DC while maintaining non-linearity of circuitry 426c. In some embodiments, such as similarly to resistance circuitry 425a of stylus 400a, the resistance of resistance circuitry 425c (e.g., resistor 424c) may be selected in any suitable manner, such as by using a model of the panel, including its stimulation voltage and capacitance to the tip, and the non-linear device model, and optimizing the model. For an embodiment using one or more Schottky diodes for non-linear electrical circuitry 423c, the optimum may vary, for example, between 4.0-6.0 megohms, or even no additional leakage may be needed.

Any switch described herein as may be provided by any stylus or accessory may be provided in a handle portion, such as behind any diodes or resistors or non-linear electrical circuitry or tip stylus circuitry. Such a switch may be operative to break a DC path between them, which may effectively turn off non-linearity because a DC voltage may build up across the diode(s), and the reverse bias may not allow any current to flow. This may be used as a signal to (e.g., detectable by) the sensor circuitry of I/O interface 111a of device 100, or to "break" or lift the pen. Additionally or alternatively, this may be done with a switch that may turn on only when pressure is applied to the tip of the stylus/accessory, which may enable a "make/break" on force rather than on estimated Z-height (e.g., as mentioned herein).

Figure 5:
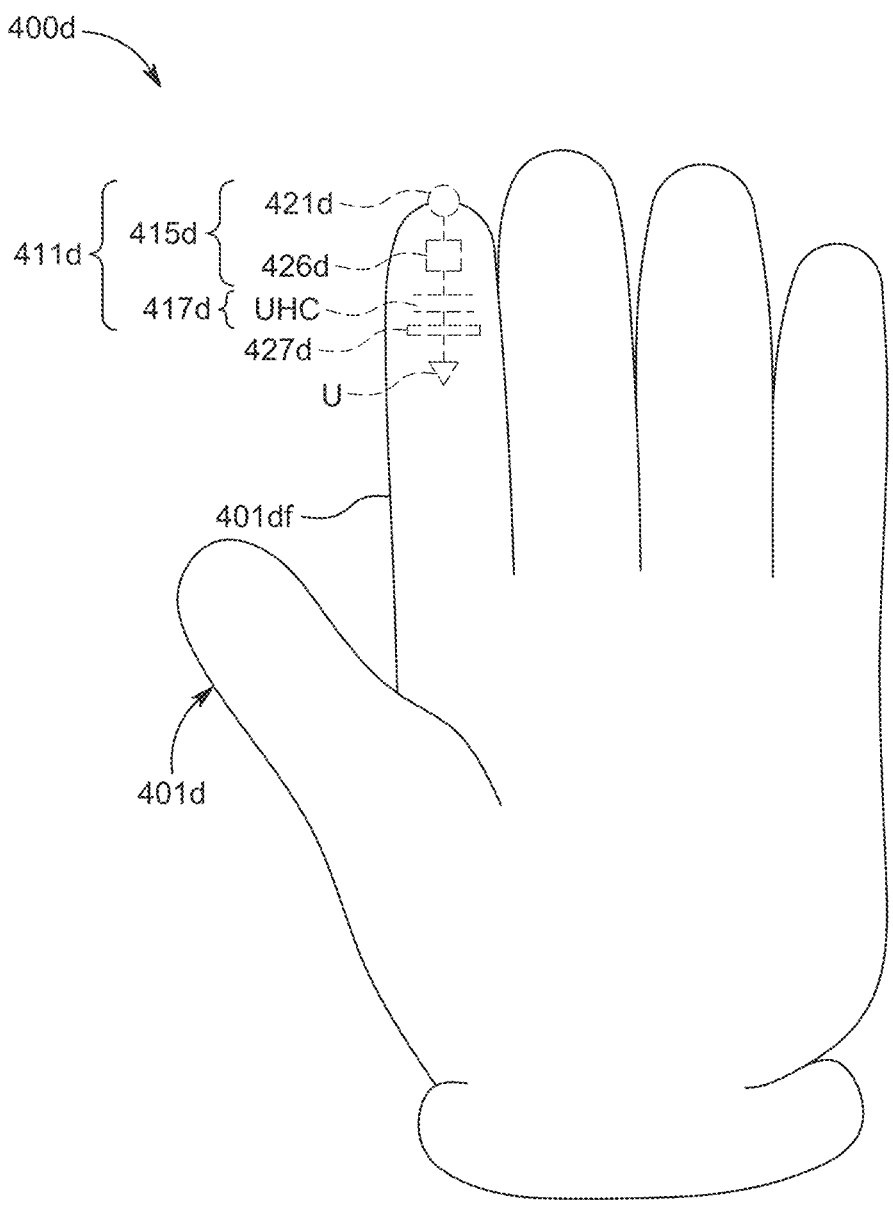
FIG. 5 is a partially transparent, semi-schematic view of an illustrative portion of yet another accessory of the system of FIGS. 1-1D.

Yet another accessory 400d, as shown in FIG. 5, for example, may be similar to stylus 400a or any other stylus of this disclosure, except as described herein. Accessory 400d may be configured with an accessory housing 401d of any suitable structure, such as a glove, as shown, or any other accessory wearable or otherwise usable by a user for interacting with electronic device 100. Accessory 400d include accessory I/O circuitry 411d that may be similar to stylus I/O circuitry 411a or stylus I/O circuitry 411b and may be operative to be stimulated by external stimulus, such as a device stimulus that may be generated by device I/O circuitry of device I/O interface 111a of electronic device 100 and/or by user U when using accessory 400d (e.g., when a user's hand is wearing glove accessory 400d) and/or by a small power supply of accessory 400d, whereby that stimulation of accessory I/O circuitry 411d may be operative to enable accessory I/O circuitry 411d to provide any suitable accessory electric field that may then be detected by device 100 for estimating the location of accessory 400d. Accessory 400d may include a hollow barrel or finger body portion 417d (e.g., of a finger 401df of body 401d) extending between a front tip portion 415d and a rear tip (or open end) portion, where body portion 417d may be configured to be worn by user U (e.g., by or about or otherwise on a finger of the user) as the user may slide a tip portion of accessory 400d (e.g., a fingertip portion that may electrically expose or otherwise be adjacent front tip interface component 421d of accessory 400d) across input surface 110a of device I/O interface 111a of device 100.

Accessory I/O circuitry 411*d* may include body accessory circuitry 427*d* that may be electrically coupled to front tip accessory circuitry 426*d*. Body accessory circuitry 427*d* may be any suitable circuitry that may be operative to be electrically coupled (e.g., capacitively coupled) to user U when user U is wearing accessory 400*d* (e.g., body portion 417*d* of finger 401*df*) about a portion or against a portion (e.g., finger (e.g., fingertip)) of user U. As shown in FIG. 5, for example, body accessory circuitry 427*d* may be at least one conductive pad extending across a hollow of body portion 417*d* of finger 401*df* for being contacted by a user's finger and/or a ring like conductive structure operative to be worn about a user's finger. Any suitable housing 401*d* of any suitable material(s) may be provided to protect body accessory circuitry 427*d*. When user U is wearing accessory 400*d*, a capacitance or user-handling capacitor (e.g., UHC) may be inherently formed. The capacitance of such a user-handling capacitor may be relatively large compared to a panel to tip capacitance (e.g., electric field response capacitances (e.g., capacitances SDC) between front tip interface component 421*d* and each one of array trace row 111*ar* and array trace column 111*ac* of one or more nodes 111*an* proximate front tip interface component 421*d* when accessory 400*d* is used with device 100), but not so large that electrostatic discharges would be likely to damage the device. Accessory I/O circuitry 411*d* may include a front tip interface component 421*d* that may provide at least a portion of front tip portion 415*d*. Front tip interface component 421*d* may be the portion of accessory 400*d* configured to directly interface with device I/O interface 111*a*. For example, front tip interface component 421*d* of accessory 400*d* may be similar to front tip component 421*a* of stylus 400*a*.

Front tip accessory circuitry 426*d* may be positioned between and electrically coupled to each one of front tip interface component 421*d* and a portion (e.g., a front end) of body accessory circuitry 427*d*. Front tip accessory circuitry 426*d* may be configured as any suitable circuitry (e.g., similar to circuitry 426*a* and/or circuitry 426*c*) that may be operative to provide a non-linear load between body accessory circuitry 427*d* and front tip interface component 421*d* when user U is wearing body 417*d* of accessory 400*d* such that front tip interface component 421*d* of accessory 400*d* may be stimulated by a device stimulus that may be generated by device I/O circuitry of device I/O interface 111*a* of electronic device 100. Alternatively, front tip accessory circuitry 426*d* may be configured as any suitable circuitry that may be operative to function similarly to circuitry 426*b* and/or any other tip accessory circuitry described herein. Therefore, while the overall structure of accessory 400*d* may resemble a glove or any other suitable wearable accessory rather than a stylus, accessory 400*d* may be utilized similar to any stylus described herein.

Figure 6A:
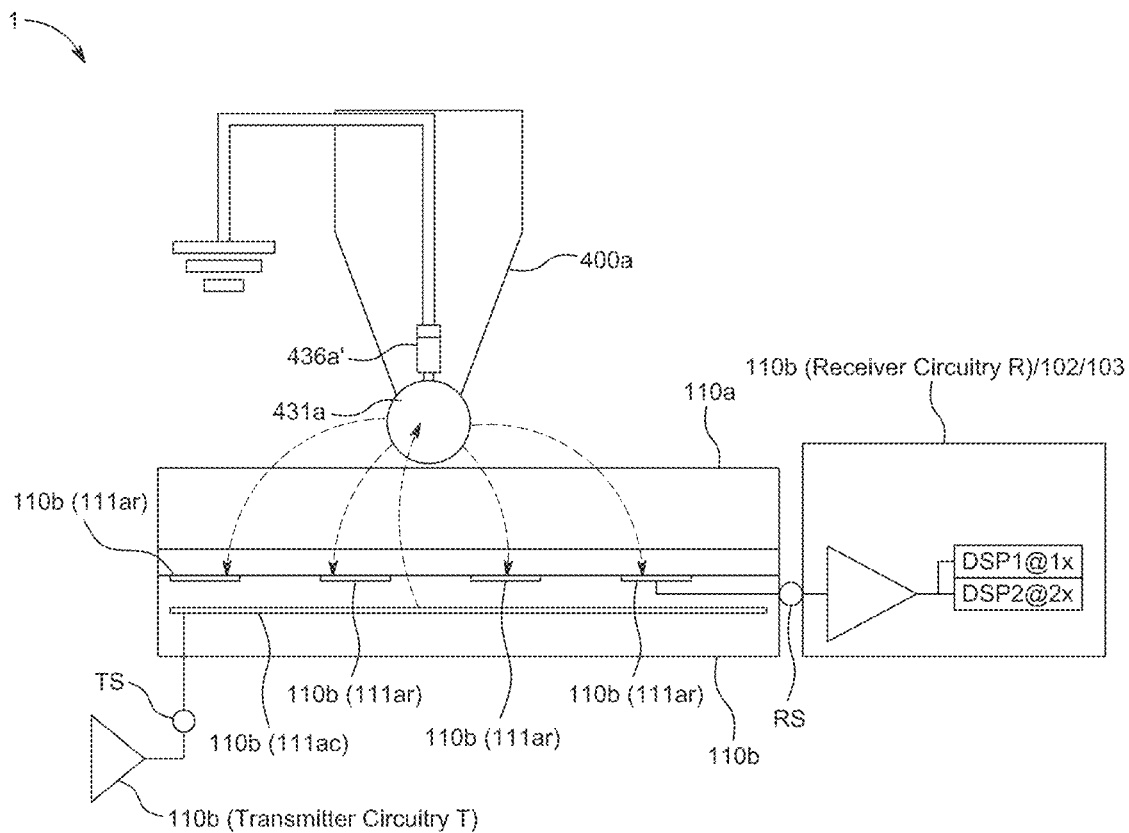
FIG. 6A is a schematic view of a portion of the system and a cross-sectional view of another portion of the system and stylus of FIGS. 1-1D and 6.

As mentioned, and as further shown in FIGS. 6 and 6A, sensor layer 110*b* of electronic device 100 may be configured to provide a matrix or array or grid of any suitable number of array trace columns 111*ac* and any suitable number of array trace rows 111*ar*, any two of which may intersect to provide a sensing node. Array trace columns 111*ac* may also be referred to herein as transmit electrodes, while array trace rows 111*ar* may also be referred to herein as receive electrodes. In some embodiments, each one of these transmit and receive electrodes may be formed, at least in part, from an optically transparent conductor, such as, but not limited to, metal oxides such as indium-tin oxide and antimony-tin oxide, nanowire patterns formed from silver nanowire, carbon nanotubes, platinum nanowire, gold nanowire, and so on, thin deposits of metal, and the like.

Each transmit electrode may provide any suitable capacitance (e.g., $C^j_{xd}$) and each receive electrode may provide any suitable capacitance (e.g., $C^i_{xs}$). As shown, the transmit electrodes may be provided in an array that may be orthogonal to the receive electrodes (e.g., below the receive electrodes) in a matrix, while the array or matrix of orthogonal transmit electrodes and receive electrodes of sensor layer 110*b* may be provided below or otherwise adjacent (e.g., etched into or layered on or otherwise positioned against) input surface input component 110*a* (e.g., glass). It is to be understood that although various direction and orientational terms, such as "column" and "row," and "X-" and "Y-" and "Z," "up" and "down," "front" and "back," "left" and "right," "upper" and "lower," "top" and "bottom" and "side," "above" and "below," "vertical" and "horizontal" and "diagonal," "length" and "width" and "thickness" and "diameter" and "cross-section" and "longitudinal," and/or the like, may be used herein, such references are only for convenience, and that no fixed or absolute directional or orientational limitations are intended by the use of these words. If reoriented, different directional or orientational terms may need to be used in their description, but that will not alter their fundamental nature as within the scope and spirit of the subject matter described herein in any way. For example, while an "X-Y" layout may be referenced with respect to I/O component 111*a*, a diagonal lattice layout, where there may be no dedicated X- or Y-elements, but where each element may be transmitting or sensing at different times during a scan of the touch screen, may be utilized for enabling use of any stylus or accessory described herein. Thus, references to the details of the described embodiments are not intended to limit their scope.

Any suitable electrical signal (e.g., transmit signal) TS, such as any suitable voltage waveforms (e.g., sinusoidal drive or trapezoidal voltages) (e.g., $V^j_{stim}$), may be emitted or transmitted on one, some, or each transmit electrode by any suitable transmitter circuitry T of I/O interface 111*a* (e.g., of sensor layer 110*b*). Such a transmit signal TS may drive non-linear circuitry of a stylus (e.g., circuitry 436*a'* of stylus 400*a*) that may be positioned on input surface 110*a*, and such non-linearity may produce harmonics or any other suitable non-linear aspects of transmit signal TS. Any suitable electrical signal (e.g., receive signal) RS, such as any suitable sensed current (e.g., $I^i_{sense}$), may be detected by any suitable receiver circuitry R of I/O interface 111*a* (e.g., of sensor layer 110*b*) that may be provided along each one of the receive electrodes or that may be shared and used serially with two or more receive electrodes. As shown, receiver circuitry R may be any suitable circuitry, such as any suitable operational amplifier circuitry (e.g., a current sense amplifier (e.g., with feedback)) and an analog-to-digital converter ("ADC") that may be operative to digitize a current or other signal that may be sensed on a receive electrode (e.g., receiver circuitry R may be operative to hold other electrodes at virtual ground and utilize a current to voltage amplifier and then digitize the voltage on the receive electrode). Then, any suitable digital signal processing ("DSP") may be provided by processor 102 and any suitable application 103 running thereon in combination with the circuitry of I/O interface 111*a* (e.g., circuitry T and circuitry R of sensor layer 110*b*) in order to extract any non-linear aspects of the receive signal RS with respect to the transmit signal TS (e.g., to demodulate the second harmonic of a sine wave) and then to estimate a position of the stylus or accessory tip with respect to device 100 (e.g., X-Y location along the surface of input component 110*a*) based on the extracted non-linear aspects.

Figures 6B, 6C, 6D, 6E, 6F:
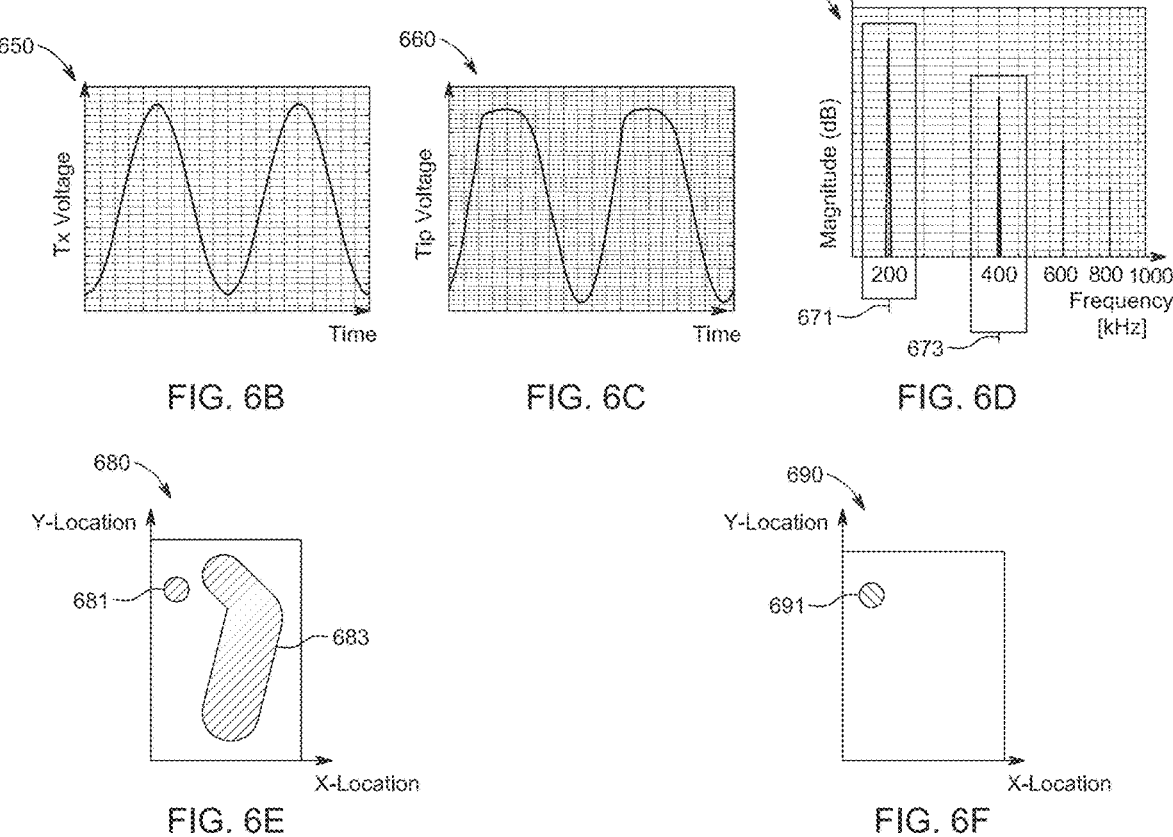
FIG. 6B is a plot over time of an exemplary voltage applied to a transmit electrode of the system of FIGS. 1-1D, 6, and 6A.
FIG. 6C is a plot over time of an exemplary voltage provided by a tip of the stylus of the system of FIGS. 1-1D, 6, and 6A.
FIG. 6D is a plot of an exemplary magnitude with respect to frequency of an applied voltage as sensed by a receive electrode of the system of FIGS. 1-1D, 6, and 6A.
FIG. 6E is a first depiction of sensed external element(s) on a surface of the electronic device of the system of FIGS. 1-1D, 6, and 6A.
FIG. 6F is a second depiction of sensed external element(s) on a surface of the electronic device of the system of FIGS. 1-1D, 6, and 6A.

For example, graph 650 of FIG. 6B may be indicative of an exemplary plot over time of an exemplary transmit voltage, such as a voltage transmit signal TS that may be applied by circuitry T to a transmit electrode of sensor layer 110b of I/O interface 111a. Graph 660 of FIG. 6C may be indicative of an exemplary plot over time of an exemplary tip voltage, such as a voltage receive signal RS that may be sensed by circuitry R as provided on a receive electrode of sensor layer 110b of I/O interface 111a by a tip of a stylus (e.g., tip 431a of stylus 400a (e.g., with non-linear circuitry 436a')) when the tip may be stimulated by the transmit voltage of graph 650 (if no tip is present, then the transmit electrode may be just a pure capacitance, and the current sensed may be reactively related through the capacitance, and may be out of phase but still similar to the transmit signal (e.g., sinusoidal, not asymmetrically distorted)). Graph 670 of FIG. 6D may be indicative of an exemplary plot of an exemplary magnitude with respect to frequency of an applied voltage (e.g., voltage transmit signal TS of graph 650) as sensed by a receive electrode (e.g., voltage receive signal RS of graph 660), for example, as may be determined by the DSP of device 100. For example, as shown, graph 670 may identify a fundamental frequency (e.g., first harmonic) 671 (e.g., at a frequency of 200 kHz (e.g., a fundamental frequency of transmit signal TS)) and a non-linear aspect (e.g., second harmonic) 673 (e.g., at a frequency of 400 kHz (e.g., a multiple of the fundamental frequency of transmit signal TS)). Therefore, the non-linearity of stylus 400a may double (or otherwise provide any suitable multiple of) a modulation frequency (e.g., a fundamental frequency) of a transmitted signal TS (e.g., from 200 kHz to 400 kHz (see, e.g., FIG. 6D, from a first harmonic 671 to a second harmonic 673)) such that many cycles of non-linearity may be detected, such that noise may be reduced by requiring detection of a harmonic or any other suitable non-linear aspect multiple times within multiple cycles or just once in a single cycle. Depiction 680 of FIG. 6E may be indicative of any external element(s) determined (e.g., by DSP1 (e.g., DSP1@1×) of any suitable processing of device 100) to be sensed on a surface of input component 110a based on any fundamental frequency or first harmonic information (e.g., information of frequency 671 of graph 670) for some or each receive electrode of the system, which, as shown, may be indicative of not only a stylus tip by depiction portion 681 but also a portion of a user's hand by depiction portion 683, while depiction 690 of FIG. 6F may be indicative of any external element(s) determined (e.g., by DSP2 (e.g., DSP2@2×) of any suitable processing of device 100) to be sensed on a surface of input component 110a based on any non-linear aspect or multiple (e.g., second) harmonic information (e.g., information of frequency 673 of graph 670) for some or each receive electrode of the system, which, as shown, may be indicative of only a stylus tip by depiction portion 691 and not also a portion of a user's hand. This may create a unique identifier for a stylus with non-linear circuitry that may resolve certain location detection issues, such as disambiguation, merge, and negative pixel.

Therefore, one DSP per receive electrode demodulation path may be set to two-times the stimulation frequency (e.g., the frequency of the stimulation transmitted signal TS) in order to identify the location of a stylus with non-linear circuitry (e.g., circuitry providing a second harmonic), which may be used to only identify the location of the stylus and not a user that may not provide any non-linearity. Therefore, a transmitted signal (e.g., stimulation voltage (e.g., a pure tone or only with odd harmonics)) may be provided on one or more transmit electrodes to drive non-linear circuitry of a stylus that may produce at a stylus tip harmonic(s) or any other suitable non-linear aspect(s) of the transmitted signal (e.g., asymmetrical distortion due to a non-linear load (e.g., rectifier (e.g., diode))) that may be received as receive signal(s) on one or more receive electrodes and used through any suitable processing (e.g., DSP) to diagnose harmonics or non-linearity (e.g., by identifying non-linearity in a sense current spectrum (e.g., identifying that a sense current spectrum contains a second order harmonic)) to determine where a tip of the stylus may be located with respect to the electrodes.

Figure 7:
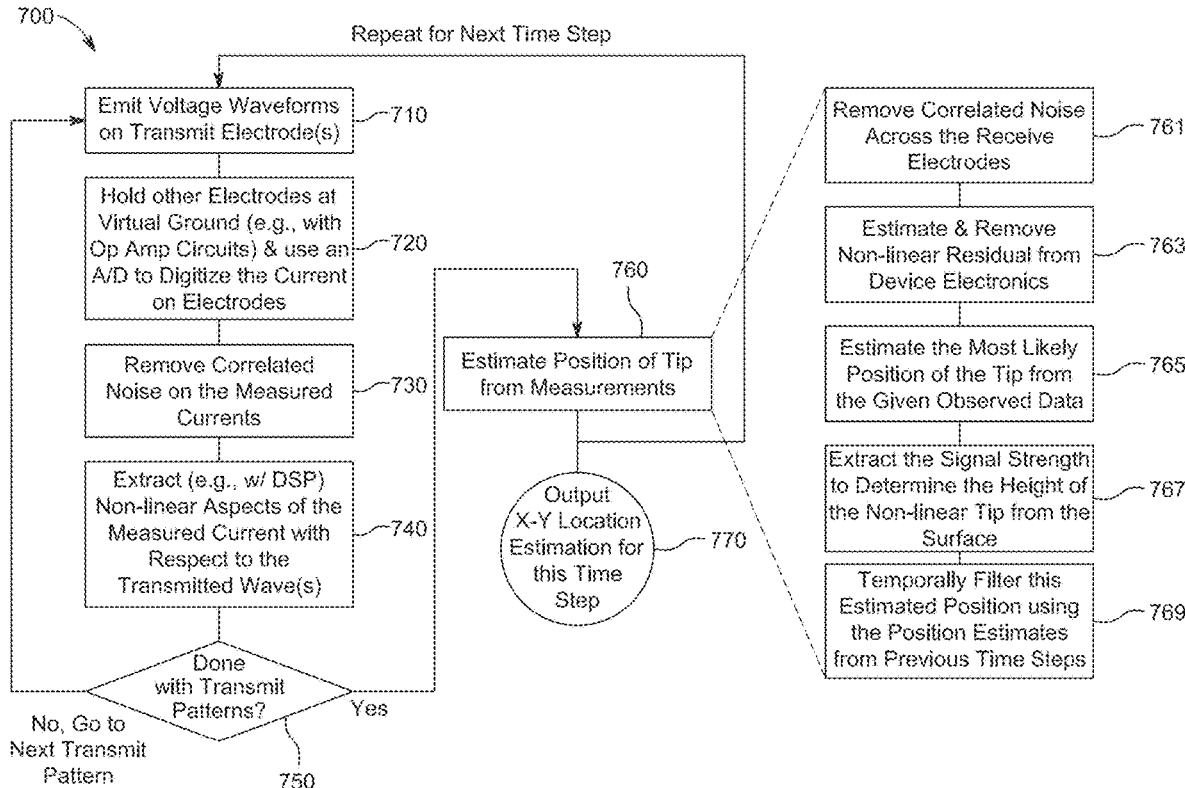

FIG. 7 is a flowchart of an illustrative process 700 for determining a location of a stylus with non-linear circuitry at an input component of an electronic device (e.g., stylus 400a with non-linear circuitry 423a at an input component 110a of electronic device 100). Process 700 may begin at operation 710, where any suitable transmit signal or voltage waveform (e.g., transmit signal TS) may be emitted or otherwise provided by the electronic device on one, some, or each transmit electrode (e.g., each transmit electrode serially) in any suitable manner (e.g., in any suitable transmit pattern (e.g., the same stimulation waveform may be provided with one of two alternated phases (e.g., 0° or 180°) or not provided at all to different transmit electrodes in any suitable transmit pattern (e.g., according to any multi-stim matrix)). The transmit signal may include waveforms with little or negligible second harmonic or a known second harmonic. For example, the second harmonic may be low, such as about 50 db below the fundamental of the waveform. The transmit signal may be a sinusoidal waveform or a non-sinusoidal waveform. For example, a trapezoidal waveform may be generated or approximated by adding first harmonic and some amount of third harmonic and/or fifth harmonic, and/or the like to a sinusoidal waveform, which may not add to the voltage (e.g., Vmax) of the transmitted waveform but that may increase the fundamental of the waveform, which may increase the non-linear aspect (e.g., second harmonic) that may be generated and detected via a non-linear stylus (e.g., stylus 400a with circuitry 426a). Therefore, by adding odd harmonics (e.g., generating a waveform that may only have or may only substantially have odd harmonics), we may essentially drive a trapezoidal waveform that may provide a higher fundamental without a higher Vmax, which may obey certain system constraints while also increasing the non-linear aspect (e.g., second harmonic) of the transmit signal that may be detectable by the system through use of a stylus with non-linear circuitry.

At operation 720, process 700 may include the electronic device holding other electrodes (e.g., receive electrodes) at virtual ground (e.g., with op amp circuitry (e.g., current to voltage amplifier)) and digitize (e.g., with an ADC) any current sensed (e.g., a receive signal RS) on the electrodes (e.g., on one, some, or each receive electrode). For example, any suitable receive circuitry R of sensor layer 110b of I/O interface 111a may be capacitively coupled to a node (e.g., a capacitive sensing node of the array of receive and transmit electrodes) and may use any suitable feedback circuitry to maintain at a constant voltage and/or at virtual ground and may then output a voltage (e.g., tip voltage) to an ADC. While the receive signal(s) RS sensed at operation 720 may generally be sensed on one or more receive electrodes, device 100 may additionally or alternatively be configured to monitor the current on the drive electrodes for determining one or more receive signals RS. For example, a current at a drive electrode may be measured that may include a harmonically driven portion or otherwise non-linearly or asymmetrically distorted portion when a stylus with non-linear circuitry is affecting one or more transmit signal(s) on one or more drive electrodes. At operation 730, process 700 may include removing any correlated noise on the measured currents (e.g., the received signal(s) RS of the receive electrode(s) (and/or of the drive electrode(s)) of operation 720).

At operation 740, process 700 may include extracting (e.g., with the electronic device (e.g., using any suitable DSP) any suitable non-linear aspects of the measured current with respect to the transmitted waveforms. For example, operation 740 may include demodulating a second harmonic of a sinusoidal transmit signal TS of operation 710 from a current receive signal RS sensed at operation 720. Operation 740 may include carrying out any suitable comparison of a sensed output current on a receive electrode with respect to an input voltage provided on a transmit electrode in order to identify a non-linear aspect (e.g., a second or third or other suitable harmonic or asymmetric distortion or non-linear distortion of the fundamental (e.g., of the transmit signal at the receive signal)). At operation 750, it may be determined if all transmit patterns for a current time step have been carried out, and, if not, process 700 may return to operation 710 and once again carry out operations 710-740 for another transmit pattern for the current time step. However, if all transmit patterns for a current time step have been carried out, process 700 may proceed from operation 750 to operation 760. In some embodiments, for a particular time step of device 100, one, some, or each transmit electrode may be modulated (e.g., provided with a transmit waveform TS) one at a time and an output on one, some, or each receive electrode may be measured at operations 710-750. Alternatively, to be more efficient, for a particular time step of device 100, a correlated pattern (e.g., invertible Hadamard matrix) of transmit electrodes may be modulated (e.g., provided with a transmit waveform TS) and an output on one, some, or each receive electrode may be measured at operations 710-750. However, generally, for a particular time step of device 100, one or more transmit electrodes may be stimulated (e.g., serially or in various patterns) and receive signal data may be extracted from one or more receive electrodes (and/or drive electrodes) for use in identifying non-linear aspects for determining a location of a non-linear accessory or stylus during that particular time step. At operation 760, process 700 may include estimating (e.g., using any suitable processing of device 100) a position of a tip of an accessory on an input surface of the electronic device for a particular time step of the device using the measurements of operations 710-740 for the particular time step. At operation 770, process 700 may include outputting (e.g., using any suitable processing of device 100) an X-Y location estimation for the tip of the accessory for the particular time step, while process 700 may also return to operation 710 and repeat the process for a next time step of the device. Such an output X-Y location estimation for the accessory tip may be utilized (e.g., using any suitable processing and/or other component(s) of device 100) in any suitable manner for carrying out or adjusting any suitable functionality of the system, such as for adding graphical object data to a presented display on device 100 or adjusting the position of a cursor on device 100 or selecting an option associated with a graphical object displayed by device 100 at that X-Y location and/or the like.

As just one example, operation 760 may include one or more sub-operations, such as operations 761, 763, 765, 767, and/or 769. For example, operation 761 may include removing any suitable correlated noise across the receive electrodes (e.g., in addition to or as an alternative to the removal at operation 730). For example, in a given time step, multiple receive electrodes may be receiving current or any other signal(s) that may be sensed at operation 720, such that any or all noise that may be common mode or linearly related between those receive electrodes may be removed (e.g., as an effective procedure to improve signal to noise ratio). At operation 763, any suitable non-linear residual may be estimated and removed from any suitable electronics of device 100 (e.g., any second harmonic of the fundamental that may be emitted by any electronics of device 100 that may interfere with the accuracy of process 700). At operation 765, the most likely position (e.g., X-Y location) of the tip from the given observed data (e.g., as observed earlier in process 700 for the particular time step (e.g., as may have been adjusted through removal of noise and residuals)) may then be estimated. At operation 767, a signal strength of any signals of process 700 (e.g., the signal strength of any receive signals RS of operation 720) may be extracted to determine the height of the tip from the surface of input surface 110a. Such a determined height may be used by device 100 to determine whether or not the stylus is touching input surface 110a or otherwise determine whether the position of the tip being estimated is a position intended to be identified as an intentional stylus input event (e.g., to determine if the stylus is intended to be used as an input device for drawing a line or if the stylus is not intended to be used as an input device but is rather lifted off the input surface and is being moved to a new location for a new input event). At operation 769, the estimated position for the particular time step of operation 765 (e.g., if not to be disregarded due to an insufficient signal strength of operation 767) may be temporally filtered using any suitable estimated positions from previous iterations of process 700 for previous time steps. For example, any suitable temporal filter may be configured to provide estimates for where a tip is for a particular time step that may be smoothed out based on earlier estimates for earlier time steps before presenting an estimated location for the current time step for use at operation 770 (e.g., before the estimate is presented to an operating system or specific stylus-position dependent application that may be running on device 100).

Any suitable process(es) may be carried out (e.g., automatically by any suitable processing/application(s) of device 100) in order to estimate the most likely position of the tip of the stylus. For example, the non-linear aspects and/or any other determined information from operations 710-763 for a particular time step may be compared to outputs of any suitable model for an array of various possible X-Y locations and then find the model output that compares most favorably to the data determined for the current time step (e.g., using best fit via a least squares method) and then using the X-Y location of that model output as the estimated location of the stylus tip for the current time step. Such a model may be generated in any suitable manner. For example, such a model may be a mathematical model built based on a physics model of capacitance to the tip of the stylus and based on a circuit simulator model (e.g., simulation program with integrated circuit emphasis ("SPICE") model) of the electronic device. For example, such a physics model may utilize finite element analysis ("FEA") to physically diagram the interaction between the stylus and the device in order to calculate the expected fields (e.g., location of tip to location of capacitance), which may include a calculation of capacitance between transmit and receive electrodes for every possible position of the stylus tip with respect to the device's input surface, while such a circuit simulator model may utilize circuitry information about the circuitry (e.g., any suitable non-linear elements) of device 100 and/or of the stylus. The combined mathematical model may then be utilized to generate various sets of outputs, where each set may be indicative of the receive signal RS expected to be received at each device electrode when the tip is at a respective one of the various possible X-Y locations along the device's input surface. Such sets of model outputs may then be compared to an actual set of outputs by the device as determined at operations 710-763 for a particular time step in order to determine the best fit model output set in order to use the X-Y position associated with that best fit model output set as the estimated most likely position of the stylus with respect to device 100 for that particular time step.

In some embodiments, a magnitude of the force or pressure exerted by the accessory tip on the input surface may be determined by the electronic device. For example, a phase angle between the fundamental of a transmit signal and a non-linear aspect of a sensed receive signal may be identified and used to determine an amount of pressure exerted by the stylus (e.g., when a signal is demodulated to extract a second harmonic, the in-phase and quadrature ("I&Q") components and phase angle may be realized by such processing). For example, the resistance of resistance circuitry 425c may be selectively adjusted by a user during use of stylus 400c, which may adjust voltage of tip voltage and/or the phase angle between the fundamental of the transmit signal and the non-linear aspect of the detected receive signal. For example, a strain sensitive or force-sensing or any other suitable resistor 424c may be provided by resistance circuitry 425c that may adjust the resistance of resistor 424c based on how much force or pressure is applied thereto. Therefore, a stylus may be configured such that an amount of force used by the user to press the stylus tip against an input surface of an electronic device may adjust the amount of resistance provided by resistance circuitry (e.g., resistance circuitry in parallel with non-linear circuitry of that stylus). Such resistance adjustment may adjust the voltage of a receive signal and/or the phase angle detected by the electronic device and may be used to estimate the amount of force used by the user and stylus, which may provide yet another input for affecting the functionality of device 100 (e.g., in addition to an estimated location of the stylus (e.g., such that location and force of the stylus may together be used to determine how the device adjusts a device functionality (e.g., draw a light green line at a location or draw a dark green line at the location))). As just one example, an output of the model described with respect to operation 765 may include a phase angle output that may then be associated with a force output or the model may include a force output based on a determined phase angle.

In some embodiments, selective or dynamic scanning may be utilized to make process 700 more effective and/or efficient. For example, from one or more previous iterations of process 700 for one or more previous time steps, a previous location of a stylus may be estimated, and such an estimated location may be used to selectively or dynamically limit the electrodes that may be used in a current iteration of process 700 for a current time step (e.g., to only transmit signal(s) on certain transmit electrodes that may be proximate to the earlier estimated location and/or to only sense receive signal(s) on certain receive and/or transmit electrodes that may be proximate to the earlier estimated location), which may speed up processing and/or reduce power consumption for such a process. Different modes of location detection may be used for different types of external inputs, such as direct user touch, stylus with non-linear circuitry (e.g., stylus 400a), stylus with pattern generating circuitry (e.g., stylus 400b), and/or the like. For example, as shown by FIG. 6, a first DSP1 may be used to detect fundamental information of any external element(s) that may be used to determine the location of a user and/or any stylus or accessory (see, e.g., depiction 680 of FIG. 6E), while a second DSP2 may be used to detect non-linear information of any external element(s) that may be used to determine the location of a stylus or accessory with non-linear circuitry (see, e.g., depiction 690 of FIG. 6F). Such different modes may be switched temporally such that each mode may be carried out for a single time step (e.g., in a time slice fashion). The detected location data for external element(s) that may be generated by each mode for a single time step (e.g., data of depiction 680 and data of depiction 690) may be utilized together to provide one or more improved location estimates (e.g., for a stylus with non-linear circuitry) and/or to provide a more effective and/or efficient localization process. Additionally or alternatively, such temporally switched modes may allow for the concurrent detection of different styli during a single time step, such as by using a first mode to detect a first non-linear aspect (e.g., a second harmonic or a harmonic with a first phase) and by using a second mode to detect a second non-linear aspect (e.g., a third harmonic or a harmonic with a second phase).

It is understood that the operations shown in process 700 of FIG. 7 are only illustrative and that existing operations may be modified or omitted, additional operations may be added, and the order of certain operations may be altered. While FIGS. 6, 6A-6F, and 7 may be discussed generally with respect to second order harmonic extraction as a particular type of non-linear aspect that may be utilized for stylus localization, it is to be understood that any other suitable type of non-linear aspect may be detected and utilized according to process 700, such as third order harmonic with respect to a stylus with non-linear circuitry providing two diodes in parallel, for example.

FIG. 8 is a flowchart of an illustrative process 800 for using a stylus that may include non-linear circuitry at an input component of an electronic device (e.g., stylus 400a with non-linear circuitry 423a at an input component 110a of electronic device 100). Process 800 may begin at operation 802, where an electrical signal may be transmitted from transmitter circuitry of the input component of the electronic device (e.g., signal TS). At operation 804, the non-linear circuitry of the stylus may be stimulated with the transmitted electrical signal. At operation 806, a non-linear load may be provided at the stylus based on the stimulating of operation 804. At operation 808, a harmonic of the transmitted electrical signal may be created at the input component of the electronic device based on the non-linear load provided at operation 806. Then, for example, the created harmonic may be detected with the electronic device and, based on the detecting, a position of the stylus with respect to the input component may be determined.

It is understood that the operations shown in process 800 of FIG. 8 are only illustrative and that existing operations may be modified or omitted, additional operations may be added, and the order of certain operations may be altered.

Figure 9:
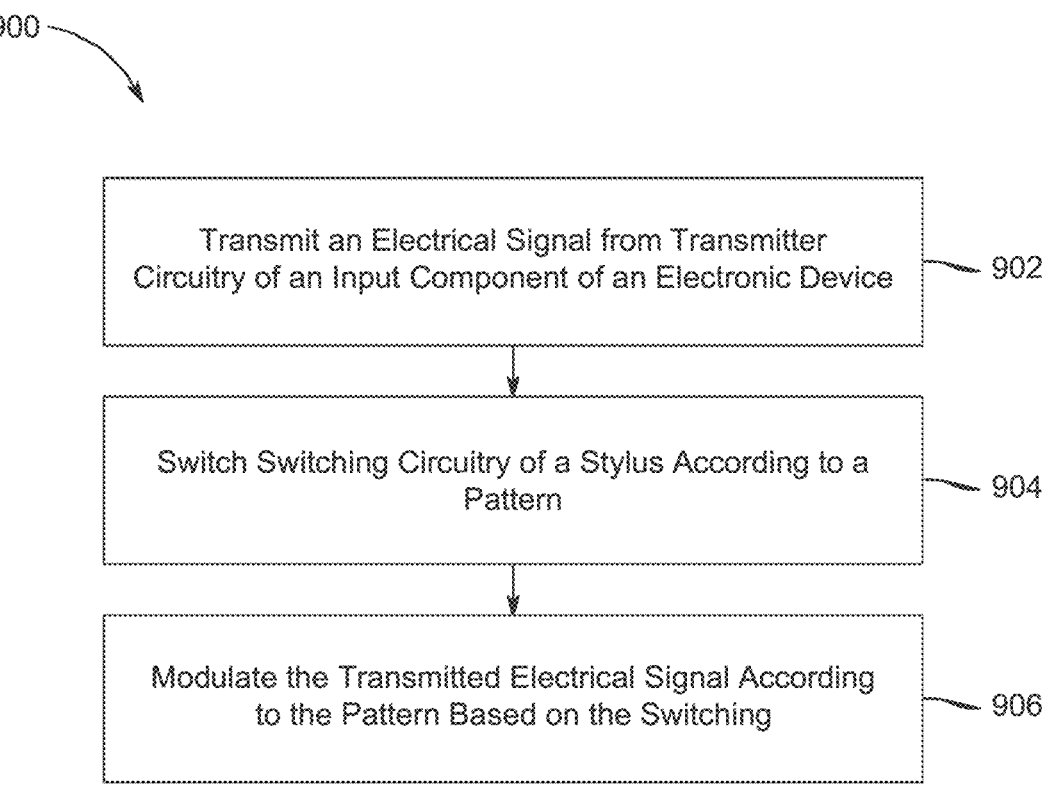

FIG. 9 is a flowchart of an illustrative process 900 for using a stylus that may include switching circuitry at an input component of an electronic device (e.g., stylus 400b with switching circuitry 423b at an input component 110a of electronic device 100). Process 900 may begin at operation 902, where an electrical signal may be transmitted from transmitter circuitry of the input component of the electronic device (e.g., signal TS). At operation 904, the switching circuitry may be switched according to a pattern (e.g., concurrently with operation 902). At operation 906, based on the switching of operation 904, the transmitted electrical signal may be modulated according to the pattern. Then, for example, the modulated electrical signal may be detected with the electronic device and, based on the detecting, a position of the stylus with respect to the input component may be determined.

It is understood that the operations shown in process 900 of FIG. 9 are only illustrative and that existing operations may be modified or omitted, additional operations may be added, and the order of certain operations may be altered.

FIG. 10 is a flowchart of an illustrative process 1000 for detecting an accessory on an input surface of an input component of an electronic device that includes a matrix of a plurality of transmit electrodes and a plurality of receive electrodes (e.g., for detecting any accessory or stylus 400-400*d* on input surface 110*a* of I/O component 111*a* that includes an array of electrodes). Process 1000 may begin at operation 1002, where a transmit signal may be transmitted on each transmit electrode of at least a subset of the plurality of transmit electrodes (e.g., a transmit signal TS may be transmitted by transmitter circuitry T of device 100). At operation 1004, a receive signal may be sensed on each receive electrode of at least a subset of the plurality of receive electrodes (e.g., a receive signal RS may be sensed by receiver circuitry R of device 100). At operation 1006, data indicative of a non-linear aspect of the transmit signal may be extracted from each sensed receive signal (e.g., as described with respect to operation 740 of process 700), and, at operation 1008, a position of the accessory on the input surface may be estimated based on the extracted data (e.g., as described with respect to operation 760 of process 700). Additionally or alternatively, as described in more detail below, in some embodiments, an applied force at the tip of the accessory or a tilt of the accessory may be estimated based on the extracted data (e.g., by estimating the effective resistance based on the extracted phase information). For example, at operation 1010, a force applied to the accessory in contact with the surface of the electronic device or a tilt angle of the accessory relative to the surface of the electronic device can be based on the extracted data (e.g., based on extracted phase as described below).

It is understood that the operations shown in process 1000 of FIG. 10 are only illustrative and that existing operations may be modified or omitted, additional operations may be added, and the order of certain operations may be altered. Different transmit signals may be transmitted on different transmit electrodes of at least the subset at operation 1002 (e.g., at the same time or at different times), and data indicative of a non-linear aspect of those transmit signals may be extracted at operation 1006 from the sensed receive signals.

Styli and other accessories described herein may be positioned and/or moved against an input surface of an input component of an electronic device while varying one or more physical interaction characteristics (e.g., a variable amount of force (e.g., applied force Fα), a variable angle of tilt (e.g., polar angle 118 (θ)), and/or the like). Therefore, various features may be provided by the accessories for enabling such variable physical interaction characteristic(s) to be detectable by the electronic device. Any tip stylus circuitry of any suitable tip portion of any suitable accessory may be provided with any suitable physical interaction characteristic ("PIC") circuitry for varying a resistance or other suitable electrical property of the accessory based on the variance of any suitable physical interaction characteristic of the accessory (e.g., with respect to the input surface of the electronic device). As mentioned, tip stylus circuitry of a passive accessory may include any suitable non-linear circuitry (e.g., any suitable number of diodes), which may be provided in parallel or otherwise with any suitable resistance circuitry, and such tip stylus circuitry may provide a non-linear load for providing a stylus electric field that is detectable by the electronic device as a modulated or non-linear version of an electrical signal provided by the electronic device when that electrical signal is stimulating the tip stylus circuitry. Such tip stylus circuitry (e.g., the resistance circuitry of such tip stylus circuitry) may be provided with any suitable PIC circuitry that may be operative to adjust, based on any suitable physical (e.g., mechanical) accessory interaction(s), a resistance of the tip stylus circuitry and, thus, an electrical response (e.g., magnitude and/or phase) of the stylus electric field that may be detectable by the electronic device. For example, a strain sensitive or force-sensing or any other suitable resistor may be provided as PIC circuitry of tip stylus circuitry that may adjust the resistance of the tip stylus circuitry based on how much force or pressure is applied thereto. Therefore, an accessory may be configured such that varying an amount of force used by the user to press the tip against an input surface of an electronic device and/or varying an angle of tilt used by the user to press the tip against the input surface of the electronic device may adjust the amount of resistance provided by that accessory (e.g., by resistance circuitry of that accessory). Such resistance adjustment may adjust the voltage of a receive signal and/or the phase angle detected by the electronic device and may be used to estimate the amount of force and/or angle of tilt and/or the like used by the user and accessory. The amount of force and/or angle of tilt may provide yet another input for affecting the functionality of the electronic device (e.g., in addition to an estimated location of the accessory). For example, a location of the accessory and force and/or tilt angle of the accessory may together be used to determine how the device adjusts a device functionality. For example, a characteristics of inking of a stylus may depend on force and/or tilt, such that the force and/or tilt may change the inking color/shade, line thickness, and/or accessory type (e.g., pencil, pen, marker, paintbrush, etc.), among other possibilities. As just one example, drawing a green line at a location can result in inking lighter green line and/or a thinner line at a location and/or inking a dark and/or a thicker green line at the location depending on the applied force and the tilt angle. Referring back to FIG. 7, as just one example, an output of the model described with respect to operation 765 may include a phase angle output that may then be associated with a force output and/or tilt angle, or the model may include a force output and/or tilt output based on a determined phase angle. Generally, any suitable number of operations may be carried out for this purpose of sensing input, including, but not limited to: (1) transduction of input (e.g., force, tilt, heat, etc.) to intermediate quantity (e.g., displacement, strain, temperature acting on device, etc.); (2) transduction of intermediate quantity to change in leakage current for applied voltage (e.g., change of leakage resistance, impedance, change of diode leakage behavior, etc.); (3) transduction of leakage current into change in harmonic (e.g., second harmonic) signal (e.g., amplitude, phase, etc.); and (4) decoding the change in harmonic signal into change in input. As a specific example of such operations: (1) a force change (e.g., user pressing stylus harder against user device) may impart a strain on PIC circuitry (e.g., a resistor) using any suitable mechanism(s); (2) change of resistance in PIC circuitry (e.g., strain sensitive resistor) may impart a change in leakage resistance/leakage current in operation; (3) change in leakage resistance/leakage current may impart a change in a harmonic signal (e.g., amplitude, phase) and calibration information; and then (4) change in harmonic signal may be decoded back into force. A change in leakage resistance/impedance or its inverse, the leakage current (e.g., from either leakage path (e.g., diode or resistor)), may change the second harmonic signal generated in both magnitude and phase. Any suitable input component circuitry of device 100 may be configured to measure (e.g., at its analog to digital converter and DSPs) the full waveform, but, in some embodiments, may only be measuring the I (real) and Q (imaginary) parts (e.g., sin and cosine parts) of the frequencies of interest, thus giving magnitude and phase. In some embodiments, such IQ demodulation may be used, which may be used to extract both I and Q information, and, thus, magnitude and phase. Therefore, at one, some, or every touch frame, both magnitude and phase information may be available (e.g., phase as simple to extract as the magnitude), while noting that the I and Q data may have the same information as magnitude and phase and can be used and transformed into each other interchangeably. Certain algorithms and software routines for use by a device 100 with a stylus may calculate the phase and use phase for decision making (e.g., branching) within the algorithm, and/or may decode the phase and back-calculate or estimate force, tilt, temperature, and/or the like. The phase may be varying due to multiple effects, including, but not limited to, resistance of leakage resistors, diode leakage current (e.g., including diode to diode variation), temperature (e.g., affecting diode leakage current), tip diameter, thickness and dielectric constant of tip material, location dependence on device surface (e.g., impedance variation due to trace length variation), touch device to touch device variation (e.g., impedance variation between user touch devices), thickness and dielectric constants of dielectric stack (e.g., material above touch sensor, including cover glass), any screen protector applied, operating frequency, and/or the like. In some examples, the effective resistance in parallel with the non-linear circuitry can be calculated by modeling the circuit generating the second harmonic (e.g., including the non-linear circuitry and resistive circuitry in parallel), and comparing with the detected magnitude and phase of the measured second harmonic. For example, an iterative approach can be used to minimize the difference between the model and measured second harmonics (e.g., sum of squares of differences in values of the second harmonic for a group of touch electrodes) to estimate the effective resistance.

Figure 11G:
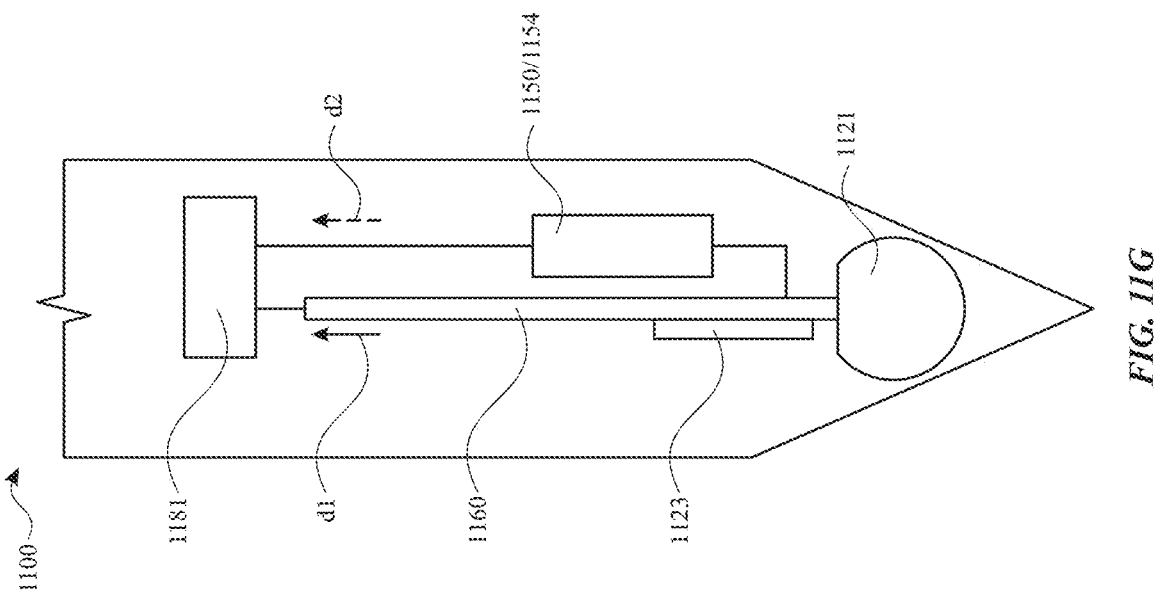
FIG. 11G is a partially transparent, semi-schematic view of the accessory of FIG. 11.
Figure 11:
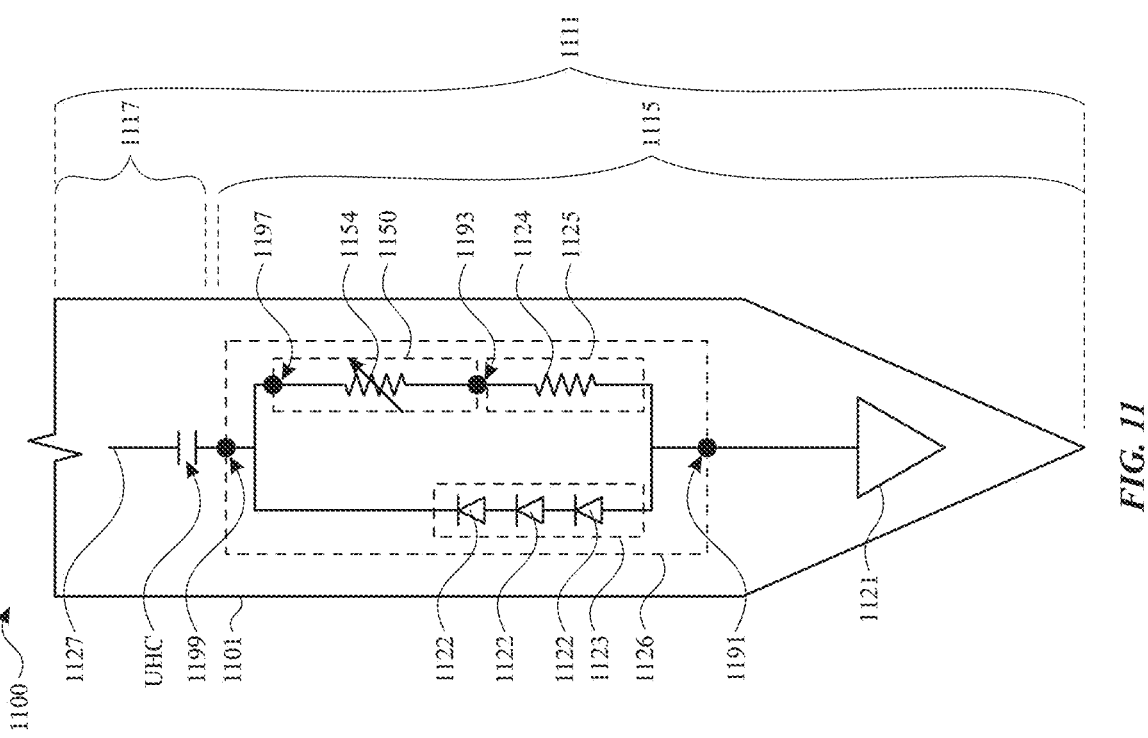
FIG. 11 is a partially transparent, semi-schematic view of an illustrative portion of another accessory.
Figures 11A, 11B:
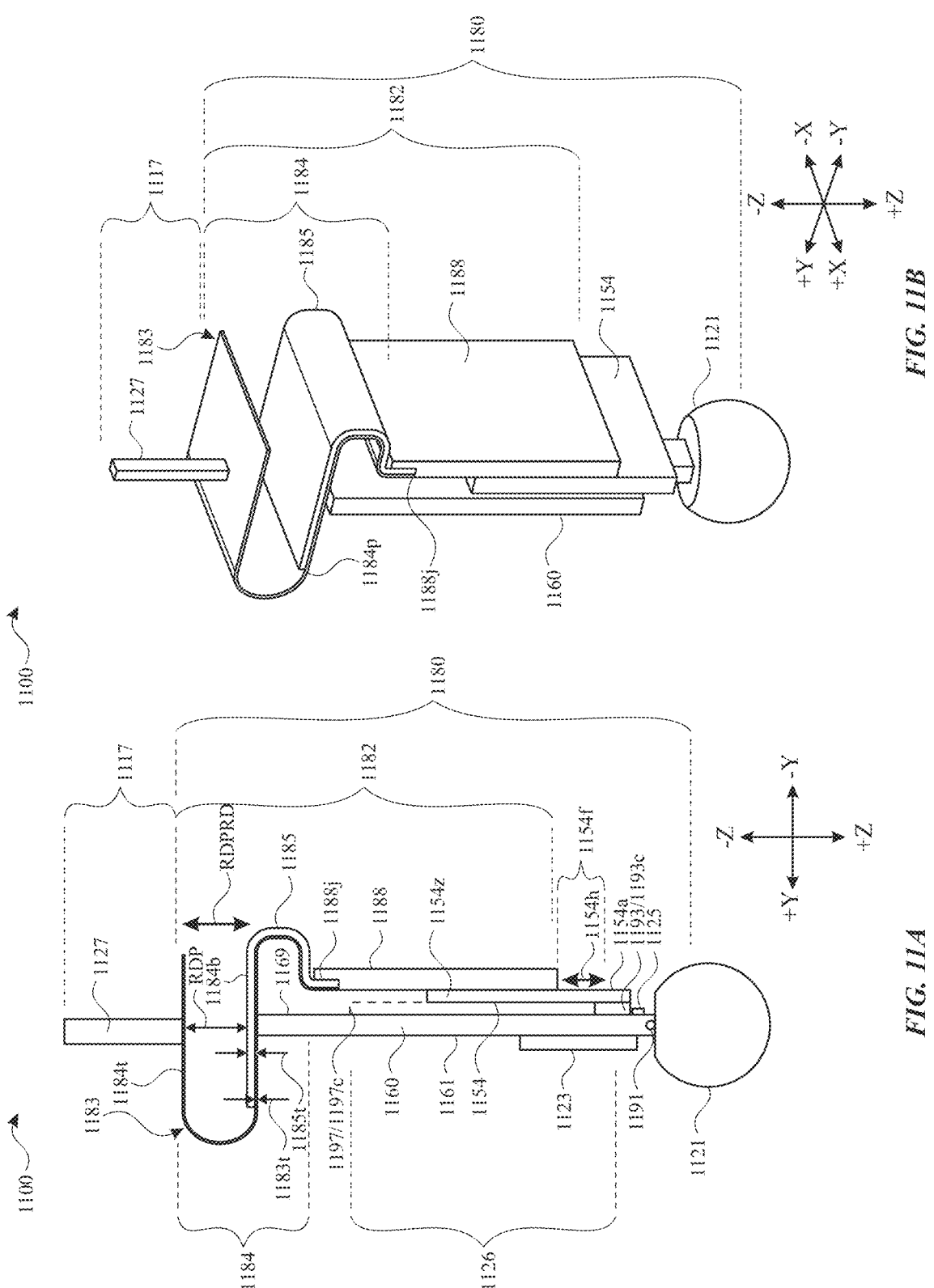
FIG. 11A is a side view of a portion of the accessory of FIG. 11.
FIG. 11B is a perspective view of a portion of the accessory of FIGS. 11 and 11A.
Figures 11C, 11D, 11E:
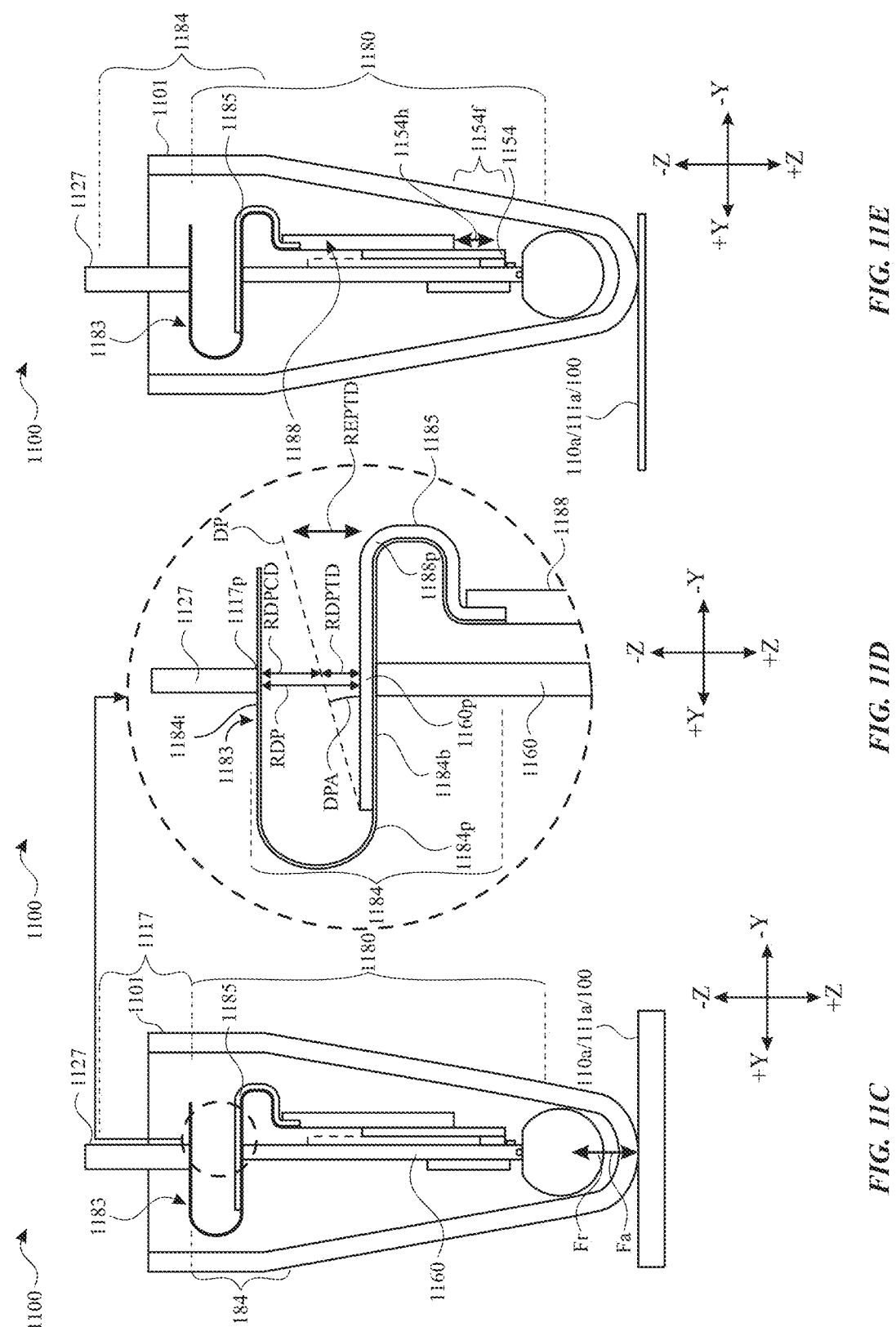
FIG. 11C is a partially transparent, side view of a portion of the accessory of FIGS. 11, 11A, and 11B in use with the electronic device of FIG. 1.
FIG. 11D is a side view of a portion of the accessory of FIGS. 11 and 11A-11C.
FIG. 11E is a partially transparent, side view of a portion of the accessory of FIGS. 11 and 11A-11D, in use with the electronic device of FIG. 1.

As shown in FIGS. 11-11E and 11G, any suitable accessory or stylus 1100 (e.g., which may be the same as or similar to any one or more of accessories or styli 400, 400*a*, 400*b*, 400*c*, and 400*d*) may include any suitable tip portion 1115 (e.g., which may be the same as or similar to any one or more of tip portions 415, 415*a*, 415*b*, 415*c*, 415*d*, 419, and 419*a*) that may be removably or fixedly coupled (e.g., physically and/or electrically) to any suitable body stylus circuitry 1127 (e.g., which may be the same as or similar to any one or more of circuitries 427*a*, 427*b*, 427*c*, and 427*d*) of any suitable barrel or handle or body portion 1117 (e.g., which may be the same as or similar to any one or more of body portions 417, 417*a*, 417*b*, 417*c*, and 417*d*) for providing any suitable accessory or stylus I/O circuitry 1111 (e.g., which may be the same as or similar to any one or more of I/O circuitries tip portions 411, 411*a*, 411*b*, 411*c*, and 411*d*) for use by any suitable user U with any suitable device I/O interface (e.g., device I/O interface 111*a*). Tip portion 1115 may include any suitable tip interface component 1121 (e.g., which may be the same as or similar to any one or more of tip interface components 421*a*, 421*b*, 421*c*, 421*d*, and 431*a*) and any suitable tip stylus circuitry 1126 (e.g., which may be the same as or similar to any one or more of tip stylus circuitries 426*a*, 426*b*, 426*c*, 426*d*, 436*a*, and 436*a'*). Tip stylus circuitry 1126 may be positioned between and electrically coupled to each one of tip interface component 1121 and a portion (e.g., an end) of body stylus circuitry 1127 (e.g., a ground rod (e.g., of a purely capacitively coupled device)). For example, as shown, tip stylus circuitry 1126 may extend between a node 1191 that may be electrically coupled to tip interface component 1121 and a node 1199 that may be electrically coupled to body stylus circuitry 1127. When user U is holding stylus 1100 about and/or along a portion of body 1117, a capacitance or user-handle capacitor UHC may be formed. Tip stylus circuitry 1126 may include any suitable non-linear electrical circuitry 1123 (e.g., which may be similar to any one or more of circuitries 423*a*, 423*b*, 423*c*, and 433*a*) that may be electrically coupled (e.g., in series) between nodes 1191 and 1199 (e.g., between tip interface component 1121 and body stylus circuitry 1127). For example, non-linear electrical circuitry 1123 may include any suitable number of any suitable type(s) of non-linear electrical elements 1122, such as one or more signaling diodes 1122 (e.g., any suitable type of diode, such as a Schottky diode, a transistor in diode configuration (e.g., a diode connected transistor), and/or the like). Non-linear electrical circuitry 1123 may include any suitable number (e.g., one or two or three or four or more) of non-linear electrical elements 1122 (e.g., 3, as shown) that may be coupled together in series (e.g., a cathode of one signaling diode 1122 may be coupled to an anode of a next signaling diode 1122 and/or the like) or in parallel or otherwise (e.g., between node 1191 that may be coupled to tip interface component 1121 and node 1199 that may be coupled to body stylus circuitry 1127). Additionally, tip stylus circuitry 1126 may include (e.g., in parallel with non-linear electrical circuitry 1123 (e.g., between node 1191 and node 1199)) any suitable signaling resistance circuitry 1125 (e.g., which may be the same as or similar to any one or more of circuitries 425*a* and 425*c*). For example, signaling resistance circuitry 1125 may include any suitable number of any suitable type(s) of signaling resistance elements 1124, such as one or more signaling resistors 1124 that may be coupled together in series (e.g., 1, as shown) or in parallel or otherwise, for any suitable function, including, but not limited to, controlling reverse leakage current of non-linear electrical circuitry 1123 and/or preventing DC positive voltage build up at the diode(s) or other non-linear electrical element(s) 1122 of non-linear electrical circuitry 1123 by effectively draining off any DC while maintaining non-linearity of tip stylus circuitry 1126. The resistance of resistance circuitry 1125 may be selected in any suitable manner, such as by using a model of the panel, including its stimulation voltage and capacitance to the tip, and the non-linear device model, and optimizing the model. For an embodiment using one or more Schottky diodes for non-linear electrical circuitry 1123, the optimum may vary, for example, between 4.0-15.0 megohms (e.g., 10.0 megaohms), or even no additional leakage may be needed. Any suitable enclosure(s) or housing 1101 (e.g., which may be the same as or similar to any one or more of housings 401, 401*a*, 401*b*, 401*c*, and 401*d*) may be provided to protect any suitable portion(s) of accessory 1100.

Moreover, as shown, tip stylus circuitry 1126 may include any suitable PIC circuitry 1150, extending between a node 1193 and a node 1197, for varying the resistance of tip stylus circuitry 1126 based on the variance of a force exerted by accessory 1100 on the electronic device input surface, the variance of a tilt angle between accessory 1100 and the electronic device input surface, and/or the variance of any other suitable physical interaction characteristic. For example, PIC circuitry 1150 may be positioned between and electrically coupled to node 1191 and node 1199 (e.g., PIC circuitry 1150 may be electrically coupled in parallel with non-linear electrical circuitry 1123 and in series with resistance circuitry 1125 (e.g., between resistance circuitry 1125 and node 1199 (as shown) or between resistance circuitry 1125 and node 1191) (alternatively, PIC circuitry 1150 may replace resistance circuitry 1125)). For example, PIC circuitry 1150 may include any suitable number of any suitable type(s) of PIC electronic component(s) 1154, such as a pressure or strain or stress or force-sensitive or-sensing resistor ("FSR") and/or a strain gauge (e.g., which may change capacitance to user by having a parallel plate capacitor therebetween) and/or a Wheatstone bridge strain gauge (e.g., which may require active power to operate) and/or the like, for any suitable function, including, but not limited to, changing a resistance thereof in response to a pressure or strain or stress or force applied thereto. As shown in FIGS. 11A-11E and 11G, accessory or stylus 1100 may include a conversion subassembly 1180 that may be configured to convert any force applied by a user to the accessory upon use with an input surface of an electronic device (e.g., a force applied by tip interface component 1121 onto input surface 110a of device 100 (e.g., force Fa/Fr)) or otherwise into a force or pressure or strain or stress applied to PIC circuitry 1150 (e.g., to FSR PIC electronic component 1154). For example, the conversion subassembly 1180 may include a translation amplification unit or subassembly 1181 configured to, when a load of a compressive force applied to tip interface component 1121 by the user and/or device 100 or otherwise is transferred through board 1160, amplify a translation resulting from the applied force. For example, as shown in FIG. 11G, a force applied to the tip interface component 1121 can cause circuit board 1160 to translate a first distance, d1. Translation amplification unit may be configured to stretch PIC circuitry 1150 by a second distance d2, different than that first distance in accordance with the amplification factor of the translation amplification unit 1181 (e.g., a doubling amplification factor results in d2=2*d1). Translation amplification unit or subassembly 1181 may allow for stretching of PIC circuitry 1150 when PIC circuitry 1150 is implemented on or mechanically coupled to board 1160. For example, without the translation amplification unit 1181, the translation of board 1160 by distance d1 results in a corresponding translation of PIC circuitry 1150 by distance d1 (e.g., this equivalent translation results in no stretching of PIC circuitry 1150). As described in more detail with respect to FIGS. 11A-11E, the translation amplification unit 1181 can include hinge subassembly 1182. An advantage of such an implementation may be that such an applied pressure can be measured by the electronic device (e.g., due to such a changed resistance) with almost no latency with respect to the passive accessory user experience (e.g., in contrast to a current active stylus, which may require an applied force or pressure be measured by the stylus and then communicated from the stylus (e.g., via Bluetooth) to the electronic device, which may significantly increase the time delay between measurement and display refresh).

Figure 11F:
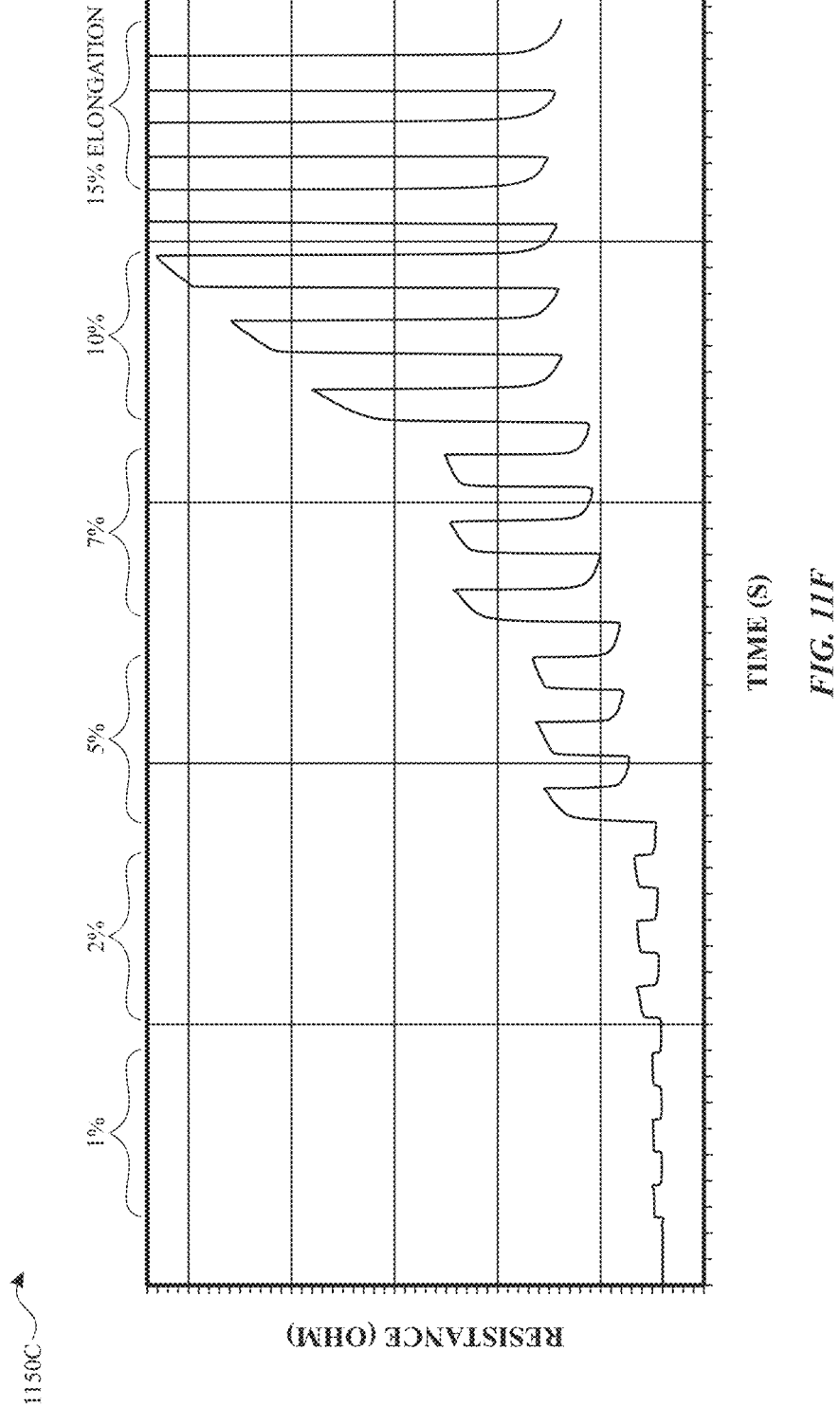
FIG. 11F is a plot over time of an exemplary resistance response of a PIC electronic component.

As just one example, as shown, PIC electronic component 1154 (e.g., ink on a thermoplastic polyurethane ("TPU") or silicone or any suitable rubber substrate (e.g., with a modulus of 2 MegaPascals)) may include a functional portion 1154f (e.g., a stretchable and compressible portion) that may be positioned along a length of component 1154 between a first portion 1154a and a second portion 1154z of component 1154. Functional portion 1154f may have any suitable dimensions, including, for example, a height 1154h (e.g., along the Z-axis) of any suitable length in its resting (e.g., relaxed or compressed) state, where height 1154h may be any suitable compressed magnitude, such as 0.75 millimeters. The height of functional portion 1154f may be stretched or tensioned or strained from its resting state to any suitable deformed state, where height 1154h may be stretched or otherwise deformed to any suitable stretched magnitude, such as by 0.125 millimeters to 0.875 millimeters (e.g., 12%-18% or 15% elongation) (e.g., first portion 1154a of component 1154 may be displaced from second portion 1154z (e.g., along the Z-axis) by an additional 0.125 millimeters when functional portion 1154f may be stretched from its resting state to such a deformed state). As shown in FIG. 11F, a graph 1150C of an exemplary resistance response over time of the FSR materials to various strain levels or elongation percentage may be provided, where an observed strain factor or gauge factor ("GF") may range from 2.5 to 10. For example, FIG. 11F illustrates that an elongation of approximately 1% for a 2 megaohm PIC circuitry can result in a change of resistance of approximately 50 kiloohm; an elongation of approximately 2% can result in a change of resistance of approximately 100 kiloohm; an elongation of approximately 5% can result in a change of resistance of approximately 600 kiloohm; an elongation of approximately 7% can result in a change of resistance of approximately 1 megaohm; an elongation of approximately 10% can result in a change of resistance of approximately 2.2 megaohm; etc. (e.g., with the approximation being within 10% of the above stated values). It should be understood that the relationship between elongation and resistance in FIG. 11F is exemplary, but may be a function of the materials among other characteristics of the PIC circuitry. The FSR material(s) may include a conductive polymer, which may change resistance in a predictable manner following application of force to its surface (e.g., the FSR material having an impedance that provides a leakage path for charge), and may be supplied as a polymer sheet or ink that can be applied by screen printing, whereby a sensing film may include both electrically conducting and non-conducting particles suspended in matrix. For reliability optimization, silicone or other rubber substrates may also be used in place of TPU, which may improve fatigue and/or creep resistance. As just one example, functional portion 1154f may include any suitable number of strain gauges or FSRs on one or each of two opposite surfaces. For example, any number of strain gauges or FSRs (PIC electronic component(s)) on a first surface of functional portion 1154f may be provided in series, where an effective resistance may be equal to N*(R+ΔR), where N may be the number of PIC electronic component(s), and where a net resistance change may be NΔR. As just one other example, any number of strain gauges or FSRs (PIC electronic component(s)) on a first surface of functional portion 1154f may be provided in series and may be in parallel to the strain gauges or FSRs (PIC electronic component(s)) on a second surface of functional portion 1154f opposite the first surface, where an effective resistance may be equal to $NR/2*(1-(\Delta R/R)^2)$, where N may be the number of PIC electronic component(s) on each surface, and where a net resistance change may be $N\Delta R^2/2R$. Depending on resistance value and gauge factor, the sensitivity may be low.

As shown in FIGS. 11A-11E, tip stylus circuitry 1126 may be mounted on or otherwise supported by or interconnected by any suitable circuit board 1160 (e.g., for providing any suitable bus(ses) or the like, which may be similar to bus 414). Circuit board 1160 (e.g., a printed circuit board ("PCB")) may then be positioned within a housing of the stylus or accessory and electrically coupled to tip interface component 1121 (e.g., at or via node 1191 (e.g., via bus and/or solder and/or the like)) and to body stylus circuitry 1127 (e.g., at or via node 1199 (e.g., via bus and/or mechanical structure (e.g., a hinge mechanism) and/or the like)). While FIGS. 11 and 11A may show tip interface component 1121 electrically coupled to tip stylus circuitry 1126 at node 1191 and body stylus circuitry 1127 electrically coupled to tip stylus circuitry 1126 at node 1199 (e.g., to keep oscillating voltages of circuitry 1126 (e.g., of circuitry 1123) to be constrained as close to tip interface component 1121 as possible, which may help reduce wobble), it is to be understood that the opposite could be true where tip interface component 1121 may be electrically coupled to tip stylus circuitry 1126 at node 1199 and body stylus circuitry 1127 may be electrically coupled to tip stylus circuitry 1126 at node 1191. Moreover, as shown in FIG. 11A, circuit board 1160 may provide each one of a first (e.g., front) surface 1161 and a second (e.g., back) surface 1169, and different portions of tip stylus circuitry 1126 may be electrically coupled to different surfaces of board 1160. For example, as shown, non-linear electrical circuitry 1123 may be provided on and/or electrically coupled to surface 1161 while resistance circuitry 1125 and PIC circuitry 1150 (e.g., PIC electronic component 1154) may be provided on and/or electrically coupled to surface 1169. However, in other embodiments, it is to be understood that non-linear electrical circuitry 1123 and PIC circuitry 1150 may be provided on the same circuit board surface, and/or that non-linear electrical circuitry 1123 and resistance circuitry 1125 may be provided on the same circuit board surface. Any arrangement of various components of tip stylus circuitry 1126 on various surfaces of circuit board 1160 may be made (e.g., diodes on one side and resistors on another), although a goal may be to keep the net capacitance across the whole circuitry to be as low as possible when the device is in operation, to minimize trace parasitic coupling, to prevent fields from skipping over devices and jumping from one electrode to another in the stack, and/or to reduce stray capacitance.

Figures 15, 15A:
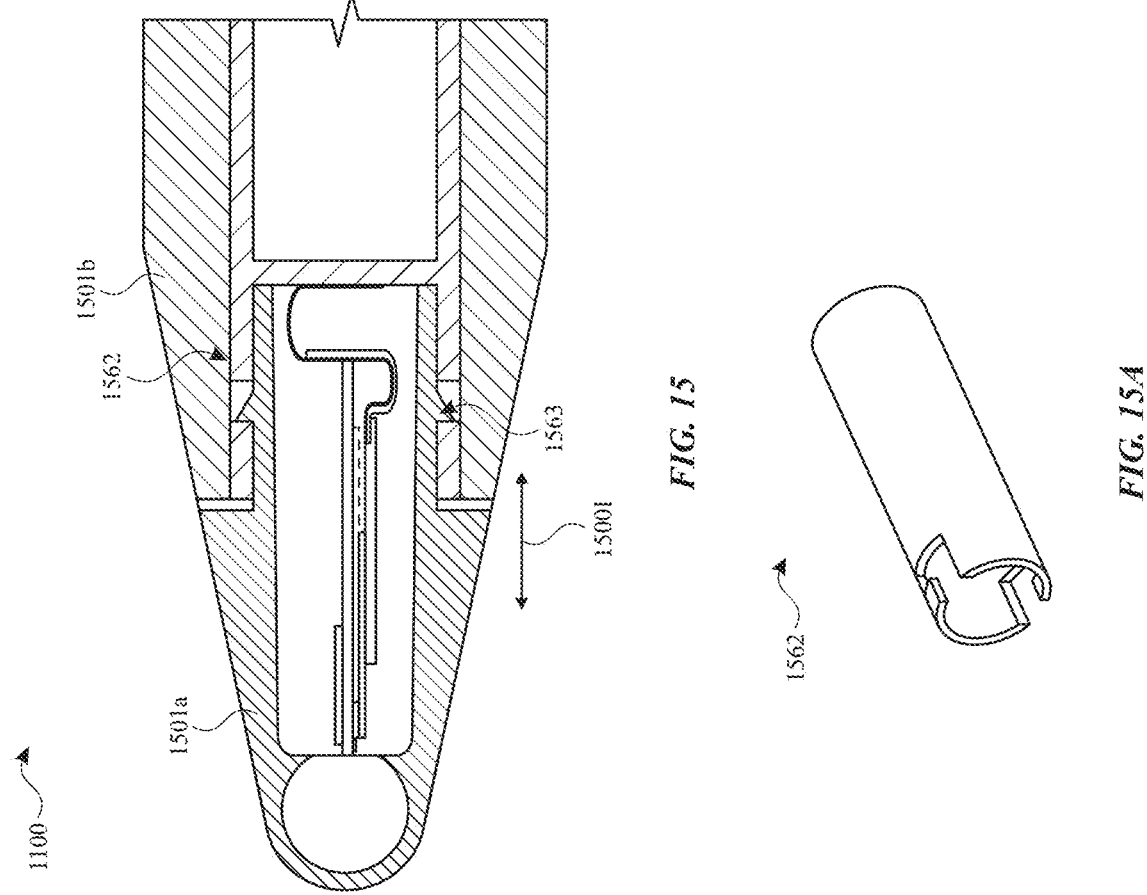
FIG. 15 is a partially transparent, semi-schematic view of an illustrative portion of an embodiment of the accessory of FIGS. 11-11E and 11G.
FIG. 15A is a perspective view of a portion of the accessory of FIG. 15.

Any suitable conversion mechanism(s) (e.g., electrical, mechanical, etc.) may be provided for enabling PIC circuitry to vary the resistance or other suitable electrical property of the accessory based on any suitable varying physical interaction characteristic(s) of the accessory (e.g., with respect to the input surface of the electronic device (e.g., a variable amount of force, a variable angle of tilt, and/or the like)). For example, as shown in FIGS. 11A-11E, accessory 1100 may include a conversion subassembly 1180 that may be configured to convert any force applied by a user to the accessory upon use with an input surface of an electronic device (e.g., a force applied by tip interface component 1121 onto input surface 110a of device 100 (e.g., force Fa/Fr)) or otherwise into a force or pressure or strain or stress applied to PIC circuitry 1150 (e.g., to FSR PIC electronic component 1154). Conversion subassembly 1180 may include board 1160, a first PIC coupling 1193c (e.g., at or forming node 1193) for electrically coupling a first portion of PIC circuitry 1150 (e.g., first portion 1154a of FSR PIC electronic component 1154) to board 1160 (e.g., near tip interface component 1121), a second PIC coupling 1197c (e.g., at or forming node 1197) for electrically coupling a second portion of PIC circuitry 1150 (e.g., second portion 1154z of FSR PIC electronic component 1154) to board 1160 (e.g., away from tip interface component 1121), and a hinge subassembly 1182 for inducing strain in PIC circuitry 1150 when a load of a compressive force applied to tip interface component 1121 by the user and/or device 100 or otherwise is transferred through board 1160 to hinge subassembly 1182. First PIC coupling 1193c may be provided by soldering or bonding (e.g., using heat-activated conductive films, anisotropic conductive film, etc.) or the like, which may mechanically constrain the first portion of PIC circuitry 1150 (e.g., first portion 1154a of FSR PIC electronic component 1154) to board 1160 (e.g., at node 1193). Second PIC coupling 1197c may be provided by a flexible electrical coupling, such as a flexible copper foil or a thin flex or the like, which may not mechanically constrain the second portion of PIC circuitry 1150 (e.g., second portion 1154z of FSR PIC electronic component 1154) to board 1160 (e.g., at node 1197), which may allow (not prevent) deformation (e.g., stretching and compressing) of functional portion 1154f of PIC circuitry 1150. Hinge subassembly 1182 may include any suitable mechanical bearing or hinge mechanism 1184 and a hinge extension 1188 extending from any suitable portion of hinge mechanism 1184 to PIC circuitry 1150. Hinge mechanism 1184 may physically couple tip interface component 1121 and body portion 1117 while enabling a limited range of relative motion between tip interface component 1121 and body portion 1117. As shown, for example, any suitable portion of body portion 1117 (e.g., body stylus circuitry 1127 or at least a portion of enclosure 1101) may be physically coupled to or fixed to or held against a first (e.g., top) hinge mechanism portion 1184t of hinge mechanism 1184 and any suitable portion (e.g., top) of board 1160 (e.g., as physically coupled to or fixed to tip interface component 1121) may be supporting or held against or physically coupled to a second (e.g., bottom) hinge mechanism portion 1184b of hinge mechanism 1184. Alternatively, rather than being positioned at least partially between board 1160 and body portion 1117, hinge mechanism 1184 may be positioned at least partially between board 1160 and tip interface component 1121 (not shown). As shown in FIG. 15, tip interface component 1121 may be positioned within a first portion of the stylus housing 1501a that may be movable with respect to a second portion of the stylus housing 1501b that may include body portion 1117 (e.g., as represented by the gap between the first portion of the stylus housing 1501a and the second portion of the stylus housing 1501b). For example, in usage, the tip portion may press on the interface surface of the user touch device, which may cause the entire tip, including the tip interface component, to move backwards for pushing on the hinge. It should be noted that, in order to make clean contact or stretch the PIC circuitry (e.g., FSR) cleanly, the motion of the tip with respect to the remainder of the housing should be purely linear translation. This can be implemented as shown in FIGS. 15 and 15A, where a sleeve electrode 1562 (e.g., body stylus circuitry 1127) may also serve the purpose of mitigating parasitic flux lines from PCB components and pads from coupling to the user touch device sensor(s). The tip motion may be linearly translated along the directions of arrow 1500I, while a tip tab 1563 may be operative to prevent tips from coming loose (e.g., prevent tip from moving out of the housing due to spring action of the hinge beams). Sleeve electrode 1562 may provide a sleeve/guide to prevent the tip from moving orthogonal to the stylus axis (e.g., orthogonal to arrow 1500I).

Transduction mechanism of force/displacement into strain may be enabled, whereby any suitable mechanism(s) may translate movement into displacement/strain, such as compression (e.g., spring), tension (e.g., mechanism described herein), and/or the like. Hinge mechanism 1184 may deflect from a resting (e.g., relaxed) state of FIGS. 11A-11D to any suitable deformed state when a compressible force is applied to hinge mechanism 1184 (e.g., by a user U via body portion 1117 and/or by device 100 via tip interface component 1121 (e.g., force Fa/Fr)). When hinge mechanism 1184 may be in its resting state, tip interface component 1121 and body portion 1117 may be separated by a resting (e.g., relaxed) distance, including a reduceable distance portion RDP that may be defined by hinge mechanism 1184, such as between first or top hinge mechanism portion 1184$t$ (e.g., that may be physically coupled or fixed to any suitable portion of body portion 1117) and second or bottom hinge mechanism portion 1184$b$ (e.g., that may be physically coupled or fixed to any suitable portion of board 1160). However, when such a compressible force is applied to hinge mechanism 1184, hinge mechanism 1184 may deflect from its relaxed state to a deformed state, whereby reduceable distance portion RDP may be reduced from a relaxed state distance RDPRD (e.g., 1.50 millimeters or any other suitable length) by some amount to a deformed state distance that is smaller than relaxed state distance RDPRD. In some embodiments, as shown, hinge mechanism 1184 may be a C- or S-shaped clamp or hinge structure (e.g., metal (e.g., steel)) configured with a hinge point 1184$p$. When top hinge mechanism portion 1184$t$ and bottom hinge mechanism portion 1184$b$ are compressed toward each other (e.g., by tip interface component 1121 and board 1160 being forced toward body portion 1117 (e.g., in the −Z-direction) and/or by body portion 1117 toward board 1160 and tip interface component 1121 (e.g., in a +Z-direction)) at some opposed points of contact 1117$p$ and 1160$p$ on hinge mechanism 1184 between which reduceable distance portion RDP extends, hinge mechanism 1184 may be compressed or deformed or strained such that bottom hinge mechanism portion 1184$b$ may deflect substantially to any suitable position DP, whereby reduceable distance portion RDP may be reduced from relaxed state distance RDPRD (e.g., 1.50 millimeters or any other suitable length) by some amount (e.g., direct translation distance RDPTD) to a compressed state distance RDPCD. While point of contact 1117$p$ of bottom hinge mechanism portion 1184$b$ may move a direct translation distance RDPTD to a respective point along position DP during such compression, an extension point 1188$p$ of bottom hinge mechanism portion 1184$b$ may move an extension translation distance REPTD to a respective point along position DP during such compression, where extension translation distance REPTD may be longer than direct translation distance RDPTD (e.g., twice as long (e.g., if circuit board 1160 is placed in the middle of the beam (e.g., if point 1160$p$ is in the middle of bottom hinge mechanism portion 1184$b$), then the right-most tip (e.g., point 1188$p$) may translate upwards by roughly two-times the upward translation of point 1160$p$) or any other suitable amount or factor longer). Therefore, even if the compressible force applied to hinge mechanism 1184 by tip interface component 1121 and board 1160 and/or body portion 1117 only compresses a first portion of reduceable distance portion RDP by a first distance (e.g., direct translation distance RDPTD), hinge mechanism 1184 may be configured to amplify such translation by compressing a second portion of reduceable distance portion RDP by a second and longer distance (e.g., extension translation distance REPTD) that may be used to strain PIC circuitry 1150 (e.g., using hinge extension 1188 of hinge subassembly 1182 that may be coupled to a portion of hinge subassembly 1182 that translates with or similarly to extension point 1188$p$). Therefore, when a compressive force may be applied to the tip (e.g., from the barrel downward), while the circuit board and tip length may be fixed (e.g., despite any compression), that force may be translated through the circuit board and into the hinge mechanism, whereby a beam of the hinge mechanism may be deflected (e.g., up to 4% elastic strain), and whereby displacement of the beam may be apply strain to the PIC circuitry (e.g., FSR).

Hinge mechanism 1184 may be provided by at least a first beam 1183 and a second beam 1185 that may be fused or otherwise coupled together. Each beam may be made from any suitable material, such as steel, and may be formed by any suitable process (e.g., stamping). First beam 1183 may extend the entirety or a majority of the length of hinge mechanism 1184 (e.g., inclusive of top hinge mechanism portion 1184$t$ and bottom hinge mechanism portion 1184$b$), while second beam 1185 may only extend a lesser portion of the length of hinge mechanism 1184 (e.g., just beyond hinge point 1184$p$ and inclusive of bottom hinge mechanism portion 1184$b$ but not top hinge mechanism portion 1184$t$). In some examples, the first beam 1183 may include the top hinge mechanism portion 1184$t$ and at least a portion of the bottom hinge mechanism portion 1184$b$, as represented by C-shaped first beam 1183 shown in FIG. 11H. The different beams may be of different thicknesses and/or different materials, for example, in order to provide additional structural stability and/or to promote or encourage or ensure that the deflection occurs close to the start of the side radius of the C-shaped portion of hinge mechanism 1184 that may extend between top hinge mechanism portion 1184$t$ and bottom hinge mechanism portion 1184$b$ (e.g., to facilitate hinge point 1184$p$ being spaced apart from extension point 1188$p$ to enable larger translation amplification). For example, first beam 1183 may have a first thickness 1183$t$ of any suitable amount (e.g., 0.04-0.06 millimeters (e.g., 0.05 millimeters)) while second beam 1185 may have a second thickness 1185$t$ of any suitable amount (e.g., 0.13-0.17 millimeters (e.g., 0.15 millimeters)). Alternatively, hinge mechanism 1184 may be provided by a single beam formed to have such a geometry or a unitary thickness or any other suitable geometry.

Figures 11H, 11I, 11J, 11K:
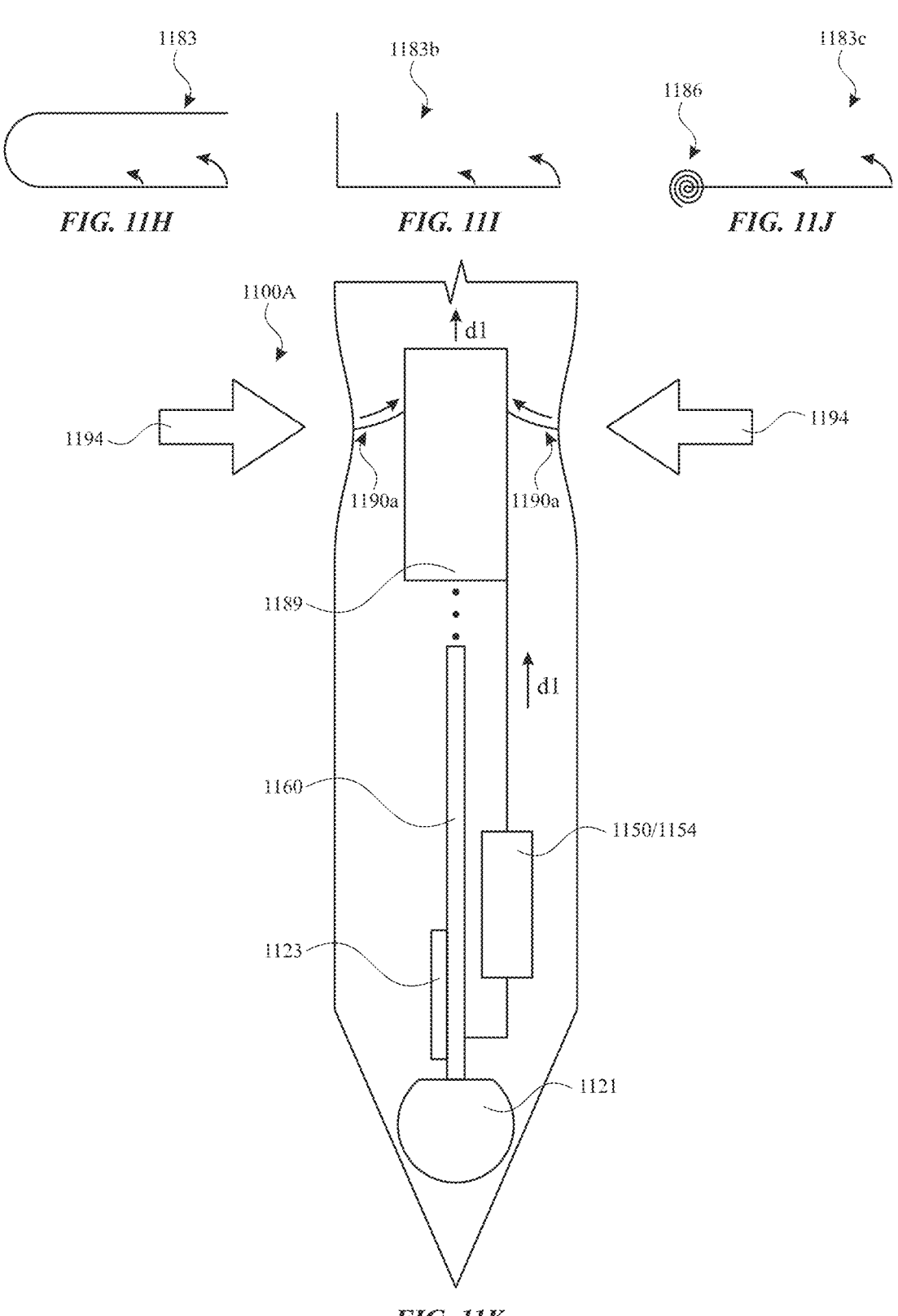
FIG. 11H is a side view of a portion of an exemplary hinge mechanism of the accessory of FIG. 11.
FIG. 11I is a side view of a portion of another exemplary hinge mechanism of the accessory of FIG. 11.
FIG. 11J is a side view of a portion of another exemplary hinge mechanism of the accessory of FIG. 11.
FIG. 11K is a partially transparent, semi-schematic view of an illustrative portion of another accessory.

Although FIGS. 11A-11E and FIG. 11H illustrate a C-shaped (or S-shaped) hinge mechanism, various other suitable types of hinge mechanisms may be used to provide a hinge mechanism or other suitable mechanical bearing of the conversion subassembly, including, but not limited to, L-shaped beam(s), torsion spring(s), foam(s), and/or combination(s) thereof. For example, FIG. 11H illustrates a C-shaped hinge mechanism, with a smaller arrow indicative of an exemplary point of contact by board 1160 causing deflection of first beam 1183 with an amplification of the displacement indicated by the larger arrow on near the edge of first beam 1183. FIG. 11I illustrates an L-shaped beam 1183$b$, with a smaller arrow indicative of an exemplary point of contact by board 1160 causing deflection of L-shaped beam 1183$b$ with an amplification of the displacement indicated by the larger arrow on near the edge of L-shaped beam. In some examples, L-shaped beam 1183$b$ may be fused or otherwise coupled together with second beam 1185. FIG. 11J illustrates a first beam 1183$c$ coupled to a torsion spring 1186 at a first end. A smaller arrow can be indicative of an exemplary point of contact by board 1160 causing deflection of first beam 1183$c$ with an amplification of the displacement indicated by the larger arrow on near the second edge/end of first beam 1183c. In some examples, first beam 1183c may be fused or otherwise coupled together with second beam 1185. Torsion spring 1186 may be coupled to or otherwise fixed to accessory 1100.

Hinge extension 1188 of hinge subassembly 1182 may extend from any suitable portion of hinge mechanism 1184 to PIC circuitry 1150 for straining or otherwise adjusting a force applied to PIC circuitry 1150 when hinge mechanism 1184 is deflected or otherwise moved between its resting/deformed states by a change in compressible force applied to hinge mechanism 1184 during use of accessory 1100 by a user on a device input surface. For example, as shown, hinge extension 1188 may extend between a first extension end that may be physically fixed or otherwise coupled to hinge mechanism 1184 at or beyond extension point 1188p (e.g., away from hinge point 1184p), such as at a joint location 1188j, and a second extension end that may be physically fixed or otherwise coupled (e.g., mechanically adhered) to PIC circuitry 1150 (e.g., at or near second portion 11542 of component 1154 or anywhere along component 1154 between functional portion 1154f and second portion 1154z). Therefore, when hinge mechanism 1184 may compress a second portion of reduceable distance portion RDP by an extension translation distance REPTD, hinge extension 1188 may apply tensile force to stretch functional portion 1154f of PIC electronic component 1154 of PIC circuitry 1150 by a PIC stretching distance (e.g., for increasing height 1154h of functional portion 1154f (e.g., along the Z-axis), such as by a PIC stretching distance that may be the same or about the same as extension translation distance REPTD). In some embodiments, the distance between points 1160p and 1188p, the distance between points 1160p and 1184p, the distance between points 1188p and 1184p, and/or any other suitable characteristics of hinge mechanism 1184 may be adjusted to affect the relationship between the amount by which tip interface component 1121 and body portion 1117 may move (e.g., along the Z-axis) with respect to one another and the amount by which first portion 1154a and second portion 1154z of PIC component 1154 may move (e.g., along the Z-axis) with respect to one another (e.g., adjusting the translation amplification of conversion subassembly 1180 such that the amount of direct translation distance RDPTD of deflection of hinge mechanism 1184 by the accessory compression may be different than (e.g., less (e.g., half of)) extension translation distance REPTD of hinge extension 1188 and/or strain distance (e.g., PIC stretching distance) of height 1154h of functional portion 1154f of component 1154 of PIC circuitry 1150). Therefore, the deflection of hinge mechanism 1184 may ultimately induce strain in PIC circuitry 1150 (e.g., inducing strain in PIC circuitry 1150 when a load of a compressive force applied between tip interface component 1121 and body portion 1117 by the user and device 100 is transferred through board 1160 and hinge mechanism 1184). Hinge extension 1188 may be formed by any suitable material(s), including, but not limited to, rigid plastic (e.g., polyethylene terephthalate ("PET")), ceramics, biopolymers, insulating oxides, any other suitable non-conductive material, and/or the like. While hinge mechanism 1184 may be at least partially formed by a conductive material, hinge extension 1188 may be non-conductive such that it may not unnecessarily interfere with the electrical sensing process involving tip interface component 1121 or otherwise electrically interfere with PIC 1150. In other embodiments, hinge extension 1188 and hinge mechanism 1184 may be the same material and/or a unitary structure (e.g., metal). In some embodiments, at least a portion of hinge mechanism 1184 may be used to electrically couple body stylus circuitry 1127 to tip stylus circuitry 1126 (e.g., at node 1199), such as by electrically coupling body stylus circuitry 1127 to hinge mechanism 1184 at point of contact 1117p (e.g., via solder, just mechanical force, etc.) and by electrically coupling hinge mechanism 1184 to tip stylus circuitry 1126 of board 1160 at point of contact 1160p (e.g., via wire bonding, conductive glue, etc.). Alternatively, body stylus circuitry 1127 may be electrically coupled to tip stylus circuitry 1126 (e.g., at node 1199) not by hinge mechanism 1184 but via any suitable alternative mechanism (not shown).

While the deflection of hinge mechanism 1184 (e.g., to position DP) may be substantially along the Z-axis, some deflection may occur along the Y-axis. In some embodiments, an allowed path of circuit board 1160 may be fixed or otherwise limited as much as possible to be along the Z-axis (e.g., through use of a particularly configured geometry of housing structure 1101 or otherwise) and/or tip 1121 may be fixed with respect to housing 1101 such that the tip may not torque), which may prevent or at least limit any tilt due to an angle DPA of the hinge deflection path (e.g., a path relative to housing 1101 and top hinge mechanism portion 1184t). Although numerous possible embodiments of such an electro-mechanical mechanism (e.g., PIC circuitry of tip circuitry and conversion subassembly of an accessory) are possible, various design constraints may be applied based on known physics and technical issues. For example, in order to enable efficient and effective signal-to-noise ratio ("SNR") for certain input component architecture of electronic devices to be used with the accessory (e.g., touch architecture of a tablet), the total resistance of the resistor(s) of the accessory (e.g., signaling resistance circuitry 1125 and/or PIC circuitry 1150) may be in the range of 2.0 megaohms to 8.0 megaohms. Additionally or alternatively, the location of the resistors may be as close as possible to the tip (e.g., tip interface component 1121). Additionally or alternatively, the total footprint of PIC electronic component(s) 1154 (e.g., strain sensor) of the accessory circuitry may be minimized to reduce parasitic capacitance, which generally may reduce the accessory electrical signal (e.g., a stylus electric field), but not too small as to induce electrode-to-electrode self-capacitance, whereby a sensor length of PIC electronic component 1154 may be in the range of 0.2 millimeters to 20.0 millimeters. As another example, PIC electronic component(s) 1154 (e.g., strain sensor) may be configured to have a high gauge factor (e.g., to ensure the change in resistance may be large enough to be detected) and/or be able to undergo high strains with relatively low fatigue (e.g., to make the mechanism reliable over many cycles (e.g., hundreds of thousands of cycles)). As yet another example, material creep within PIC electronic component 1154 (e.g., strain sensor) strain sensor may be reduced or minimized as much as possible, such as by having the sensor nominally strain-free (e.g., a resting or relaxed or compressed state when the accessory is not in use) rather than in a pre-strained state (e.g., a deformed state when the accessory receives an applied force), whereby, upon application and release of force, the sensor may undergo tensile strain and then relax, respectively. Therefore, in such an implementation, a compressive force applied to the tip may be translated into a tensile force on the strain sensor. As still yet another example, the relative positions of the components may be the same even during mechanical cycling, which may minimize changes in internal electrical coupling. As still yet another example, to ensure as smooth a user experience as possible (e.g., in terms of how a pencil would feel with the added mechanical motion), a nominal maximum travel distance in the range of 50 micrometers to 250 micrometers or in the range of 100 micrometers to 150 micrometers may be targeted for up to an applied force of 500 grams-force (e.g., the range may be greater if PIC electronic component 1154 is configured to support elastic strain). As just one example, a particular configuration may result in up to 4% of induced strains in the FSR with a maximum applied force of 530 grams-force. Using a gauge factor of 10, the resistance may be expected to increase by about 40% from the un-perturbed state (e.g., nominally strain-free state). The hinge mechanism may be constructed to determine a difference between motion of the circuit board and the PIC electronic component (e.g., strain sensor), for example, whereby cross beam or other mechanical structures may be configured to determine such a relative motion and convert one to another to determine sought after value(s) and/or specific electro-mechanical characteristics for the accessory.

Another application of this technology may be for a squeeze sensing stylus or accessory, whereby the PIC circuitry (e.g., strain sensor) may be oriented orthogonal to the stylus' primary axis (e.g., longitudinal axis 120) or may be oriented to detect force applied orthogonally to the stylus' primary axis, such that a user squeezing on the stylus housing (e.g., through the user's grip of the stylus) may be operative to induce a response to the stylus signal. For example, FIG. 11K illustrates a stylus or other suitable accessory 1100A including tip interface component 1121, circuit board 1160, PIC circuitry 1150/PIC component 1154 (e.g., FSR), non-linear electrical circuitry 1123, described herein with respect to FIGS. 11A-11E and 11G (the details of which are not repeated here for brevity). However, unlike the accessory illustrated in FIGS. 11A-11E and 11G, the PIC circuitry 1150 may be stretched by translation rod 1189 including extension(s) 1190a. Although the cross-sectional view of FIG. 11K shows two portions of extension(s) 1190a, it is understood that in some examples, more than two extensions may be provided circumferentially around translation rod 1189. In some examples, extension 1190a can continuously circumscribe translation rod 1189. As the housing of accessory 1100A is squeezed, as indicated by arrows 1194, the deformation of the housing can cause a force to be applied to extension(s) 1190a as indicated by the arrows above extension(s) 1190a, which can cause translation of translation rod 1189 by a first distance d1. The translation of translation rod 1189 can cause a corresponding translation by the first distance d1 via a physical connection 1195 between translation rod 1189 and PIC circuitry 1150/PIC component 1154. In some examples, the physical connection 1195 can be similar to hinge extension 1188 and can be used for straining or otherwise adjusting a force applied to PIC circuitry 1150 when translation rod 1189 is translated or otherwise moved between its resting/translated states by a change in compressible force applied to the housing during use of accessory 1100 by a user on a device (e.g., squeezing fingers). For example, physical connection 1195 can include a translation rod extension extending between a first extension end that may be physically fixed or otherwise coupled to translation rod 1189 and a second extension end that may be physically fixed or otherwise coupled (e.g., mechanically adhered) to PIC circuitry 1150 (e.g., at or near second portion 1154z of component 1154 or anywhere along component 1154 between functional portion 1154f and second portion 1154z). Therefore, when translation rod 1189 translates upward, the translation rod extension may apply tensile force to stretch functional portion 1154f of PIC electronic component 1154 of PIC circuitry. The applied force can enable a squeeze input to be detected by an input device (e.g., measuring a change in the resistance based on a phase shift of a second harmonic signal). The squeeze input can be used for selection (e.g., like a mouse or trackpad button) or for changing an operating mode (e.g., toggling between a tip type (e.g., pencil, pen, marker, paintbrush, etc.), inking color, or inking thickness), among other possibilities.

Figures 12, 12A:
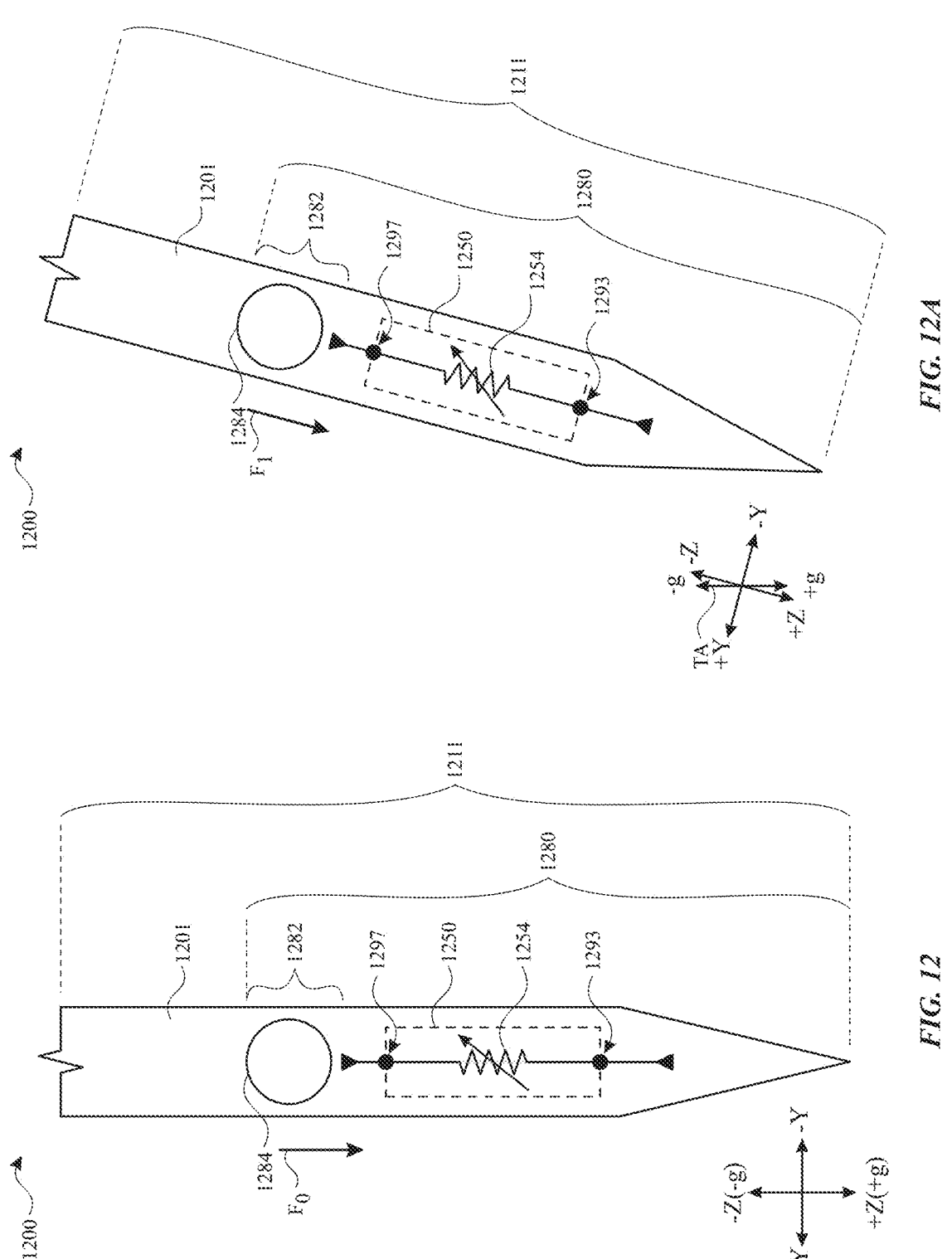
FIG. 12 is a partially transparent, semi-schematic view of an illustrative portion of yet another accessory at a first angle with respect to gravity.
FIG. 12A is a partially transparent, semi-schematic view of an illustrative portion of the accessory of FIG. 12 at a second angle with respect to gravity.

Another type of conversion subassembly may be provided for converting any variable angle of tilt of an accessory (e.g., polar angle 118 ($\theta$)) into a force or pressure or strain or stress applied to PIC circuitry (e.g., the same FSR (e.g., PIC component 1154) of accessory 1100 may additionally or alternatively be used to enable tilt-sensitivity to a passive stylus). For example, as shown in FIGS. 12 and 12A, any suitable accessory or stylus 1200 (e.g., which may be the same as or similar to any one or more of accessories or styli 400, 400a, 400b, 400c, 400d, and 1100) may include any suitable tip portion (e.g., which may be the same as or similar to any one or more of tip portions 415, 415a, 415b, 415c, 415d, 419, 419a, and 1115) that may be removably or fixedly coupled (e.g., physically and/or electrically) to any suitable body stylus circuitry (e.g., which may be the same as or similar to any one or more of circuitries 427a, 427b, 427c, 427d, and 1127) of any suitable barrel or handle or body portion (e.g., which may be the same as or similar to any one or more of body portions 417, 417a, 417b, 417c, 417d, and 1117) for providing any suitable accessory or stylus I/O circuitry 1211 (e.g., which may be the same as or similar to any one or more of I/O circuitries tip portions 411, 411a, 411b, 411c, 411d, and 1111) for use by any suitable user U with any suitable device I/O interface (e.g., device I/O interface 111a). The tip portion of accessory 1200 may include any suitable tip interface component (e.g., which may be the same as or similar to any one or more of tip interface components 421a, 421b, 421c, 421d, 431a, and 1121) and any suitable tip stylus circuitry (e.g., which may be the same as or similar to any one or more of tip stylus circuitries 426a, 426b, 426c, 426d, 436a, 436a', and 1126) that may be positioned between and electrically coupled to each one of the tip interface component and a portion (e.g., an end) of body stylus circuitry (e.g., a ground rod (e.g., of a purely capacitively coupled device)). The tip stylus circuitry of accessory 1200 may include any suitable non-linear electrical circuitry (e.g., which may be similar to any one or more of circuitries 423a, 423b, 423c, 433a, and 1123) that may be electrically coupled (e.g., in series) between the tip interface component and the body stylus circuitry. Additionally, the tip stylus circuitry of accessory 1200 may include (e.g., in parallel with the non-linear electrical circuitry) any suitable signaling resistance circuitry (e.g., which may be the same as or similar to any one or more of circuitries 425a, 425c, and 1125), for any suitable function, including, but not limited to, controlling reverse leakage current of non-linear electrical circuitry and/or preventing DC positive voltage build up at the diode(s) or other non-linear electrical element(s) of the non-linear electrical circuitry by effectively draining off any DC while maintaining non-linearity of the tip stylus circuitry. Any suitable enclosure(s) or housing 1201 (e.g., which may be the same as or similar to any one or more of housings 401, 401a, 401b, 401c, 401d, and 1101) may be provided to protect any suitable portion(s) of accessory 1200.

Moreover, as shown, the tip stylus circuitry may include any suitable PIC circuitry 1250 (e.g., which may be the same as or similar to PIC circuitry 1150), extending between a node 1293 and a node 1297, for varying the resistance of the tip stylus circuitry based on the variance of a force exerted by accessory 1200 on the electronic device input surface, the variance of a tilt angle between accessory 1200 and the electronic device input surface, and/or the variance of any other suitable physical interaction characteristic. For example, PIC circuitry 1250 may be electrically coupled in parallel with the non-linear electrical circuitry of accessory 1200 and in series with any resistance circuitry of accessory 1200 (alternatively, PIC circuitry 1250 may replace any or all such resistance circuitry). For example, PIC circuitry 1250 may include any suitable number of any suitable type(s) of PIC electronic component(s) 1254 (e.g., which may be the same as or similar to PIC electronic component(s) 1154), such as a pressure or strain or stress or force-sensitive or-sensing resistor ("FSR") and/or strain gauges, for any suitable function, including, but not limited to, changing a resistance thereof in response to a pressure or strain or stress or force applied thereto. An advantage of such an implementation may be that such an applied pressure can be measured by the electronic device (e.g., due to such a changed resistance) with almost no latency with respect to the passive accessory user experience (e.g., in contrast to a current active stylus, which may require an applied force or pressure be measured by the stylus and then communicated from the stylus (e.g., via Bluetooth) to the electronic device, which may significantly increase the time delay between measurement and display refresh). The tip stylus circuitry of accessory 1200 may be mounted on or otherwise supported by or interconnected by any suitable circuit board (e.g., which may be the same as or similar to circuit board 1160) that may then be positioned within housing 1201 and electrically coupled to the tip interface component of accessory 1200 and to the body stylus circuitry of accessory 1200.

Any suitable conversion mechanism(s) (e.g., electrical, mechanical, etc.) may be provided for enabling PIC circuitry 1250 of accessory 1200 to vary the resistance or other suitable electrical property of the accessory based on any suitable varying physical interaction characteristic(s) of the accessory (e.g., with respect to the input surface of the electronic device (e.g., a variable amount of force, a variable angle of tilt, and/or the like)). For example, as shown in FIGS. 12 and 12A, accessory 1200 may include a conversion subassembly 1280 that may be configured to convert any angle of tilt of the accessory with respect to a flat input surface of an electronic device (e.g., a polar angle 118 (θ)), such as with respect to gravity (e.g., the g-axis), or otherwise into a force or pressure or strain or stress applied to PIC circuitry 1250 (e.g., to FSR PIC electronic component 1254). Conversion subassembly 1280 may include the circuit board of accessory 1200, a first PIC coupling (e.g., which may be the same as or similar to first PIC coupling 1193c) (e.g., at or forming node 1293) for electrically coupling a first portion of PIC circuitry 1250 (e.g., a first portion of FSR PIC electronic component 1254) to the circuit board (e.g., near the tip interface component), a second PIC coupling (e.g., which may be the same as or similar to second PIC coupling 1197c) (e.g., at or forming node 1297) for electrically coupling a second portion of PIC circuitry 1250 (e.g., a second portion of FSR PIC electronic component 1254) to the circuit board (e.g., away from the tip interface component), and a weight assembly 1282 for inducing strain in PIC circuitry 1250 (e.g., compressive or tensile) with a weight of a tilt component 1284 of weight assembly 1282 that may be mechanically coupled to PIC electronic component 1254. Tilt component 1284 may be any suitable component of any suitable size, shape, and material. For example, as shown, tilt component 1284 may be provided as a sphere, but any other suitable shape is possible. A portion of the structure of housing 1201 or any other suitable portion of accessory 1200 may be configured to cradle or otherwise control the relative position of tilt component 1284 with respect to PIC electronic component 1254, such that at least a portion of the weight of tilt component 1284 may be apply force on to PIC electronic component 1254 for compressing or stretching a portion of PIC electronic component 1254. For example, as accessory 1200 tilts with respect to gravity (e.g., as the X-Y-Z structure of accessory 1200 tilts with respect to the gravity g-axis), the portion of the weight of tilt component 1284 and thus the amount of force applied on PIC electronic component 1254 may decrease (e.g., as a function of the cosine of the tilt angle). As shown, for example, the tilt angle TA between the X-Y-Z structure of accessory 1200 with respect to the gravity g-axis (e.g., the angle between the Z-axis and the g-axis) may be 0° in FIG. 12, while the tilt angle TA between the X-Y-Z structure of accessory 1200 with respect to the gravity g-axis (e.g., the angle between the Z-axis and the g-axis) may be 10° in FIG. 12A, whereby the amount $F_0$ of the weight of tilt component 1284 applied to (e.g., felt by) PIC electronic component 1254 of FIG. 12 at tilt angle TA of 0° will be greater than the amount $F_1$ of the weight of tilt component 1284 applied to (e.g., felt by) PIC electronic component 1254 of FIG. 12A at tilt angle TA of 10°. Therefore, any suitable conversion subassembly 1280 may be configured to use gravity to induce varying level of strains in PIC electronic component 1254, which may ultimately change the electrical response of the accessory (e.g., force of weight transfer may vary with tilt angle). The input surface of the input component of the electronic device (e.g., input surface 110a) may or may not provide a flat surface perpendicular to gravity, yet may be configured to adjust the detected tilt angle of the stylus with respect to the input surface's orientation by using the device's own internal sensor input component (e.g., accelerometer, gyroscope, etc.). For example, a stylus tilt angle may be calculated as a tilt angle as measured by the stylus minus a tilt angle of the device input surface, even if the stylus were being used upside down (e.g., elongation instead of compression). Alternatively to what is shown, a hanging weight may be provided that may pull and stretch a PIC component by a specific amount depending on the tilt angle.

Although conversion subassembly 1180 for converting force applied to the tip portion 1115 into a force or pressure or strain or stress applied to PIC circuitry is described with respect to FIGS. 11A-11E, a conversion subassembly including translation rod 1189 including extension(s) 1190a and physical connection 1195 for converting squeeze force applied to the barrel or handle or body portion 1117 into a force or pressure or strain or stress applied to PIC circuitry is described with respect to FIG. 11K, and/or conversion subassembly 1280 for converting tilt into a force or pressure or strain or stress applied to PIC circuitry is described with respect to FIGS. 12-12A, it should be understood that, in some embodiments, combinations of these features may be implemented in a stylus or accessory device. For example, PIC circuitry associated with each feature of interest (e.g., tip force, squeeze force, tilt angle) can have a different range of resistances. Switching circuitry can be used to multiplex which PIC circuitry is coupled between nodes 1191 and 1197 (e.g., couple first PIC circuitry for tip force detection during a first time period, couple second PIC circuitry for squeeze force detection during a second time period, and/or couple third PIC circuitry for tilt angle detection during a third time period). A electronic device may be able to detect the feature of interest based on the adjustment in voltage of a receive signal and/or the phase angle due to the change in resistance of the PIC circuitry, and differentiate between the input types based on the level of adjustment and/or amount of change of the phase angle.

In addition to or as an alternative to conversion subassembly 1180 and/or conversion subassembly 1280 for converting force or tilt into a force or pressure or strain or stress applied to PIC circuitry (e.g., to an FSR PIC electronic component), any suitable accessory (e.g., which may be the same as or similar to any one or more of accessories or styli 400, 400a, 400b, 400c, 400d, 1100, and 1200) may be provided with any suitable conversion subassembly that may be configured to convert the adjustment of any mechanically activated input component of the accessory (e.g., which may be the same as or similar to any one or more of input component 410) into a force or pressure or strain or stress applied to the PIC circuitry (e.g., to an FSR PIC electronic component) of the accessory. For example, such a conversion subassembly may be configured to vary the resistance in an FSR of the accessory by coupling a button, slider, switch, or any other suitable mechanically-activated input component of the accessory to the FSR. For example, a mechanical slider accessible to a user may be mechanically interacted with by the user to change the strain and resistance of the FSR, thereby also changing the electrical state of the accessory. For example, a slider may be continuous or contain a set number of discrete levels corresponding to different sensor strains and electrical resistances. Additionally or alternatively, a user input component may be selectively utilized to enable a particular one of two or more conversion subassemblies and/or PIC circuitries, such that either a force sensitive subassembly (e.g., of FIGS. 11-11E and 11G) or a tilt sensitive subassembly (e.g., of FIGS. 12 and 12A) may be enabled, and the electronic device may similarly be instructed on which of the two or more physical interaction characteristics (e.g., a variable amount of force (e.g., applied force Fα), a variable angle of tilt (e.g., polar angle 118 (θ)), and/or the like) is enabled and to be detected. The system may be configured in various ways to determine whether resistance change is indicative of tilt or force or some other physical interaction characteristic. For example, the different subassemblies may include different diode configurations in opposite polarities, such that the polarity may be utilized as a differentiator. As another example, the user touch device (e.g., device 100) may be instructed (e.g., by the user via software running on the user touch device) which physical interaction characteristic is currently to be associated with the resistance change. As yet another example, a classifying algorithm may be configured to detect the state of the stylus subassembly based on a pattern (e.g., quick changes of force that may increase after the stylus hits the surface of the user touch device and goes away when the stylus lifts off) versus a differently changing pattern of tilt.

Figures 13, 14:
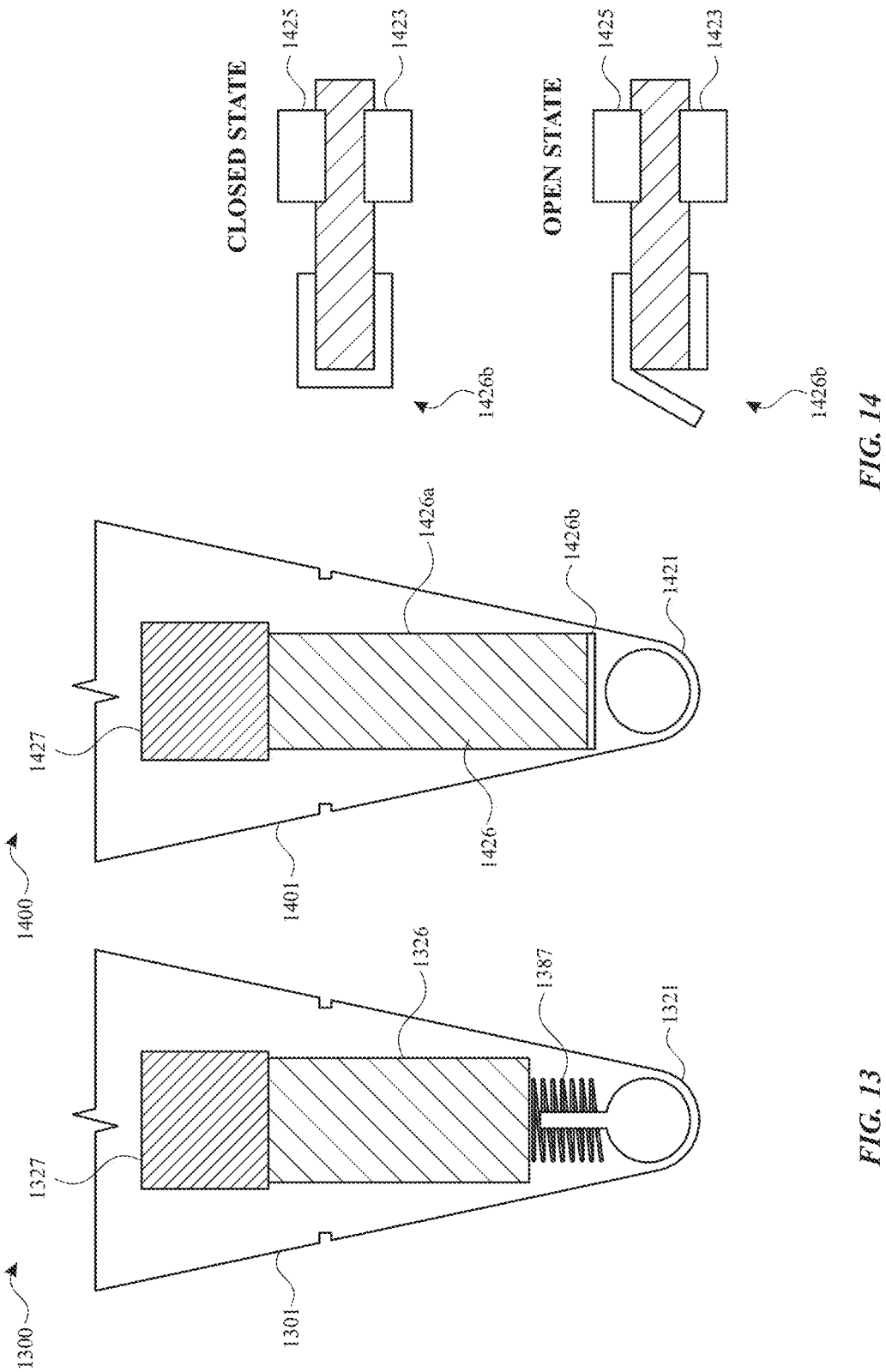
FIG. 13 is a partially transparent, semi-schematic view of an illustrative portion of yet another accessory.
FIG. 14 is a partially transparent, semi-schematic view of an illustrative portion of yet another accessory.

The user touch device and stylus can be configured to estimate the distance (e.g., Z-height) of a portion of the stylus (e.g., the tip of the stylus) from the input surface of the user touch device, and such an estimated distance may be used to determine a "make or break" event between the stylus and device, such as for making a determination when a drawn graphical line should start or stop or a stylus lift off event should occur (e.g., to start or stop "inking"). For example, make-break may refer to the process of inking on the user touch device screen upon contact with the tip or to stop inking when the tip is removed from contact on the touch sensitive surface. In one implementation, PIC circuitry (e.g., an FSR, etc.) may be utilized such that when the stylus tip makes contact with the surface of the user touch device, the PIC circuitry may adjust a resistance value (e.g., an FSR may stretch, thereby changing the resistance value) and, hence, the magnitude and phase of the second harmonic. This can be detected by the sensors on the user touch device to start inking. Similarly, when contact is lost with the surface, the PIC circuitry may adjust (e.g., an FSR may relax and the phase may change to the normal state), which can be sensed by the user touch device to stop inking. As another example, a mechanical force switch (e.g., a low force switch that may operate at 10 gm force or less) may be provided as part of the circuitry (e.g., tip stylus circuitry 426, 1126, etc.), which may be configured to physically close the circuit as the tip moves in relation to the housing, thereby producing a second harmonic signal. This may trigger any suitable user touch device sensor(s) and may cause inking, and when the force is removed by removing the stylus tip from the user device surface, the circuit may open again, and no second harmonic may be produced. Such low force mechanical switches may be configured to physically open or close the circuit, thus preventing the generation of second harmonic signal from the circuit. For example, as shown in FIG. 13, any suitable accessory or stylus 1300 (e.g., which may be the same as or similar to any one or more of accessories or styli 400, 400a, 400b, 400c, 400d, 1100, and 1200) may include a housing 1301, any suitable tip portion that may be removably or fixedly coupled (e.g., physically and/or electrically) to any suitable body stylus circuitry 1327 (e.g., which may be the same as or similar to any one or more of circuitries 427a, 427b, 427c, 427d, and 1127) of any suitable barrel or handle or body portion for providing any suitable accessory or stylus I/O circuitry for use by any suitable user U with any suitable device I/O interface (e.g., device I/O interface 111a). The tip portion may include any suitable tip interface component 1321 (e.g., which may be the same as or similar to any one or more of tip interface components 421a, 421b, 421c, 421d, 431a, and 1121) and any suitable tip stylus circuitry 1326 (e.g., which may be the same as or similar to any one or more of tip stylus circuitries 426a, 426b, 426c, 426d, 436a, 436a', and 1126). Tip stylus circuitry 1326 may be positioned between and electrically coupled to each one of tip interface component 1321 and a portion (e.g., an end) of the body stylus circuitry 1327 (e.g., a ground rod (e.g., of a purely capacitively coupled device)). Stylus 1300 may be provided with a low force spring 1387 that may be operative to allow tip interface component 1321 to make contact with tip stylus circuitry 1326 when tip moves up in relation to (e.g., towards) the housing. As another example, as shown in FIG. 14, any suitable accessory or stylus 1400 (e.g., which may be the same as or similar to any one or more of accessories or styli 400, 400a, 400b, 400c, 400d, 1100, 1200, and 1300) may include a housing 1401, any suitable tip portion that may be removably or fixedly coupled (e.g., physically and/or electrically) to any suitable body stylus circuitry 1427 (e.g., which may be the same as or similar to any one or more of circuitries 427a, 427b, 427c, 427d, 1127, and 1427) of any suitable barrel or handle or body portion for providing any suitable accessory or stylus I/O circuitry for use by any suitable user U with any suitable device I/O interface (e.g., device I/O interface 111a). The tip portion may include any suitable tip interface component 1421 (e.g., which may be the same as or similar to any one or more of tip interface components 421a, 421b, 421c, 421d, 431a, 1121, and 1321) and any suitable tip stylus circuitry 1426 (e.g., which may be the same as or similar to any one or more of tip stylus circuitries 426a, 426b, 426c, 426d, 436a, 436a', 1126, and 1326). The tip stylus circuitry 1426 can include non-linear electrical circuitry 1423 (e.g., corresponding to non-linear electrical circuitry 1123 in parallel with signaling resistance circuitry 1425 (e.g., signaling resistance circuitry 1125) and/or the PIC circuitry described herein. Tip stylus circuitry 1426 may be positioned between and electrically coupled to each one of tip interface component 1421 and a portion (e.g., an end) of the body stylus circuitry 1427 (e.g., a ground rod (e.g., of a purely capacitively coupled device)). A low force cantilever switch 1426b may be provided as a part of tip stylus circuitry 1426, which may transition from a circuit open state to a circuit close state when the tip moves up and closes the circuit 1426a (e.g., circuit of resistors and/or diodes) of tip stylus circuitry 1426.

Although the estimation of applied force and/or an estimation of tilt angle using PIC circuitry (e.g., an FSR) are described herein primarily in terms of a circuit including non-linear circuitry in parallel with resistance circuitry (e.g., FSR(s)) (e.g., where the change in resistance may be extracted from a second harmonic at the touch sensor panel in response to stimulation generated by a touch sensor panel), it should be understood that the force and/or tilt angle estimation techniques and corresponding circuitry can also be integrated into a powered (e.g., low powered) stylus or accessory configured to generate stimulation signals. For example, such an input device may include a power supply (e.g., corresponding to power supply 408) and driver circuitry configured to generate stimulation signals that can be sensed by an electronic device (e.g., including a touch sensor panel) via a tip interface component (e.g., one or more tip electrodes). In some such embodiments, the PIC circuitry can be configured to modulate the stimulation signal generated by the driver circuitry (e.g., modulate amplitude, phase, and/or frequency) in accordance with a change in a characteristic of the PIC circuitry (e.g., in accordance with a change in resistance of the FSR). The electronic device can receive the modulated stimulation signal and extract force and/or tilt information and/or location information indicative of a location of the accessory on a touch sensitive surface of the electronic device.

Moreover, the processes described with respect to FIGS. 1-15A (e.g., any control applications and/or algorithms), as well as any other aspects of the disclosure, may each be implemented by software, but may also be implemented in hardware, firmware, or any combination of software, hardware, and firmware. They each may also be embodied as computer-readable code recorded on a computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices (e.g., memory 104 of FIG. 1). The computer-readable medium can also be distributed over network-coupled computer systems so that the computer readable code is stored and executed in a distributed fashion. For example, the computer-readable medium may be communicated from one electronic device to another electronic device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

As mentioned, electronic device 100 may drive a display (e.g., display 112a) with graphical data to display a graphical user interface ("GUI"). The GUI may be configured to receive touch input via input component(s) 110a and/or 110b. Embodied as a touch screen (e.g., with display 112a as I/O component 111a), I/O component 111a may display the GUI. Alternatively, the GUI may be displayed on a display (e.g., display 112a) separate from touch input component 110. The GUI may include graphical elements displayed at particular locations within the interface. Graphical elements may include, but are not limited to, a variety of displayed virtual input devices, including virtual scroll wheels, a virtual keyboard, virtual knobs, virtual buttons, any virtual UI, and the like. A user may perform gestures (e.g., user fingers and/or with stylus 400) at one or more particular locations on input component(s) 110a and/or 110b, which may be associated with the graphical elements of the GUI. In other embodiments, the user may perform gestures at one or more locations that are independent of the locations of graphical elements of the GUI. Gestures performed on input component(s) 110a and/or 110b may directly or indirectly manipulate, control, modify, move, actuate, initiate, or generally affect graphical elements, such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad may generally provide indirect interaction. Gestures may also affect non-displayed GUI elements (e.g., causing user interfaces to appear) or may affect other actions of device 100 (e.g., affect a state or mode of a GUI, application, or operating system). Gestures may or may not be performed on input component(s) 110a and/or 110b in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments, in which gestures are performed directly on a touch screen, a user may interact directly with objects on the touch screen, with or without a cursor or pointer being displayed on the touch screen.

Feedback may be provided to the user via bus 114 in response to or based on the touch or near touches on a touch input component 110. Feedback may be transmitted optically, mechanically, electrically, via olfactory, acoustically, or the like or any combination thereof and in a variable or non-variable manner.

Circuitry may be disposed on a printed circuit board ("PCB") or a flexible printed circuit ("FPC") (e.g., circuitry 1126 on board 1160, etc.). In some embodiments, the circuitry may include discrete circuit elements coupled together (e.g., coupled together with solder) without a PCB or FPC. Although this disclosure describes and illustrates particular circuitry that includes particular circuit elements coupled in particular configurations, this disclosure contemplates any suitable circuitry and/or circuits that include any suitable circuit elements coupled in any suitable configurations.

Therefore, according to the above, some examples of the disclosure are directed to a stylus for use with an electronic device that comprises an input component with an input surface. The stylus can comprise: a housing; and stylus circuitry at least partially positioned within the housing. The stylus circuitry can comprise: body circuitry; a tip interface component; and tip stylus circuitry. The tip stylus circuitry can comprise switch circuitry that can be operative to alternate according to a pattern between a first state in which the body circuitry and the tip interface component can be electrically coupled and a second state in which the body circuitry and the tip interface component can be not electrically coupled. The alternation of the switch circuitry can be operative to provide a modulated capacitance at the tip interface component that can be detectable by the electronic device when the tip interface component of the stylus is positioned adjacent the input surface of the input component of the electronic device. Additionally or alternatively to one or more of the examples disclosed above, in some examples, the tip stylus circuitry can further comprise: a power supply; and a controller that can be powered by the power supply for alternating the switch circuitry between the first state and the second state according to the pattern. The pattern can be defined by an application of the controller. Additionally or alternatively to one or more of the examples disclosed above, in some examples, the modulated capacitance at the tip interface component can be detectable by the electronic device for estimating a location of the stylus. Additionally or alternatively to one or more of the examples disclosed above, in some examples, the tip stylus circuitry can be further comprises a controller that can be powered by a power source that is external to the stylus for alternating the switch circuitry between the first state and the second state according to the pattern. The pattern can be defined by an application of the controller. Additionally or alternatively to one or more of the examples disclosed above, in some examples, the power source can comprise a user when the stylus is held by the user. Additionally or alternatively to one or more of the examples disclosed above, in some examples, the body circuitry can comprise a conductive component that is operative to be electrically coupled to the user when the stylus is held by the user. Additionally or alternatively to one or more of the examples disclosed above, in some examples, the conductive component is electrically coupled to the tip stylus circuitry. Additionally or alternatively to one or more of the examples disclosed above, in some examples, the conductive component is exposed via an opening through the housing of the stylus for enabling direct contact of the conductive component by the user when the stylus is held by the user. Additionally or alternatively to one or more of the examples disclosed above, in some examples, the power source can comprise transmitter circuitry of the input component when the tip interface component of the stylus is positioned adjacent the input surface of the input component of the electronic device. Additionally or alternatively to one or more of the examples disclosed above, in some examples, the stylus does not comprise any power supply. Additionally or alternatively to one or more of the examples disclosed above, in some examples, the modulated capacitance at the tip interface component is distinguishable by the electronic device from an electric field provided by a user's direct contact with the input surface of the input component of the electronic device. Additionally or alternatively to one or more of the examples disclosed above, in some examples, the stylus can comprise an input component. Manipulation of the input component can be operative to change, from a first pattern to a second pattern that is different than the first pattern, the pattern with which the switch circuitry is operative to alternate between the first state and the second state. The alternation of the switch circuitry according to the first pattern can be operative to provide a first modulated capacitance at the tip interface component that is detectable by the electronic device when the tip interface component of the stylus is positioned adjacent the input surface of the input component of the electronic device. The alternation of the switch circuitry according to the second pattern can be operative to provide a second modulated capacitance at the tip interface component that is detectable by the electronic device when the tip interface component of the stylus is positioned adjacent the input surface of the input component of the electronic device. The second modulated capacitance can be different than the first modulated capacitance. Additionally or alternatively to one or more of the examples disclosed above, in some examples, the stylus circuitry further comprises: another tip interface component; and another tip stylus circuitry. The other tip stylus circuitry can comprise other switch circuitry that is operative to alternate according to another pattern between another first state in which the body circuitry and the other tip interface component are electrically coupled and another second state in which the body circuitry and the other tip interface component are not electrically coupled. The alternation of the other switch circuitry can be operative to provide another modulated capacitance at the other tip interface component that is detectable by the electronic device when the other tip interface component of the stylus is positioned adjacent the input surface of the input component of the electronic device. Additionally or alternatively to one or more of the examples disclosed above, in some examples, the pattern comprises a Barker sequence followed by a digital code. Additionally or alternatively to one or more of the examples disclosed above, in some examples, the switch circuitry comprises a high impedance switch. Additionally or alternatively to one or more of the examples disclosed above, in some examples, the pattern can be not known by a user of the stylus.

Some examples of the disclosure are directed to a stylus for use with an electronic device that comprises an input component with an input surface. The stylus can comprise: a tip interface component; and tip stylus circuitry electrically coupled to the tip interface component. The tip stylus circuitry can be operative to change a load of the stylus according to a pattern when the tip stylus circuitry is exposed to an electrical signal provided by the input component of the electronic device; and the changed load can be operative to provide a modulated version of the electrical signal that is detectable by the electronic device when the tip interface component of the stylus is positioned adjacent the input surface of the input component of the electronic device. Additionally or alternatively to one or more of the examples disclosed above, in some examples, the pattern can be not known by a user of the stylus.

Some examples of the disclosure are directed to a method for using a stylus comprising switching circuitry at an input component of an electronic device. The method can comprise: transmitting an electrical signal from transmitter circuitry of the input component of the electronic device; concurrently with the transmitting, switching the switching circuitry according to a pattern; and based on the switching, modulating the transmitted electrical signal according to the pattern. Additionally or alternatively to one or more of the examples disclosed above, in some examples, the method can further comprise: detecting the modulated electrical signal with the electronic device; and based on the detecting, determining a position of the stylus with respect to the input component.

Some examples of the disclosure are directed to a stylus for use with an electronic device that comprises an input component with an input surface. The stylus can comprise: a housing; and stylus circuitry at least partially positioned within the housing. The stylus circuitry can comprise: body circuitry; a front tip interface component; and front tip stylus circuitry positioned between and electrically coupled to each one of the body circuitry and the front tip interface component. The front tip stylus circuitry can comprise non-linear circuitry that is operative to provide a non-linear load between the body circuitry and the front tip interface component when the stylus circuitry is stimulated by an external stimulation. The non-linear load can be operative to provide a stylus electric field that is detectable by the electronic device when the front tip interface component of the stylus is positioned adjacent the input surface of the input component of the electronic device. Additionally or alternatively to one or more of the examples disclosed above, in some examples, the external stimulation can comprise an electrical signal provided by transmitter circuitry of the input component of the electronic device. Additionally or alternatively to one or more of the examples disclosed above, in some examples, the stylus electric field can be detectable by the electronic device as a harmonic of the electrical signal. Additionally or alternatively to one or more of the examples disclosed above, in some examples, the stylus electric field can be detectable by the electronic device for estimating a location of the stylus. Additionally or alternatively to one or more of the examples disclosed above, in some examples, the external stimulation can be generated by a power source that is external to the stylus. Additionally or alternatively to one or more of the examples disclosed above, in some examples, the power source comprises a user when the stylus is held by the user. Additionally or alternatively to one or more of the examples disclosed above, in some examples, the body circuitry can comprise a conductive component that is operative to be electrically coupled to the user when the stylus is held by the user. Additionally or alternatively to one or more of the examples disclosed above, in some examples, the conductive component can be electrically coupled to the front tip stylus circuitry. Additionally or alternatively to one or more of the examples disclosed above, in some examples, the conductive component can be exposed via an opening through the housing of the stylus for enabling direct contact of the conductive component by the user when the stylus is held by the user. Additionally or alternatively to one or more of the examples disclosed above, in some examples, the power source can comprise transmitter circuitry of the input component when the front tip interface component of the stylus is positioned adjacent the input surface of the input component of the electronic device. Additionally or alternatively to one or more of the examples disclosed above, in some examples, the stylus does not comprise any power supply. Additionally or alternatively to one or more of the examples disclosed above, in some examples, the stylus does not generate any stylus electric field independent of any external stimulation. Additionally or alternatively to one or more of the examples disclosed above, in some examples, the stylus electric field can be distinguishable by the electronic device from an electric field provided by a user's direct contact with the input surface of the input component of the electronic device. Additionally or alternatively to one or more of the examples disclosed above, in some examples, the front tip stylus circuitry can comprise a diode; and an anode of the diode can be directly electrically coupled to the body circuitry. Additionally or alternatively to one or more of the examples disclosed above, in some examples, the stylus circuitry can further comprise: a rear tip interface component; and rear tip stylus circuitry positioned between and electrically coupled to each one of the body circuitry and the rear tip interface component. The rear tip stylus circuitry can comprise other non-linear circuitry that can be operative to provide a non-linear load between the body circuitry and the rear tip interface component when the stylus circuitry is stimulated by another external stimulation; and the other non-linear load can be operative to provide another stylus electric field that is detectable by the electronic device when the rear tip interface component of the stylus is positioned adjacent the input surface of the input component of the electronic device. Additionally or alternatively to one or more of the examples disclosed above, in some examples, the external stimulation can comprise an electrical signal provided by transmitter circuitry of the input component of the electronic device. The stylus electric field can be detectable by the electronic device as a harmonic of the electrical signal with a first phase. The other external stimulation can comprise the electrical signal provided by the transmitter circuitry of the input component of the electronic device. The other stylus electric field can be detectable by the electronic device as the harmonic of the electrical signal with a second phase that is different than the first phase. Additionally or alternatively to one or more of the examples disclosed above, in some examples, the front tip stylus circuitry can comprise a diode; an anode of the diode can be directly electrically coupled to the body circuitry; the rear tip stylus circuitry can comprise another diode; and a cathode of the other diode can be directly electrically coupled to the body circuitry. Additionally or alternatively to one or more of the examples disclosed above, in some examples, the external stimulation can comprise an electrical signal provided by transmitter circuitry of the input component of the electronic device. The stylus electric field can be detectable by the electronic device as a second harmonic of the electrical signal. The other external stimulation can comprise the electrical signal provided by the transmitter circuitry of the input component of the electronic device. The other stylus electric field can be detectable by the electronic device as a third harmonic of the electrical signal. Additionally or alternatively to one or more of the examples disclosed above, in some examples, the front tip stylus circuitry can comprise only a single diode; and the rear tip stylus circuitry can comprise two diodes.

Some examples of the disclosure are directed to a stylus for use with an electronic device that comprises an input component with an input surface. The stylus can comprise: a tip interface component; and tip stylus circuitry electrically coupled to the tip interface component. The stylus can be operative to drive a current back and forth through the tip stylus circuitry when the tip stylus circuitry is stimulated by an electrical signal provided by the input component of the electronic device; and the driven current can be operative to provide a modulated version of the electrical signal that is detectable by the electronic device when the tip interface component of the stylus is positioned adjacent the input surface of the input component of the electronic device.

Some examples of the disclosure are directed to a method for using a stylus comprising non-linear circuitry at an input component of an electronic device. The method can comprise: transmitting an electrical signal from transmitter circuitry of the input component of the electronic device; stimulating the non-linear circuitry of the stylus with the transmitted electrical signal; providing a non-linear load at the stylus based on the stimulating; and creating a harmonic of the transmitted electrical signal at the input component of the electronic device based on the provided non-linear load.

Additionally or alternatively to one or more of the examples disclosed above, in some examples, the method can further comprise: detecting the created harmonic with the electronic device; and based on the detecting, determining a position of the stylus with respect to the input component.

Some examples of the disclosure are directed to a method for detecting an accessory on an input surface of an input component of an electronic device that comprises a matrix of a plurality of transmit electrodes and a plurality of receive electrodes. The method can comprise: transmitting a transmit signal on each transmit electrode of at least a subset of the plurality of transmit electrodes; sensing a receive signal on each receive electrode of at least a subset of the plurality of receive electrodes; extracting, from each sensed receive signal, data indicative of a non linear aspect of the transmit signal; and estimating a position of the accessory on the input surface based on the extracted data. Additionally or alternatively to one or more of the examples disclosed above, in some examples, the non linear aspect can comprise a third harmonic. Additionally or alternatively to one or more of the examples disclosed above, in some examples, the non linear aspect comprises a second harmonic. Additionally or alternatively to one or more of the examples disclosed above, in some examples, the transmit signal comprises a sinusoidal waveform. Additionally or alternatively to one or more of the examples disclosed above, in some examples, the transmit signal comprises a waveform with negligible second harmonic. Additionally or alternatively to one or more of the examples disclosed above, in some examples, the fundamental frequency of the transmit signal is 200 kHz. Additionally or alternatively to one or more of the examples disclosed above, in some examples, the non linear aspect comprises non linear distortion. Additionally or alternatively to one or more of the examples disclosed above, in some examples, the non linear aspect comprises asymmetric distortion. Additionally or alternatively to one or more of the examples disclosed above, in some examples, the method can further comprises estimating an amount of force applied by the accessory on the input surface based on the extracted data. Additionally or alternatively to one or more of the examples disclosed above, in some examples, the method further comprises estimating an amount of force applied by the accessory on the input surface based on a phase angle between the extracted data and the transmit signal. Additionally or alternatively to one or more of the examples disclosed above, in some examples, the extracting comprises demodulating, from each sensed receive signal, data indicative of the non linear aspect of the transmit signal. Additionally or alternatively to one or more of the examples disclosed above, in some examples, the estimating comprises comparing the extracted data to an output of a mathematical model. Additionally or alternatively to one or more of the examples disclosed above, in some examples, the method can further comprise: after the estimating, defining another subset of the plurality of transmit electrodes based on the estimated position; transmitting another transmit signal on each transmit electrode of the defined other subset of the plurality of transmit electrodes; sensing another receive signal on each receive electrode of at least another subset of the plurality of receive electrodes; extracting, from each other sensed receive signal, other data indicative of the non linear aspect of the other transmit signal; and estimating another position of the accessory on the input surface based on the extracted other data. Additionally or alternatively to one or more of the examples disclosed above, in some examples, the method can further comprise: extracting, from each sensed receive signal, other data indicative of another non linear aspect of the transmit signal; and estimating a position of another accessory on the input surface based on the extracted other data.

Some examples of the disclosure are directed to an electronic device comprising: an input component and processing circuitry. The input component can comprise: an input surface; and a matrix underneath the input surface comprising: a plurality of transmit electrodes; and a plurality of receive electrodes. The processing circuitry can be configured to: transmit a transmit signal on each transmit electrode of at least a subset of the plurality of transmit electrodes; sense a receive signal on each receive electrode of at least a subset of the plurality of receive electrodes; extract, from each sensed receive signal, data indicative of a non linear aspect of the transmit signal; and estimate a position of an accessory on the input surface based on the extracted data. Additionally or alternatively to one or more of the examples disclosed above, in some examples, the non linear aspect can be a second harmonic.

Some examples of the disclosure are directed to an electronic device comprising: an input component; a plurality of electrodes; and processing circuitry. The processing circuitry can be configured to: provide a transmit waveform on each electrode of at least a subset of the plurality of electrodes; detect a receive waveform on each electrode of at least another subset of the plurality of electrodes; extract, from each detected receive waveform, data indicative of asymmetric distortion of the transmit waveform; and determine a location of an accessory on the input surface based on the extracted data. Additionally or alternatively to one or more of the examples disclosed above, in some examples, the asymmetric distortion can comprise a second harmonic.

Some examples of the disclosure are directed to an electronic device comprising: an input component and processing circuitry. The input component can comprise: an input surface; and a matrix underneath the input surface comprising: a plurality of transmit electrodes; and a plurality of receive electrodes. The processing circuitry can be configured to: transmit signals on transmit electrodes of at least a subset of the plurality of transmit electrodes; sense a receive signal on each receive electrode of at least a subset of the plurality of receive electrodes; extract, from the sensed receive signals, data indicative of a non linear response to the transmit signals; and estimate a position of an accessory on the input surface based on the extracted data. Additionally or alternatively to one or more of the examples disclosed above, in some examples, the non linear response can be a second harmonic.

Some examples of the disclosure are directed to an electronic device comprising: an input component; a plurality of electrodes; and processing circuitry. The processing circuitry can be configured to: provide transmit waveforms on electrodes of at least a subset of the plurality of electrodes; detect a receive waveform on each electrode of at least another subset of the plurality of electrodes; extract, from the detected receive waveforms, data indicative of a non-linear response to the transmit waveforms; and determine a location of an accessory on the input surface based on the extracted data. Additionally or alternatively to one or more of the examples disclosed above, in some examples, the non-linear response can comprise a second harmonic.

Some examples of the disclosure are directed to an input device (e.g., a stylus or other accessory). The input device can comprise: a printed circuit board (PCB) comprising non-linear circuitry (e.g., non-linear circuitry coupled to the PCB or integrated within the PCB); resistive circuitry including a force-sensitive resistor (FSR) coupled to the PCB in parallel with the non-linear circuitry; and a hinge coupled to the PCB and the FSR, the hinge configured to strain the FSR in response to a force applied to a tip of the input device. Additionally or alternatively to one or more of the examples disclosed above, in some examples, a first portion of the FSR can be soldered to the PCB or can be bonded to the PCB using a conductive film (e.g., ACF bond) or conductive paste or conductive epoxy and a second portion of the FSR can be electrically coupled to the PCB using a flexible conductor (e.g., copper foil) or flex circuit. Additionally or alternatively to one or more of the examples disclosed above, in some examples, the second portion of the FSR can be electrically coupled to the PCB via the hinge (e.g., a conductive hinge in contact with the PCB and with the second portion of the FSR (e.g., using conductive hinge extension)). Additionally or alternatively to one or more of the examples disclosed above, in some examples, the first portion of the FSR can be electrically and mechanically coupled to the PCB via a conductive connection and the second portion of the FSR can be electrically connected to the PCB (e.g., without necessarily having a mechanical connection to the PCB or having a mechanical connection that allows for different amount of translation for the FSR relative to the PCB to enable elongation of the FSR). Additionally or alternatively to one or more of the examples disclosed above, in some examples, a first displacement of the PCB in response to the force applied to the tip of the input device can cause a first displacement in a first region of the hinge and a second displacement greater than the first displacement in a second region of the hinge different from the first region of the hinge. Additionally or alternatively to one or more of the examples disclosed above, in some examples, the hinge can comprise a first beam and a second beam (e.g., fused together). Additionally or alternatively to one or more of the examples disclosed above, in some examples, the first beam can have a first thickness and the second beam can have a second thickness greater than the first thickness. Additionally or alternatively to one or more of the examples disclosed above, in some examples, the first beam can be C-shaped or L-shaped. Additionally or alternatively to one or more of the examples disclosed above, in some examples, the first beam and the second beam are formed from metal. Additionally or alternatively to one or more of the examples disclosed above, in some examples, the first beam and the second beam are formed from a conductive material. Additionally or alternatively to one or more of the examples disclosed above, in some examples, the hinge can comprise an S-shaped beam. Additionally or alternatively to one or more of the examples disclosed above, in some examples, the input device can further comprise a hinge extension coupled to the hinge in the second region. The hinge extension can be configured to induce strain in the FSR in accordance with the second displacement in response to the force applied to the tip of the input device. For example, the greater displacement at the second region of the hinge coupled to the FSR can be achieved by having a lever arm on the hinge that amplify the displacement that is applied by the board to the hinge (e.g., as demonstrated by the amplification between the of translation amplification unit or subassembly 1181 or by the illustration of the amplification between the direct translation distance RDPTD and the extension translation distance REPTD). Additionally or alternatively to one or more of the examples disclosed above, in some examples, the hinge extension can be formed from rigid plastics, ceramics, biopolymers, insulating oxides. Additionally or alternatively to one or more of the examples disclosed above, in some examples, the hinge extension can be formed from a non-conductive material. Additionally or alternatively to one or more of the examples disclosed above, in some examples, the hinge extension can be formed from a conductive material (e.g., metal) (e.g., allowing for an electrical connection between a second portion of the FSR and the PCB and ground (e.g., via the metallic hinge in contact with the PCB and body stylus circuitry 1127)). Additionally or alternatively to one or more of the examples disclosed above, in some examples, the hinge extension can be coupled the FSR. Additionally or alternatively to one or more of the examples disclosed above, in some examples, the input device can further comprise a sleeve electrode disposed at least partially around the PCB. The sleeve electrode can include a guide (e.g., a notch) configured to receive a tab of the tip of the input device and reduce circumferential movement of the tip of the input device in response to the force applied to the tip of the input device (e.g., resulting in applied force causing axial translation). Additionally or alternatively, the sleeve electrode can include a guide (e.g., a notch) configured to prevent the tip from moving out of the housing due to spring action of the hinge beams.

Some examples of the disclosure are directed to a stylus (or other input device or accessory). The stylus can comprise: a housing; and stylus circuitry at least partially positioned within the housing. The stylus circuitry can comprise: body circuitry; a front tip interface component (e.g., a tip electrode); and front tip stylus circuitry positioned between and electrically coupled to the body circuitry and the front tip interface component. The front tip stylus circuitry can comprise non-linear circuitry in parallel with physical interaction characteristic (PIC) circuitry. The front tip stylus circuitry can be operative to provide a non-linear load between the body circuitry and the front tip interface component when the stylus is stimulated by an external stimulation. The non-linear load can be operative to provide a stylus electric field that is detectable by an electronic device when the front tip interface component of the stylus is positioned adjacent an input surface of the electronic device. A resistance of the PIC circuitry can be adjustable based on a force applied to the tip interface component (e.g., by the input surface of the electronic device) or based on a tilt angle of the stylus. Additionally or alternatively to one or more of the examples disclosed above, in some examples, the non-linear circuitry can comprise a plurality of diodes (e.g., optionally including at least one Schottky diode). Additionally or alternatively to one or more of the examples disclosed above, in some examples, the PIC circuitry can comprise a force sensitive resistor (FSR). Additionally or alternatively to one or more of the examples disclosed above, in some examples, the FSR can comprise a conductive polymer (or other material) with some impedance to provide a leakage path for charge on a flexible substrate (e.g., formed from silicone or a thermoplastic polyurethane). Additionally or alternatively to one or more of the examples disclosed above, in some examples, the PIC circuitry can comprise a plurality of force sensitive resistors. Additionally or alternatively to one or more of the examples disclosed above, in some examples, the front tip stylus circuitry can comprise a printed circuit board (PCB) positioned between the body circuitry and the front tip interface component. The PCB can be configured to be displaced axially in response to force applied to the front tip interface component. Additionally or alternatively to one or more of the examples disclosed above, in some examples, the non-linear circuitry can be mounted to a first side of the PCB and the PIC circuitry can be mounted to a second side of the PCB (e.g., opposite side).

Additionally or alternatively to one or more of the examples disclosed above, in some examples, the stylus can further comprise a conversion subassembly configured to convert the force applied to the tip interface component to an elongation of the PIC circuitry. Additionally or alternatively to one or more of the examples disclosed above, in some examples, the conversion subassembly can comprise a translation amplification subassembly configured to apply a translation to the PIC circuitry greater than a translation of a printed circuit board (PCB) coupled to the PIC circuitry in response to force applied to the front tip interface component.

Some examples of the disclosure are directed to an electronic device (e.g., including a touch sensor panel or touch screen) comprising: a plurality of first electrodes; a plurality of second electrodes; stimulation and sensing circuitry configured to transmit signals on the plurality of first electrodes and sense receive signals on the plurality of second electrodes; and processing circuitry. The processing circuitry can be configured to: extract, from the sensed receive signals, data indicative of a non-linear response to the transmit signals; estimate a position of an accessory on a surface of the electronic device based on the extracted data; and estimate a force applied to the accessory in contact with the surface of the electronic device or a tilt angle of the accessory relative to the surface of the electronic device based on the extracted data. Additionally or alternatively to one or more of the examples disclosed above, in some examples, the non linear response is a second harmonic.

Some examples of the disclosure are directed to an input device (e.g., a stylus or other accessory). The input device can comprise: a printed circuit board (PCB) comprising non-linear circuitry (e.g., coupled to the PCB or integral to the PCB); resistive circuitry including a force-sensitive resistor (FSR) coupled to the PCB in parallel with the non-linear circuitry; and a conversion assembly coupled to the FSR, the conversion subassembly configured to vary the resistance of the FSR based on a tilt angle of input. Additionally or alternatively to one or more of the examples disclosed above, in some examples, the conversion subassembly can comprise a weight assembly configured to induce a strain (e.g., compression) in the FSR with a weight (e.g., a spherical weight). Additionally or alternatively to one or more of the examples disclosed above, in some examples, a portion of a housing of the input device can cradle the weight. Additionally or alternatively to one or more of the examples disclosed above, in some examples, the weight can be configured to apply force to the FSR. Additionally or alternatively to one or more of the examples disclosed above, in some examples, the applied force varies based on an angle of the input device relative to a gravitational force (e.g., maximum force applied when the gravitational force is parallel with the input device (e.g., no tilt relative to gravity).

Many alterations and modifications of the preferred embodiments will no doubt become apparent to a person of ordinary skill in the art after having read the foregoing description, it is to be understood that the particular embodiments shown and described by way of illustration are in no way intended to be considered limiting. Thus, references to the details of the described embodiments are not intended to limit their scope.

The invention claimed is:

1. An input device comprising:
   a tip, wherein the tip of the input device is configured to interact with an input surface of an electronic device;

front tip stylus circuitry electrically coupled to the tip, the front tip stylus circuitry comprising:
   a printed circuit board (PCB) comprising non-linear circuitry;
   resistive circuitry including a force-sensitive resistor (FSR) coupled to the PCB in parallel with the non-linear circuitry; and
   a tilt component coupled to the PCB and the FSR configured to change a strain of the FSR in response to a change in orientation of the input device; and
   wherein the front tip stylus circuitry is operative to provide a non-linear load when the input device is stimulated by an external stimulation, and wherein the non-linear load is operative to provide a stylus electric field that is detectable by the electronic device when the tip of the input device is positioned adjacent the input surface of the electronic device.

2. The input device of claim 1, wherein the tilt component comprises a weight assembly that is configured to change the strain of the FSR based on one or more forces being applied to the weight assembly.

3. The input device of claim 2, wherein the one or more forces includes gravity.

4. The input device of claim 1, wherein a first portion of the FSR is soldered to the PCB or bonded to the PCB using a conductive film, conductive paste or conductive epoxy, and a second portion of the FSR is electrically coupled to the PCB using a flexible conductor or flex circuit.

5. The input device of claim 1, further comprising:
   a sleeve electrode disposed at least partially around the PCB including a guide configured to receive a tab of the tip of the input device and reduce circumferential movement of the tip of the input device in response to force applied to the tip of the input device.

6. The input device of claim 1, wherein the FSR comprises a conductive polymer with an impedance that provides a leakage path for charge on a flexible substrate comprising silicone or a thermoplastic polyurethane.

7. A stylus comprising:
   a tip;
   a housing; and
   stylus circuitry at least partially positioned within the housing, wherein the stylus circuitry comprises:
      front tip stylus circuitry electrically coupled to the tip, the front tip stylus circuitry comprising:
         a printed circuit board (PCB) comprising non-linear circuitry;
         resistive circuitry including a force-sensitive resistor (FSR) coupled to the PCB in parallel with the non-linear circuitry; and
         a tilt component coupled to the PCB and the FSR configured to change a strain of the FSR in response to a change in orientation of the stylus; and
      wherein the front tip stylus circuitry is operative to provide a non-linear load when the stylus is stimulated by an external stimulation, and wherein the non-linear load is operative to provide a stylus electric field that is detectable by an electronic device when the tip of the stylus is positioned adjacent an input surface of the electronic device.

8. The stylus of claim 7, wherein the tilt component comprises a weight assembly that is configured to change the strain of the FSR based on one or more forces being applied to the weight assembly.

9. The stylus of claim 8, wherein the one or more forces includes gravity.

10. The stylus of claim 7, wherein a first portion of the FSR is soldered to the PCB or bonded to the PCB using a conductive film, conductive paste or conductive epoxy, and a second portion of the FSR is electrically coupled to the PCB using a flexible conductor or flex circuit.

11. The stylus of claim 7, further comprising:

a sleeve electrode disposed at least partially around the PCB including a guide configured to receive a tab of the tip of the stylus and reduce circumferential movement of the tip of the stylus in response to force applied to the tip of the stylus.

12. The stylus of claim 7 wherein the FSR comprises a conductive polymer with an impedance that provides a leakage path for charge on a flexible substrate comprising silicone or a thermoplastic polyurethane.

13. The stylus of claim 7, wherein the non-linear circuitry comprises a plurality of diodes.

14. The stylus of claim 7, wherein the front tip stylus circuitry comprises a printed circuit board (PCB) positioned between a body circuitry and a front tip interface, wherein the PCB is configured to be displaced axially in response to force applied to the front tip interface.

15. The stylus of claim 7, further comprising:

a conversion subassembly configured to convert force applied to a front tip interface to a strain on the FSR.

16. An electronic device comprising:

a plurality of first electrodes;

a plurality of second electrodes;

stimulation and sensing circuitry configured to transmit signals on the plurality of first electrodes and sense receive signals on the plurality of second electrodes; and processing circuitry configured to:

extract, from the sensed receive signals, data indicative of a non-linear response to the transmit signals;

estimate a position of an accessory on a surface of the electronic device based on the extracted data; and estimate a tilt applied to the accessory in contact with the surface of the electronic device or a tilt angle of the accessory relative to the surface of the electronic device based on the extracted data.

17. The electronic device of claim 16, wherein the non-linear response is a second harmonic.

* * * * *